United States Patent [19]

Wu

[11] Patent Number: 5,078,771
[45] Date of Patent: Jan. 7, 1992

[54] METHOD OF MAKING HIGH ENERGY BEAM SENSITIVE GLASSES

[75] Inventor: Che-Kuang Wu, Riverside, Calif.

[73] Assignee: Canyon Materials, Inc., Riverside, Calif.

[21] Appl. No.: 436,418

[22] Filed: Nov. 14, 1989

Related U.S. Application Data

[60] Continuation-in-part of Ser. No. 308,187, Feb. 7, 1989, abandoned, and a continuation-in-part of Ser. No. 57,349, Jun. 1, 1987, Pat. No. 4,894,303, which is a division of Ser. No. 619,809, Jun. 24, 1984, Pat. No. 4,670,366, which is a continuation-in-part of Ser. No. 507,681, Jun. 24, 1983, Pat. No. 4,567,104.

[51] Int. Cl.$^5$ ............................................ C03C 15/00
[52] U.S. Cl. .................... 65/30.11; 65/30.12; 65/30.13; 65/31; 65/32.5; 501/13; 501/56; 428/410; 428/913
[58] Field of Search ............. 65/30.11, 30.12, 30.13, 65/31, 3.14, 32.5; 156/643, 657, 663; 501/13, 56; 428/410, 913; 430/19, 346, 616, 323; 350/354; 250/492.1, 492.3; 204/157.22, 157.41; 219/121.6

[56] References Cited

U.S. PATENT DOCUMENTS

| | | | |
|---|---|---|---|
| 3,419,370 | 12/1968 | Cramer | 501/56 |
| 3,541,330 | 11/1970 | Eichelberger et al. | 350/354 |
| 3,938,977 | 2/1976 | Gliemeroth | 65/30.11 |
| 4,057,408 | 11/1977 | Pierson et al. | 501/56 |
| 4,118,214 | 10/1978 | Wedding | 501/13 |
| 4,125,404 | 11/1978 | Araujo et al. | 501/13 |
| 4,160,654 | 7/1979 | Bartholomew et al. | 65/30.13 |
| 4,191,547 | 3/1980 | Wu | 65/30.11 |
| 4,287,018 | 9/1981 | Gulati et al. | 65/31 |
| 4,290,794 | 9/1981 | Wedding | 65/30.11 |
| 4,297,417 | 10/1981 | Wu | 501/69 |
| 4,405,672 | 9/1983 | Aravjo et al. | 65/30.13 |
| 4,478,677 | 10/1984 | Chen et al. | 156/663 |
| 4,530,736 | 7/1985 | Mutter | 156/663 |
| 4,567,104 | 1/1986 | Wu | 501/56 |
| 4,670,366 | 6/1987 | Wu | 501/13 |
| 4,756,733 | 7/1988 | Houde-Walter et al. | 65/30.13 |
| 4,894,303 | 1/1990 | Wu | 65/30.11 |

FOREIGN PATENT DOCUMENTS

| | | | |
|---|---|---|---|
| 1582045 | 9/1969 | Belgium | 65/30.13 |
| 760371 | 6/1971 | Belgium | 501/13 |
| 74157 | 3/1983 | European Pat. Off. | |
| 2323648 | 6/1975 | France | 65/30.11 |
| 51-109918 | 9/1976 | Japan | 65/30.11 |
| 61-26688 | 2/1986 | Japan | |
| 1208737 | 8/1989 | Japan | |
| 579244 | 11/1977 | U.S.S.R. | 501/56 |
| 1290528 | of 1972 | United Kingdom | |

OTHER PUBLICATIONS

Otley, Effects of High Energy Radiation Upon Glasses, Glass Industry, vol. 33, Jan. 1952, pp. 24-27.

Primary Examiner—Richard V. Fisher
Assistant Examiner—John J. Bruckner
Attorney, Agent, or Firm—Harness, Dickey & Pierce

[57] ABSTRACT

The invention relates to high energy beam-sensitive glass articles exhibiting insensitivity and/or inertness to actinic radiation, glass articles which are darkened and-/or colored within a thin surface layer of about 0.1-3 μm upon exposure to a high energy beam, electron beam, and ion beams in particular, without a subsequent development step, and which need no fixing to stabilize the colored image, since both the recorded image and the glass article are insensitive to radiation in the spectral range of uv and longer wavelengths. The instant invention is concerned with Ag$^+$ ion-exchanged glass articles having base glass within alkali metal silicate composition fields containing at least one of the oxides of transition metals which have one to four d-electrons in an atomic state. The base glass composition can be varied widely, spontaneous reduction as well as photoreduction of Ag$^+$ ions are inhibited and/or eliminated due to the presence of said transition metal oxides in the glass article. The product of the invention is suitable for use as recording and archival storage medium and as phototools. The recorded images and/or masking patterns are up-datable, can be any single color seen in the visible spectrum, and is erasable by heat at temperatures above about 200° C. Heat erasure mode of recording in the high energy beam darkened glass article using a high intensity light beam, focused laser beam in particular, is described.

91 Claims, 13 Drawing Sheets

METHOD OF MAKING HIGH ENERGY BEAM SENSITIVE GLASSES

CROSS-REFERENCE TO RELATED APPLICATIONS

This application is a continuation-in-part of U.S. application Ser. No. 07/308,187, filed Feb. 7, 1989, on HIGH ENERGY BEAM SENSITIVE GLASSES by Che-Kuang Wu, now abandoned. This application is also a continuation-in-part of U.S. application Ser. No. 07/057,349, filed June 1, 1987, on HIGH ENERGY BEAM SENSITIVE GLASSES by Che-Kuang Wu, now U.S. Pat. No. 4,894,303 which is a divisional application of U.S. application Ser. No. 619,809, filed June 24, 1984, on HIGH ENERGY BEAM SENSITIVE GLASSES by Che-Kuang Wu, now U.S. Pat. No. 4,670,366, which is a continuation-in-part of application Ser. No. 507,681, filed June 24, 1983, on HIGH ENERGY BEAM COLORED GLASSES EXHIBITING INSENSITIVITY TO ACTINIC RADIATION by Che-Kuang Wu, now U.S. Pat. No. 4,567,104. These four prior applications are incorporated herein by reference.

BACKGROUND OF THE INVENTION

In many applications in the field of recording and archival storage medium, e.g., direct-read-after-write archival storage medium, for recording high density data and high quality images in particular, a recording life time for data substantially longer than ten years is desirable. It is also desirable to produce phototools, such as photomask and reticles, that are substantially more durable than chrome-phototools.

These objectives may be achieved by having the recorded image and/or the masking pattern and/or the information bearing layer present within (that is, not coated on) the glass substrate of the recording medium. Such a recording medium would improve the durability of the phototool and the recorded image and eliminate the need of thin film coatings, such as the chromium film on photomasks and ablative thin film materials, e.g. Tellurium film on optical disks.

There are many types of glasses in which optical images can be produced within the glass, such as the glasses of the following patents:

U.S. Pat. No. 4,017,318 discloses photosensitive colored glasses which are sodium halide-silver halide containing photosensitive glasses based on sodium silicate. The photosensitive colored glasses contain a significant amount of fluoride, 1–4% by weight, and a second halide, usually about 1% by weight of Br. On cooling from melts, the glasses become supersaturated with NaF. They also contain 0.0005–0.1% by weight of Ag as sensitizer and colorant, 0.01–0.2% $CeO_2$ as optical sensitizer, about 1% $Sb_2O_3$ and/or up to about 0.1% SnO as thermal sensitizer and redox agent.

Through a unique sequence of ultraviolet exposures and heat treatments, a full spectrum of visible colors can be developed in a photosensitive colored glass of U.S. Pat. No. 4,017,318. While the intensity of colors depends on the exposure dosage of a second uv exposure, the hue is primarily a function of the first uv exposure dose. Thus, optical transmission curves for a fully developed glass show a progressive series of absorption bands moving from the infrared across the visible spectrum as a function of the increasing dosage of first ultraviolet exposures. These photosensitive colored glasses are often yellow colored in the regions/areas which are not exposed to ultraviolet radiation, after a sequence of heat treatments. In order to prevent the spontaneous yellow background coloration, the silver concentration in the photosensitive colored glass melts of U.S. Pat. No. 4,017,318 is kept below 0.025% by weight. As a result, the required thickness of the image bearing glass layer is at least about 100 micrometers to secure an optical density of unity. Thus these glasses are not suitable for use as a recording medium to store data having bit sizes of less than about 10 micrometers or as photomasks to print IC patterns having minimum geometries of less than about 10 micrometers.

U.S. Pat. No. 2,515,936 discloses silver-photosensitive glasses which are exposed to short wave radiation, such as ultraviolet (310 nm). The irradiated areas of the glass are capable of heat developed coloration while non-irradiated areas remain substantially unchanged on heating. The heat developed image is permanent and is yellow to amber in color due to an absorption band centered at about 420 nm. The glass batches on the weight percent basis contain about 75% $SiO_2$, 15% alkali metal oxide and 10% divalent metal oxide, 0.05 to 0.3% silver computed as AgCl, and up to 0.05% $CeO_2$. $CeO_2$ is stated to act as a photosensitizing agent. Although up to 0.3% of silver can be retained in the glass melt, the thickness of the silver-photosensitive glass, required to secure 1 unit of optical density at 420 nm, is not less than that of the photosensitive colored glasses of U.S. Pat. No. 4,017,318. Apparently a smaller fraction of silver ions in the silver-photosensitive glass of U.S. Pat. No. 2,515,936 is reduced and precipitated out as colloidal silver metal particles in glass as a result of a radiation step followed by a heat treatment.

U.S. Pat. No. 2,732,298 discloses a method of producing a permanent two dimensional photographic image within the surface of a silicate glass containing an alkali metal oxide. The method consists of first forming on the surface of a silicate glass by conventional procedures a chemically fixed photographic image. The glass, together with the image, is then heated either in air alone or with an additional oxidizing agent present at a temperature between about 125° C. below the strain point of the glass and just below its softening point for a time sufficient to oxidize and ionize the silver and to cause the migration of silver ions into the glass in exchange for alkali metal ions therein. A visible image which is usually of a yellowish to brownish color is produced due to the spontaneous reduction of a portion of the silver ions in the glass to metallic particles. If desired, a more complete reduction of silver ions and intensification of the color to dark amber or brown can be accomplished by subsequently heating the glass in a reducing atmosphere containing a reducing gas such as hydrogen, carbon monoxide or methane. Due to the lateral or sideway diffusion of the photographic silver image, the minimum geometry and/or line width reproducible in glass according to this method is in general greater than about 20 micrometers.

A modification of the method of U.S. Pat. No. 2,732,298 is found in U.S. Pat. No. 4,286,052 wherein the photographic silver image is driven into a glass article by electrical means.

Besides being not suitable for recording optical images or information with bit sizes or minimum geometries of less than a couple of micrometers, images in the three types of glasses cited above are developed through at least a heat treatment step, there is thus no direct-read-after-write capability.

Applicant's U.S. Pat. Nos. 4,191,547 and 4,296,479 are directed to alterable photosensitive glasses, that is, photosensitive colored glasses exhibiting alterable photo-anisotropic effects. These glasses may be employed as erasable recording media having limited read applications. The alterable photosensitive glasses comprise a body portion and a photosensitive surface layer exhibiting alterable photo-anisotropic effects. The surface layer, having photosensitive and photo-anisotropic Ag-AgCl-containing crystals therein, is prepared by subjecting a glass article having base glass compositions within the $Na_2O$ and/or $K_2O$-$ZnO$-$Al_2O_3$-$SiO_2$-Cl field to an ion-exchange reaction in a silver containing aqueous solution, and subsequently exposing the glass article to radiation within the spectral ranges of uv and blue light. Write and erasure are done with polarized red light, and are based on the phenomena of photo-polarization and optical bleaching.

The alterable photosensitive glasses of U.S. Pat. Nos. 4,191,547 and 4,296,479 are not suitable for use as a permanent recording medium and/or as a phototool because there is no method and/or mechanism for fixing recorded images. The recorded image, as well as the alterable photo-anisotropic surface layer, are unstable in the presence of radiation in the uv, blue light and longer wavelength range, and are particularly sensitive to polarized red light. The required thickness of the image-/information bearing layer of the alterable photosensitive glasses to secure an optical density of 2 is at least 30 micrometers.

SUMMARY OF THE INVENTION

The high energy beam-sensitive glass article ("HEBS glass article" herein) of the present invention comprises a body portion and an integral ion-exchanged surface layer ("IIES layer" herein) containing a high concentration of silver ions, which upon exposure to high energy beams becomes darkened and/or colored instantaneously without resorting to heat or other development step. The net optical density of the colored image confined within a thin surface glass layer should exceed 1.2 and is preferably in excess of 1.8 and is most preferably in excess of 3. The colored image should be confined within a surface glass layer of less than about 3 micrometers. The high energy beams used to expose the HEBS glass article include electron beams, various ion beams, various molecular beams, x-ray and deep ultraviolet of wavelengths less than about 200 or 300 nm.

The HEBS glass articles are highly sensitive to high energy beams, are colorless and totally transparent to actinic radiation before exposure to high energy beams, and not darkened (i.e., not colored) by actinic radiation at intensities within, above and/or below those commonly employed in photolithography and/or in optical retrieval (optical read) applications. Actinic radiation is defined herein as radiations in the wavelength range of ultraviolet and/or longer wavelengths.

It is an objective of the present invention that the colored image produced in the HEBS glass articles upon exposure to the high energy beams is not bleached by the actinic radiation at intensities within, above and/or below those commonly employed in photo-fabrication and/or in optical read out.

It is an objective of the present invention that the image recorded by the high energy beams as well as the unexposed colorless areas of the glass are stable, indefinitely, in all possible ambient thermal, lighting and humidity conditions. For example, there will be no thermal fading of the colored image, no thermal darkening of the unexposed colorless areas, and no degradation of the sensitivity toward high energy beams due to long term storage in ambient conditions.

It is a further objective of the present invention that the required charge density of the high energy beam in a direct writing mode to secure an optical density of more than 2 within the integral surface layer is less than $1 \times 10^{-3}$ coulomb/cm$^2$ and preferably less than $1 \times 10^{-4}$ coulomb/cm$^2$ and most preferably less than about $1 \times 10^{-5}$ coulomb/cm$^2$ when the high energy beam is an electron beam having an accelerating voltage ranging between about 10-100 kv. The terminology "electron-beam" is herein denoted as E-beam.

A direct writing mode is herein defined as a mode of recording wherein an image with a high/good contrast is produced by exposure to a high energy beam without any requirement for a subsequent development and/or a contrast enhancement step.

The integral ion-exchanged surface layer, which is darkened and/or colored upon exposure to high energy beams, contains a high concentration of Ag$^+$ ions. The nature of the Ag$^+$ ion in the ion-exchanged surface layer is not fully understood, but it is believed that the surface or integral ion-exchanged layer contains a high concentration of Ag$^+$ ions and/or a large number density of AgCl containing and/or Ag$_2$O containing and/or Ag$^+$ ion containing microcrystals and/or microphases, and also contains silanol groups and/or water in the concentration range between about 0.01-12% by weight H$_2$O.

The concentration of silanol groups and water in the IIES layer are measured as the percentage, by weight, of H$_2$O loss from the IIES layer when the glasses are heated at an elevated temperature, such as 800° C., to constant weight.

One method of making the HEBS glass articles consists of the following:

(a) melting a batch for a base glass composition useful for preparing a HEBS glass article comprising in mole percent on the oxide basis, of about 3-25% total of $Li_2O + Na_2O + K_2O + Cs_2O + Rb_2O$, 0-6% Cl, 0.5-35% total of at least one oxide selected from the oxides of transition metals which have one to four d-electrons in an atomic state, up to 35% total concentration of $ZnO + MgO + CaO + SrO + PbO + Al_2O_3$, up to 20% BaO, up to 25% $P_2O_5$, up to 25% $B_2O_3$, up to 4% F, up to 2% Br, up to 2% I and 20-93% $SiO_2$;

(b) forming said base glass melt into a glass article, such as a glass sheet or plate;

(c) contacting the surface of the glass article with a Ag$^+$ ion-containing material, such as an aqueous solution containing Ag$^+$ ions;

d) heating the glass article together with the Ag$^+$ ion-containing material in contact therewith to a temperature sufficient to effect ion-exchange reactions and form an integral ion-exchange surface layer on the body portion of the glass article which has not undergone ion-exchange reactions. The resulting product, a HEBS glass article, comprises an integral ion-exchanged surface layer and anhydrous base or body portion. It is believed that the ion-exchange reactions result in the formation of AgCl-containing and/or Ag$_2$O-containing and/or Ag$^+$ ion-containing microcrystals and/or microphases within an ion-exchanged surface layer of the glass article. The ion-exchange reactions include an exchange of $Ag^+$ for the alkali metal ions in at least the surface of the glass article. Hydration and/or an exchange of $H^+$ ions for alkali metal ions in glass may also take place to various extents depending primarily on the ingredients of the aqueous ion-exchange solution, temperature of the ion-exchange reaction and the base glass composition. The reactions are allowed to proceed at least 0.1 micrometer, in thickness dimension, into the surface of said glass article. The concentrations of alkali metal ions in the ion-exchanged surface layer decrease with an increase in the concentration of $Ag^+$ ions in the layer; and (e) cooling the glass article to room temperature either in contact or out of contact with the $Ag^+$ ion-containing material.

The inventive method, because of the unique combinations of the glass compositions and the composition and conditions of the ion-exchange reactions, effectively suppresses and/or eliminates within the integral ion-exchanged surface layer, photo-reduction of the microcrystals and/or microphases as well as the spontaneous reduction of $Ag^+$ ions upon being exchanged into glass.

The E-beam darkened images within the integral ion-exchanged surface layer of the HEBS glass article can be erased by heat at temperatures substantially below the softening point of the integral ion-exchanged surface layer and/or below the strain point of the body portion of the HEBS glass article. The sensitivity of the HEBS glass article to electron beam is unchanged by the heat erasure treatment.

Latent images and/or latent patterns, delieated or recorded on the HEBS glass article by electron beams, which have little or no detectable optical density, can be developed into surface relief images and/or relief patterns of very high quality through selective etching means. The minimum charge density of the electron beam to produce surface relief images can be a factor of more than 100 times lower than that required to produce colored images of high/good contrast in a direct E-beam writing mode.

The HEBS glass articles are useful as high energy beam recording media for permanent storage of images or data having a full range of gray scales. Analog as well as digital recording are done in a direct writing mode. Optical images with feature sizes down to below 1 micrometer can be recorded with an electron beam within a CRT or scanning electron beam system or parallel exposure system, such as a 1:1 photo cathode projection system or a demagnifying electron image projection system.

Electron beam lithography machines and replication techniques were reviewed by G. Brewer, et al. in the book, "Electron-Beam Technology in Microelectronic Fabrication," 1980, Academic Press, New York. Scanning electron beam systems utilizing a shaped probe concept have recently been described by E. V. Weber in *Optical Engineering*, 1983, Vol. 22, No. 2, pages 190–194.

Optical software disks, and the like, as well as digital audio disks, digital video disks and ultra high density microfilm of superior durability and permanence can be mass produced from the HEBS glass articles in a direct E-beam writing mode with one of the various types of electron-beam systems. The permanent image, information and/or data recorded on the HEBS glass article can be optically read in a transmission mode with a semiconductor laser, a He-Ne laser or any light source within the spectral ranges of near-infrared, visible and near-uv. Such optical software disks/plates/slides may be employed to load programs into various micro- and mini-computers as well as supply a recording medium to serve the market for personal computers, video games, office systems, data distribution systems and other information systems. Such recording media may also be employed to record financial transactions.

Digital data can be recorded in and on the HEBS glass article in the form of surface relief through exposures of the glass article to electron beams and a subsequent surface-relief-development in HF solution. A reflective coating deposited thereafter on the surface relief renders the recorded data optically retrievable in a reflection mode.

The HEBS glass article is suitable for use as a photomask blank. Utilizing the article as a photomask blank, phototools, including photomasks, $1\times/5\times/10\times$ step-and-repeat-reticles, and reticles for optical instruments are prepared by writing or recording masking patterns with a high energy beam in a direct writing mode. Permanent masking patterns having a net optical density in excess of 2 can be obtained instantaneously without resorting to any subsequent development or etching process. Immediately after the high energy beam pattern generation, IC device patterns in a photomask may be printed on any photoresist coated or photosensitive surface through many of the various photolithographic techniques, e.g., step and repeat camera, contact printing and/or projection printing. Photomask blanks of the present invention will contribute to the needs of phototools and photofabrication particularly in the fields of microelectronics. Photomask blanks of the present invention have the following advantages over the conventional chrome photomask blanks:

1. Reduction in time and cost for mask making. Many, if not all, processing steps in traditional photomask making, such as developing resist, pre-baking and post-baking resist, etching the chrome and stripping the resist are totally eliminated.
2. Elimination of undesirable features of the traditional photomask making, including swelling of resist, limited process latitude, scum left from resist development, and line distortion and rough edges due to development and etching.
3. Longer mask life and high wafer yield. The photomask blanks of the present invention are monolithic, namely, the information bearing surface is an integral part of, not coated on the surface of, a glass substrate. The photomask of the present invention is highly durable and wear-resistant. There will be no problem of pattern missing due to repeated cleaning and/or washing because the pattern is in the glass substrate rather than on the surface of the glass.
4. Elimination of pin-holes in the photomask. The numerous mechanisms of pin-hole formation in the traditional photomask processing steps are eliminated. Moreover, other defects, such as unetched chrome and under cuts which are inherently associated with the coated masking layer and photoresist, are eliminated.
5. The photomask of the present invention is easily cleaned and can be washed repeatedly without generating defects. Consequently, the need and the cost for reinspections are minimized.
6. White light is a safe light for the photomasks and photomask blanks of the present invention; allowing inspection of the mask and the mask-blank with intense white light before, during and after the IC pattern is generated.
7. Allows add-on and correction of device patterns.
8. Reduction of reflectivity to, or near, zero reflectivity on the front as well as on the back side of the masking layer.
9. Allows see-through, e.g., red images for ease of alignment.

The body portion of the HEBS glass article has a base glass composition comprising, in mole percent, 5-25% of one or more alkali metal oxides, 0.5-35% of photosensitivity inhibitors (PI agents), RS-Suppression agents (RSS agents) and mixtures thereof, 0-6% Cl, and 50-89% $SiO_2$. The IIES layer is an ion-exchanged glass of the base glass composition of the body portion. The base glass composition is ion exchanged with an acidic aqueous solution containing soluble ionic silver to substitute silver ion for the alkali metal ions in said IIES layer and leach alkali metal ions out of said IIES layer. Said ion-exchanged glass composition comprising silver ions and/or silver salts, and silanol and/or water in a concentration greater than about 0.01% by weight percent $H_2O$, the concentration of the alkali metal oxides in the ion-exchanged glass of the IIES layer being less than in said glass composition of the body portion. The ion-exchange reaction changes the chemical composition of the glass composition of the body portion to produce the IIES layer. The glass composition of the IIES layer comprises silanol, water and combinations thereof in a concentration of between about 0.01 and 12 weight percent $H_2O$, and, in mole percent, 0-24% of one or more alkali metal oxides, 0.5-35% of PI agents, RSS agents or combinations thereof, 0-6% Cl, 50-89% $SiO_2$, and 0.1-25% $Ag_2O$.

For the base glass compositions containing Cl, it is believed that at least a portion of the silver ions in the IIES layer are in microcrystals and/or microphases of AgCl in said IIES layer. The AgCl containing microcrystals and/or microphases also contain at least trace amounts of alkali metal ions, and/or PI agents, and/or RSS agents. Preferably, the average grain size of the microcrystals and microphases in the IIES layer are less than 0.1 micrometer. Even more preferably, the average grain size of the microcrystals and microphases in the IIES layer are less than 0.03 micrometer in diameter. In the most preferred embodiment, at least a portion of said microcrystals and microphases in the IIES layer have grain size of less than about 80 angstroms.

The PI agents and RSS agents are selected from one or more of the oxides of transition metals having 1 to 4 d-electrons in the atomic state.

In general, a portion of the silver ion in the IIES layer is present as glass-network-modifiers and a portion is associated with halides. In an especially preferred embodiment, the portion of silver ions present as glass-network-modifiers in said IIES layer are present in amounts up to 18% $Ag_2O$ on the mole percent oxide basis, and the portion of silver ions directly associated with halides in said IIES layer are present in amounts up to 6% $Ag_2O$ on the mole percent oxide basis. In another preferred embodiment, the silanol groups and/or water in said integral surface layer ranges between about 0.1-6% by weight $H_2O$.

In an alternative embodiment of the present invention, the base glass composition, that is the glass composition of the body portion, can be fully ion exchanged through its entire thickness or depth to produce a HEBS glass article that consists of an IIES layer alone without a body portion. A thin sheet or film of the anhydrous base glass can be conveniently ion exchanged to produce such a HEBS glass article. For mechanical durability, such thin sheet or film of glass can be affixed to a support, such as a glass, quartz or plastic sheet or plate, by means well known in the glass art.

Preferably the base glass consists essentially of, in mole percent on the oxide basis, of about 3-25% total of $Li_2O + Na_2O + K_2O + Cs_2O + Rb_2O$, up to 6% Cl, 0.5-35% total concentration of photosensitivity inhibitors (PI agents) and RS-suppression agents (RSS agents), up to 35% total concentration of acid durability-and-glass-network-strengtheners, up to 20% BaO, up to 25% $P_2O_5$, up to 25% $B_2O_3$, up to 4% F, up to 2% Br, up to 2% I and 20-93% $SiO_2$; whereas the photosensitivity inhibitors are necessary constituents of chloride-containing glasses, the RS-suppressant agents are necessary constituents of chloride-free glasses, the photosensitivity inhibitors as well as the RS-suppressant agents are usually included in halide-containing glasses. The integral ion-exchanged surface layer having $Ag^+$ ions therein and/or a large number of AgCl-containing and-/or $Ag_2O$-containing and/or $Ag^+$ ion-containing microcrystals and/or microphases, containing silanol groups and/or water in the concentration range of between about 0.01-12% by weight $H_2O$, the concentrations of alkali metal ions in said integral ion-exchanged surface layer being less with an increase in the concentration of $Ag^+$ ions, said integral ion-exchanged surface layer containing total or at least part of the contents of each of the photosensitivity-inhibitors, the RS-suppressant agents, the glass network formers and chloride of said body portion. Said microcrystals and/or microphases may also contain at least trace amounts of alkali metal ions, and/or photosensitivity inhibitors, and/or RS-suppresant agents, and/or other ingredients contained in said integral surface layer.

In a more preferred embodiment of the present invention, the base glass consists essentially, in mole percent on the oxide basis, of about 5-25% total of $Li_2O + Na_2O + K_2O + Cs_2O + Rb_2O$, up to 6% Cl, 0.5-35% total concentration of photosensitivity-inhibitors and RS-suppressant agents, up to 20% MgO, up to 20% CaO, up to 20% ZnO, up to 15% $Al_2O_3$, up to 20% PbO, 2-35% total of $ZnO + CaO + MgO + PbO + Al_2O_3$, up to 4% F, up to 2% Br, up to 2% I, and 50-89% $SiO_2$. The preferred alkali metal oxides are $Li_2O$, $Na_2O$ and $K_2O$. Preferably, the base glass will contain at least 1.2% $TiO_2$. The preferred halide is Cl and preferably the composition will contain only the halide Cl.

A more preferred base glass consists essentially, in mole percent on the oxide basis, of about 5-25% total of $Li_2O + Na_2O + K_2O$, up to 6% Cl, 1.2-25% $TiO_2$, 1.2-35% total of $TiO_2 + Ta_2O_5 + ZrO_2 + Nb_2O_5 + La_2O_3 + Y_2O_3 + WO_3$, 2-20% ZnO, up to 10% $Al_2O_3$, up to 3% total of $F + Br + I$ and 50-89% $SiO_2$. Preferably, said base glass contains at least two of the alkali metal oxides selected from $Li_2O$, $Na_2O$ and $K_2O$, preferably the base glass will contain more than 1% $Li_2O$. In a preferred embodiment of the composition, said base glass has a molar concentration ratio of $(Li_2O + Na_2O)$ to $K_2O$ of more than 0.6. In another preferred embodiment, said base glass will have a total content of $Li_2O + Na_2O + K_2O$ of between 10 and 20%, and a Cl content of between about 0.8 and 6%. In another preferred embodiment, said base glass will contain between about 60 and 82% $SiO_2$ and between about 3 and 10% $TiO_2$.

In most preferred embodiments of the present invention, the base glass consists essentially of, in mole percent on the oxide basis, of about 12-16% total of $Li_2O+Na_2O+K_2O$, 0.8-6% Cl, 3-10% $TiO_2$, 4-10% ZnO, 0.5-5% $Al_2O_3$, and 68-75% $SiO_2$ where the $TiO_2$ functions as a photosensitivity-inhibitor and as a RS-suppressant agent.

The base glass is prepared from glass melts. Preferably the glass melts are prepared in an atmosphere containing at least a partial presure of chlorine and/or chlorides.

Silver is incorporated in the integral ion-exchange surface layer by ion-exchange. Preferably the portion of $Ag^+$ ions are present as glass-network-modifiers in the integral ion-exchange layer in amounts up to 25% $Ag_2O$ on the mole percent oxide basis, and the portion of $Ag^+$ ions directly associated with halides in said integral ion-exchange surface layer ranges up to 6% $Ag_2O$ on the mole percent oxide basis. In one embodiment of the present invention, the ion-exchange integral surface layer contains at least a trace amount of ion-exchange cuprous ions, and/or cupric ions and/or cuprous oxide and/or cupric oxide.

The glass article prepared from the base glass by ion exchange as described herein is insensitive to at least a spectral portion of actinic radiation. Preferably, the glass article is insensitive to actinic radiation of about 400 nm and/or longer wavelengths. More preferably, the glass article will be insensitive to actinic radiation of about 300 nm and/or longer wavelengths.

The glass articles are sensitive to high energy beams. The depth of the colored images delineated and/or replicated by the high energy beam is limited by the thickness of said ion exchange integral surface layer and/or by the penetration depth of the high energy beam. Preferably, the integral ion exchange surface layer (IIES layer) is more than about 0.1 micrometers. More preferably, the IIES layer is less than about 10 micrometers in thickness. Most preferably, the IIES layer is less than about 3 micrometers. The preferred content of the silanol groups and/or water in the integral surface layer ranges between about 0.1-6% by weight $H_2O$.

The ion exchange is carried out in aqueous solution containing $Ag^+$ ions having a concentration ranging from $10^{-4}$ mole per liter up to the concentration of a saturated $AgNO_3$ solution and $H^+$ ions ranging from about $10^{-6}$ to 5 moles/per liter. A preferred ion exchange solution contains about 200 g $AgNO_3$/liter of the aqueous solution and is acidified with about 10-200 cc of 16N $HNO_3$/per liter of the aqueous solution.

Another preferred aqueous ion exchange solution contains about 20 gms $AgNO_3$/per liter of the aqueous solution and is acidified to a pH between about 1 to 6. Preferably, the aqueous ion-exchange solution is a buffered solution having more or less a constant pH throughout the ion exchange reaction. When the pH of the ion-exchange aqueous solution is kept at a value of more than about 2, preferably, the aqueous solution has a $[Ag^+]:[H^+]$ mole ratio of more than 5, and most preferably, the mole ratio of $[Ag^+]:[H^+]$ in the aqueous ion-exchange solution is more than 50. In one preferred embodiment of the present invention, the pH of the aqueous ion-exchange solution is buffered at a constant value ranging between about 2 and 3, and the $Ag^+$ ion concentration of the solution ranges between about 0.01 and 2 moles/per liter of solution. The aqueous ion exchange solution can be buffered due to the presence of $Cu_2O$ and/or $Cu^{++}$ ions in a strong acid-containing solution. Preferably, the aqueous ion-exchange solution also contains $Li^+$ ions up to the concentration of a saturated $LiNO_3$ aqueous solution. Said aqueous ion-exchange solution preferably contains up to saturation of dissolved $SiO_2$ and/or silica gel and/or water soluble silicates and/or other constituent cations of the base glass.

One of the products of the present invention is a high energy beam recording medium exhibiting insensitivity and/or inertness to actinic radiation, colored images delineated and/or replicated therein by said high energy beam are also insensitive and/or inert to the actinic radiation, said recording medium comprises a supported thin film of glass matrix having $Ag^+$ ions therein and/or a large number of AgCl-containing and/or $Ag_2O$-containing and/or $Ag^+$ ion-containing microcrystals and/or microphases therein containing at least one of photosensitivity-inhibitors and/or RS-suppression agents, at least one glass network former, and up to saturation of chloride in the glass matrix, total concentration of glass network modifiers including $Ag^+$, $H^+$ and alkali metal ions ranges between about 3-25% on the mole percent oxide basis, a portion of $Ag^+$ ions being directly associated with halides in said glass matrix, said portion ranges up to 6% $Ag_2O$ on the mole percent oxide basis; whereas the photosensitivity-inhibitors are necessary consituents of chloride-containing glass matrix, and the RS-suppression agents are necessary constituents of chloride-free glass matrix, the photo-sensitivity-inhibitors as well as the RS-suppression agents are usuallly included in halide-containing glass matrix.

DESCRIPTION OF THE INVENTION

Figure 1:
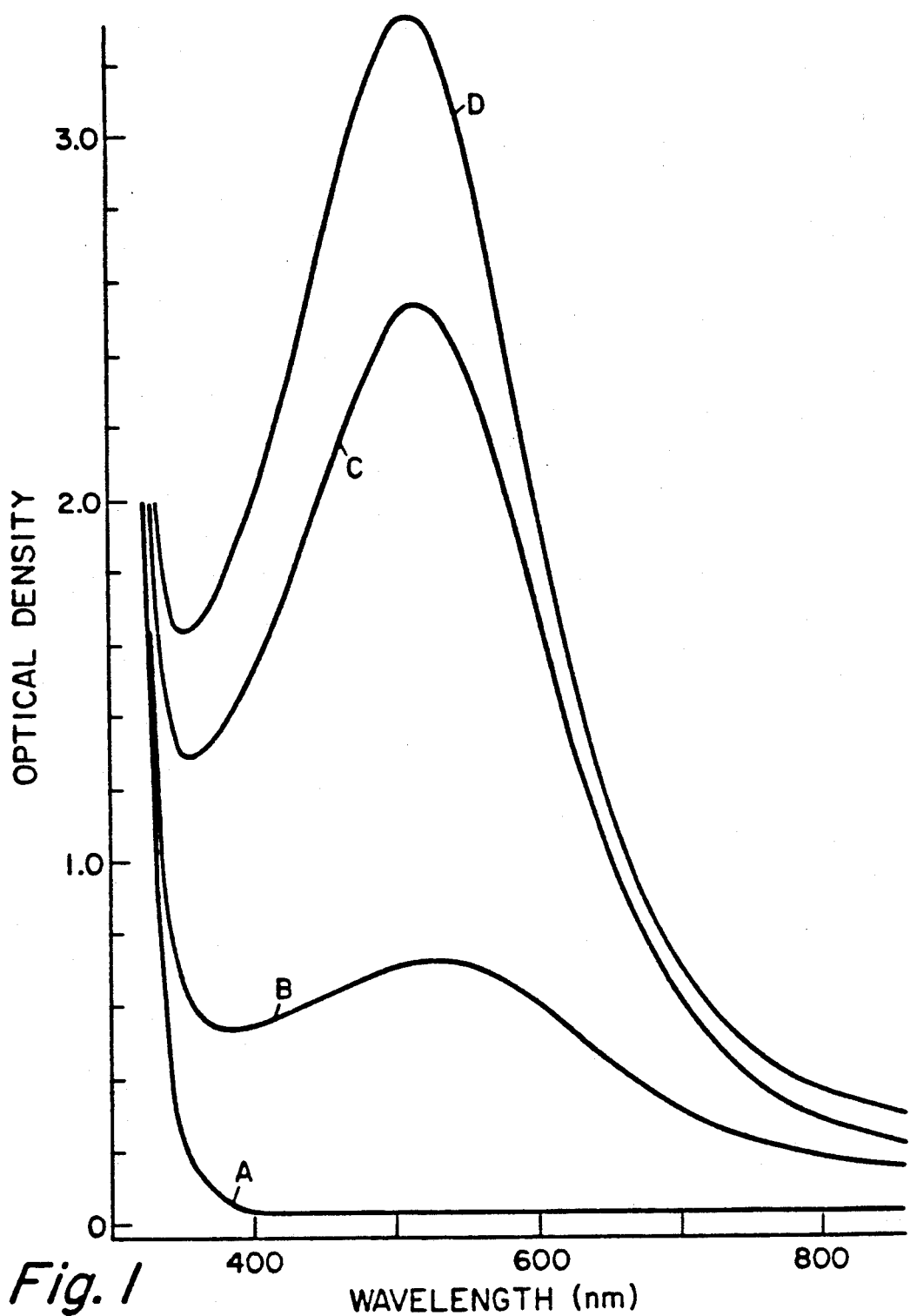
FIG. 1 graphically records the spectral absorption curves of a HEBS glass article plate sample after being exposed to E-beam charge densities of 0, $3.2 \times 10^{-5}$, $1.6 \times 10^{-4}$ and $3.2 \times 10^{-4}$ coulomb/$cm^2$ at 35 kv.

A method of preparing the base glass or the parent anhydrous glass composition useful for preparing a HEBS glass article comprises the steps of:

(a) preparing a pre-melt batch for the base glass composition by thoroughly combining and mixing powdered oxides or salts of the alkali metals, PI agents, RSS agents, silicon and halides in appropriate portions to yield a glass composition, following the melt step described below, of the desired composition;

(b) melting the pre-melt batch or mixture to form a glass melt; and (c) cooling the glass melt.

Prior to cooling the glass melt, the glass melt may be formed into a glass article, such as a glass sheet or plate before cooling. Preferably, the glass melt is stirred during the melt to form a uniform glass composition. Oxides and salts are used in the preparation of the premelt batch, such as oxides, halide salts, nitrate salts, carbonate salts, bicarbonate salts, silicate salts and the like of alkali metals, PI agents, and RSS agents.

To obtain the maximum Cl in the base glass, the base glass pre-melt batch is compounded with an excess of Cl salt. During the melting, some Cl will be evaporated off but the resulting melt and cooled glass will be saturated or super saturated with respect to Cl. Cl saturation can be increased by conducting the melt under a partial or complete Cl or chloride atmosphere. In a preferred embodiment, the melting is done in an atmosphere containing at least a partial pressure of chlorine or chlorides.

The surfaces of the glass articles formed from the melt, after cooling and annealing, can be ground and polished to any desired surface figure or to any desired optical quality surface. If the glass article is a glass sheet or plate, the major opposing surfaces of the glass sheet can be ground to form a plate or sheet of the desired uniform thickness, and then polished to form smooth, planar surfaces.

Volatilization of halides can be quite high during melting, particularly where temperatures in the upper extreme of the melting range are employed. Thus, halide losses of about 20 to 60% are common. Besides being essential ingredients, halides also are a fining agent for the glass melts.

It will be appreciated that large melts of glass can be made in pots or continuous melting units in accordance with known commerical glass making practice. Where glass of optical quality is to be produced from commercial continuous melting tanks, the melt will be stirred in accordance with conventional practice. Volatilization of halides in such commercial melting practices can be held below 20% and with care, below 10%. Retention of halides can be further increased via melting in halogen-containing atmosphere.

The base glass compositions useful for preparing a HEBS glass article comprises in mole percent, 5–25% of one or more alkali metal oxides, 0.5–35% of one or more photosensitivity inhibitors (PI agents), one or more RS-Suppression agents (RSS agents) or mixtures thereof, 0–6% Cl, and 50–89% $SiO_2$, the composition containing PI agents when the composition contains Cl, and the composition containing RSS agents when the composition is free of Cl. The total quantity of constituents in the base glass composition shall equal 100 mole percent. All mole percents are based on a mole percent oxide basis except for Cl, F, Br and I which are based on a mole percent element basis.

The base glass composition contains, preferably, at least one of the following constituents, in mole percent, 0–about 20% MgO, 0–about 20% CaO, 0–about 20% ZnO, 0–about 15% $Al_2O_3$, 0–about 20% SrO, 0–about 20% PbO, 0–about 20% BaO, 0–about 25% $P_2O_5$, 0–about 35% $B_2O_3$ and/or 0–about 4% F, Br, I or a mixture thereof. Preferably the total mole percent of ZnO, $Al_2O_3$, CaO, MgO and/or PbO in the base glass is from about 2% to about 35%. Most preferably the base glass will contain ZnO, $Al_2O_3$ or a mixture thereof as an acid-durability-and-glass network strengthener ("ADAGNS" herein).

One of the preferred base glasses of the above composition will include, in mole percent, about 2%–about 20% ZnO, 0–about 10% $Al_2O_3$ and about 1.2–about 25% $TiO_2$. Another preferred base glass includes, in mole percent, about 3%–about 10% $TiO_2$ and about 60%–about 82% $SiO_2$.

The PI agents and RSS agents are selected from the oxides of the transition metals having 1 to 4 d-electrons in the atomic state. Preferred PI agents and RSS agents are $TiO_2$, $Ta_2O_5$, $ZrO_2$, $Nb_2O_5$, $La_2O_3$, $Y_2O_3$, $WO_3$ and a mixture thereof.

The alkali metal oxides are $Li_2O$, $Na_2O$, $K_2O$, $Rb_2O$ and $Cs_2O$. The preferred alkali metal oxides for the base glasses are $Li_2O$, $Na_2O$ and $K_2O$. Preferably the base glass contains at least two of the alkali metal oxides of $Li_2O$, $Na_2O$ and $K_2O$. When the glass contains $Li_2O$, $Na_2O$ and $K_2O$, the molar concentration ratio of $Li_2O$ and $Na_2O$ to $K_2O$ is preferably more than about 0.6. Preferably the glass contains about 10–20%, mole percent, that is, about 10 to about 20 mole percent, $Li_2O$, $Na_2O$, $K_2O$ or a mixture thereof and about 0.2–6%, mole percent, Cl.

Although the constituents of the anhydrous base glass compositions are identified as specific chemical oxides or elements pursuant to the practice of the glass art, it is to be understood that such identification is for convenience in accordance with the practice of the glass art. As those skilled in the glass art recognize, the chemical structure and coordination of all cations in glass are not known with complete certainty at present.

An especially preferred class of base glass composition useful for preparing a HEBS glass article comprise, in mole percent, about 12–18% $Li_2O$, $Na_2O$, $K_2O$ or a mixture thereof, about 3–10% $TiO_2$, 0–about 25% transition metal oxides, about 4–10% ZnO, about 0.5–5% $Al_2O_3$, about 0.4–3% Cl, and about 65–75% $SiO_2$.

The glass composition can include, in mole percent, 0–about 15% MgO, 0–about 15% CaO, 0–about 15% SrO, 0–about 15% BaO, 0–about 15% PbO, 0–about 15% $B_2O_3$ and/or 0–about 3% F, Br, I or a mixture thereof. Preferably the base glass contains at least 1 mole percent $Li_2O$.

A most preferred base glass composition useful for preparing HEBS glass articles comprises, in mole percent, about 13.0–15.5% of a mixture of $Li_2O$, $Na_2O$ and $K_2O$; about 4–5% $TiO_2$; about 6.5–7.5% ZnO; about 1–2% $Al_2O_3$; about 0.7–3% Cl and about 69–72% $SiO_2$. Most preferably, the base glass composition contains an amount of Cl equivalent to the Cl saturation point or value of the melt of the base glass composition.

It has been found that the base glass composition has a profound effect on the properties of the HEBS glass articles (ion-exchanged products) regarding particularly E-beam sensitivity and the insensitivity and/or inertness to actinic radiations, and that addition or subtraction of certain constituents even in small concentrations often alter many or all of the properties of the HEBS glass articles.

It has been determined that the production of HEBS glass articles (E-beam sensitive glass articles) exhibiting insensitivity and/or inertness to uv radiation and longer wavelengths, involves a complex combination of relationships among various components of the base glass composition, the ingredients of the ion-exchange solution and the conditions of the ion-exchange reactions. Nevertheless, there exists a very wide range of glass compositions in the general composition fields of alkali metal silicate glasses that are operable for the products of the present invention.

It has been found that the sensitivity to electron beams as well as the insensitivity and/or inertness to actinic radiation of the ion-exchanged products are strongly dependent upon the ingredients of the aqueous ion-exchange solution, in particular, the concentrations of silver ion, hydrogen ion and cuprous oxide.

The HEBS glass articles are prepared from the glass composition useful for preparing a HEBS glass article by treating the glass composition with a silver salt-containing material at a temperature sufficient to effect an ion exchange reaction between the silver ions in the silver salt-containing material and the alkali metal ions in the surface layer of the glass composition to substitute silver ion for the alkali metal ions and diffuse alkali metal ions out of the surface layer. The ion exchange reaction is continued for a period of time sufficient to have the ion-exchange reaction proceed to a depth of at least 0.1 micrometer into the surface of the glass composition to produce a HEBS glass article having a body portion composed of the base glass composition and an integral ion-exchange surface layer composed of an ion-exchanged glass of said glass composition comprising silver ions and/or silver salts, and silanol and/or water in a concentration greater than about 0.01% by weight $H_2O$. The concentration of the alkali metal oxides in the ion-exchange glass of the integral ion-exchange surface layer is less than the concentration of the alkali metal oxides in the glass composition of the body portion.

Hydration and/or an exchange of $H^+$ and/or $H_3O^+$ ions for alkali metal ions in at least the surface of the glass article is expected to take place when the ion exchange reactions are carried out in an aqueous solution containing $Ag^+$ ions.

In cases where other ingredients such as cupric and/or cuprous oxide are included in an aqueous ion exchange solution, additional reactions that exchange the alkali metal ions in the surface layer of the parent silicate glass by the other cations in the aqueous solution are also expected to take place, but to a lesser extent than with $Ag^+$ ion.

The ion-exchange reactions can be carried out as follows. The glass articles are immersed into an aqueous ion-exchange solution containing $Ag^+$ ions and other ingredients, the glass articles together with the aqueous solution are sealed in an autoclave, and heated to a temperature sufficient to effect an ion-exchange reaction between the silver ions in the aqueous solution and the alkali metal ions in the surface layer of the glass, usually above 200° C., and held at the reaction temperatures for a duration of more than about 1 minute. Thereafter, the HEBS glass articles are removed from the autoclave and washed with distilled water.

The concentration of silver ions in the aqueous ion-exchange-solution operable in the present invention is found to range from less than $10^{-3}$ mole/liter up to the concentration of a saturated $AgNO_3$ aqueous solution, and the concentration of hydrogen ion/hydronium ion is operable from $10^{-6}$ to more than 3 moles per liter of the aqueous ion-exchange solution. The optimum concentration of silver ions in the aqueous ion-exchange solution, in general, increases with the concentration of hydrogen ion for preparing HEBS glass articles. The hydrogen ions are added to the aqueous ion-exchange solution in the form of one or more acids, such as $HNO_3$, $H_2SO_4$, HCl, $HClO_3$, $HClO_4$, acetic acid, and the like.

The concentration of $Ag^+$ ions in the ion-exchanged surface layer can be varied from practically zero up to more than 50% by weight of $Ag_2O$ through various combinations of the concentrations of $Ag^+$ ions and $H^+$ ions in the aqueous ion-exchange solution. One way to ensure a large concentration of $Ag^+$ ions within an ion-exchanged surface layer is to utilize an aqueous ion-exchange solution having a large concentration of $Ag^+$ ions, e.g., greater than about 100 g $AgNO_3$/liter of the aqueous solution. Another way to ensure a large concentration of $Ag^+$ ions within an ion-exchanged surface layer is to employ an aqueous ion-exchange solution having a large mole ratio of $[Ag^+]:[H^+]$, e.g., in excess of 10 which is readily obtainable by buffering the aqueous solution at a pH value in excess of about 2 with a buffering agent.

Cuprous oxide can be advantageously added to the aqueous ion-exchange solution to cause the solution to buffer at a desirable pH, particularly in the pH range of 1 to 3, and most effectively in the pH range of 2 to 3. It has been further determined that the inclusion of cuprous and/or cupric ions in the aqueous ion-exchange-solution can have some effect on the E-beam exposure-induced coloration and the E-beam sensitivity of the HEBS glass articles.

Ion-exchange temperatures in excess of 150° C. up to the softening point of the ion-exchanged surface glass layer and/or up to the strain point of the anhydrous base glass are operable. The duration of the ion-exchange reaction required to obtain a thin ion-exchanged surface layer, e.g., less than about 3 micrometers, decreases with an increasing temperature, and can place a practical upper limit on the temperature of the ion-exchange reactions because at a sufficiently high temperature the desired extent of the reaction might be completed within a matter of seconds. The temperature and duration of the ion-exchange reaction effect the depth of penetration of the ion-exchange reaction into the body portion of the glass article.

As a matter of convenience, the ion-exchange reactions of the present invention will preferably be carried out in an autoclave, because such an apparatus permits relatively easy control of the ion-exchange temperature, pressure, and atmosphere. To prevent the water in the aqueous ion-exchange solution from evaporating off during the ion-exchange reaction when conducted at elevated temperatures, the pressure of the autoclave can be maintained at the saturated vapor pressure of the ion-exchange solution or higher. Very high pressures can be utilized, although they are not required. Inert and oxidizing gases including $Cl_2$, $N_2$, air, $O_2$ and Ar can be advantageously added, usually at room temperature, to the vapor phase above the aqueous ion-exchange solution in the autoclave.

The filling factor, which is herein defined as the fractional volume of the autoclave occupied by the aqueous ion-exchange solution at room temperature, is another ion-exchange reaction parameter. The maximum allowable filling factor which is herein defined as the filling factor at which the volume of the vapor phase in the autoclave diminishes at the ion-exchange temperature, should never be approached for safety reasons. However, when the filling factor is kept excessively below the maximum allowable filling factor, the concentration of the ingredients in the aqueous ion-exchange solution, at elevated temperatures can be significantly different from the concentration at room temperature.

Exemplary compositions 37 and 46 of Table I of Example 1, in the form of glass plates with ground and polished surfaces, 2 mm in thickness, were ion exchanged at 320° C. for 30 minutes in an aqueous solution containing 200 g $AgNO_3$+55.6 g $Cu(NO_3)_2$+200 g $LiNO_3$+36.7 cc of 16N $HNO_3$+2.2 g silica gel/liter of the aqueous solution. The HEBS glass articles (ion-exchanged glass plates) produced are colorless and have a transmittance of 90.6% throughout the visible and near infrared spectral range.

Examination under a microscope showed that the surface quality of the ion-exchanged glass plates remain substantially the same as before the ion-exchange reaction. The fringe patterns for each surface observed through a contacting test flat were substantially the same before and after the plates were ion exchanged. No distortions of the surface figure of the ion-exchanged glass plates are detectable as a result of the ion-exchange treatment.

Portions of said ion-exchanged glass plates of glass composition 46 of Table I ("Plates 46" herein) were exposed to radiation of mercury g-line at 436 nm for a duration of 25 hours at an intensity level of 105 $mw/cm^2$. The transmittance of visible light through the blue light exposed area remained substantially constant at a value of 90.6% before and after the blue light exposure. Through exposures to white light having an intensity of 1.2 watt/$cm^2$, it was shown that ion-exchanged products of the exemplary glass composition 46 of Table I are insensitive and/or inert to radiation in the entire spectral ranges of visible light and longer wavelengths.

Plates 46 were exposed to focused electron beams of a JEOL JSM 35C Scanning Electron Microscope (SEM). A focused electron beam having a current of $10^{-7}$ amperes was employed at four levels of accelerating voltages 15, 20, 25, and 35 kv, to raster scan square areas of 1.2 mm $\times$ 1.2 mm. A series of E-beam exposures corresponding to charge densities ranging from $10^{-6}$ to $10^{-3}$ coulomb/$cm^2$ at each accelerating potential was done through the variation of exposure-durations. Uniformly darkened squares, 1.44 $mm^2$ in area, of magenta color varying in hue and intensity ranging in the order of increasing E-beam dosages from light reddish magenta to dark reddish magenta to reddish black were observed as soon as the sample plate was taken out of the vacuum chamber of SEM. Apparently, the sample was darkened instantaneously upon exposure to the high voltage electron-beam, and optical densities in excess of were obtained without resorting to any subsequent chemical or physical development steps.

A conductive coating, e.g., about 100 Å coating of gold, about 500 Å coating of carbon, or the like, was deposited on the surfaces of the HEBS glass article to prevent static charge build up during E-beam exposure.

After the removal of the conductive coating from the E-beam written Plates 46, optical densities of the E-beam darkened areas pf Plates 46 were measured as a function of wavelength from 300 nm to 900 nm using a Carrier 219 uv-visible spectrophotometer which is marketed by Varian Associates, Inc. FIG. 1 represents the spectral absorption curves before and after being darkened by the focused electron beam having a 35 kv accelerating voltage. The charge density impinging on the sample areas whose spectral absorption represented by curves A, B, C and D are 0, $3.2 \times 10^{-5}$, $1.6 \times 10^{-4}$ and $3.2 \times 10^{-4}$ coulomb/$cm^2$ respectively.

The charge density was calculated as the product of the beam current and an exposure duration divided by the area which is exposed with SEM. The actual duration of E-beam exposure on the uniformly darkened area is not known. One source of the uncertainty arises from the fact that there is always on the darkened area an edge which is very dark, even when the area is only very lightly exposed. The duration when SEM is on exposure mode, i.e., the apparent exposure duration, is regarded as the exposure duration in the calculation of the exposure dosage. The actual exposure duration by E-beam on the uniformly darkened square area may be a factor of 1 to 10 less than the apparent exposure duration which is employed in the calculation of the charge density. As a result, the values of the charge densities reported (including those of FIGS. 1 to 8) herein are too high by a constant, but unknown factor, of 1 to 10. In other words, the actual sensitivity of HEBS glass articles is more sensitive by a factor of 1 to 10 than the apparent sensitivity indicated in FIGS. 1 to 8.

An E-beam darkened area of one of the Plates 46 having an optical density of 2.04 at 436 nm was exposed to mercury line at 436 nm for a duration of 83 hours at an intensity level of 14.7 mw/$cm^2$, the optical density at the probing wavelength 436 nm was not changed by the blue light exposure. The spectral absorption curve and the color of the E-beam darkened area in Plates 46 are unchanged by the exposure to the actinic radiation at 436 nm. Through exposures to white lights from a mercury arc, as well as from tungsten halogen lamps, the E-beam darkened areas in Plates 46 are inert to radiation in the entire spectral ranges from near ultraviolet throughout visible and longer wavelengths.

"Characteristic curves of E-beam darkening" are herein defined as the plots of the information bearing optical densities at a given wavelength, as a function of charge densities in log scale. "The information bearing optical density" is defined herein as the E-beam exposure-induced optical density, i.e., the net optical density which is obtainable from spectral absorption curves, such as those of FIG. 1, by subtracting the optical density, due mainly to reflection, of the unexposed area from the optical density of the E-beam exposed area. Thus the information bearing optical density is zero at nil dosage of E-beam exposures. The characteristic curves of E-beam darkening of Plates 46 at the wavelength of the absorption peak, at 436 nm and at 546 nm are illustrated by curve D of FIG. 4, curve C of FIG. 5 and curve B of FIG. 6, respectively.

Figure 2:
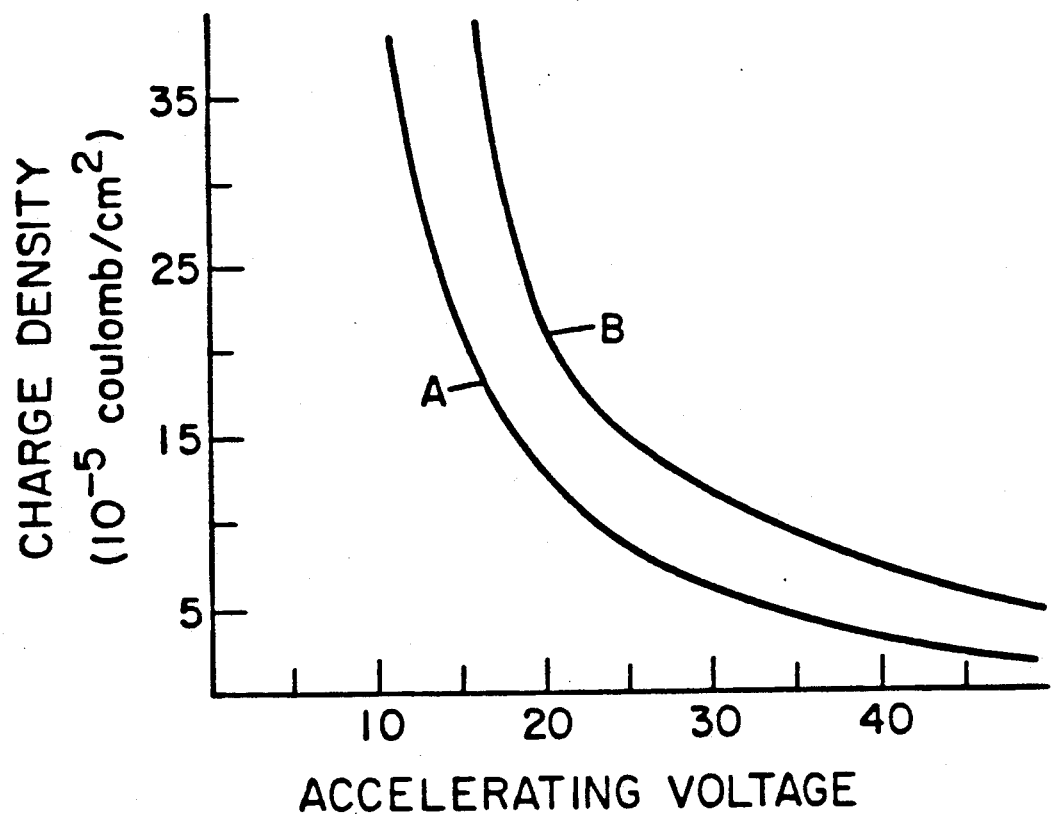
FIG. 2 graphically illustrates the required E-beam charge density to secure information-bearing optical density of 1.2 and 2.0 as a function of the accelerating voltage.

FIG. 2 illustrates the effect of the E-beam accelerating potential on the charge density that is required to secure a given optical density in Plates 46. The E-beam exposure-induced optical density at the wavelength of the absorption peak is shown in this figure as the variable parameter in going from curve A to curve B. Curves A and B of FIG. 2 represent the required charge densities to secure information-bearing optical densities of 1.2 and 2, respectively at various accelerating voltages.

The functional form of the voltage dependence, i.e., the shape of the curves such as those shown in FIG. 2, are functions of glass compositions, ingredients of ion exchange solutions and the conditions of ion-exchange reaction. Nevertheless, it is generally true that the E-beam sensitivity increases with the accelerating voltage up to at least about 35 kv.

The width of E-beam darkened lines was estimated from photomicrographs of isolated lines in Plates 46. The line width was about 1 micrometer. The dependence of line width on the accelerating voltages is expected, but the precision of the photomicroscopic measurements did not result in an unambiguous determination of submicrometer line widths.

The spectral absorption curves C and D of FIG. 1 have one absorption band, in the visible spectral range, centered around 510 nm with a band width of about 250 nanometers. Consequently, the E-beam exposed areas within Plates 46 absorb strongly the green portion of the visible light and transmit more in the red than in the blue portion of the visible light, and manifest themselves as reddish magenta to reddish black in color.

Figure 3:
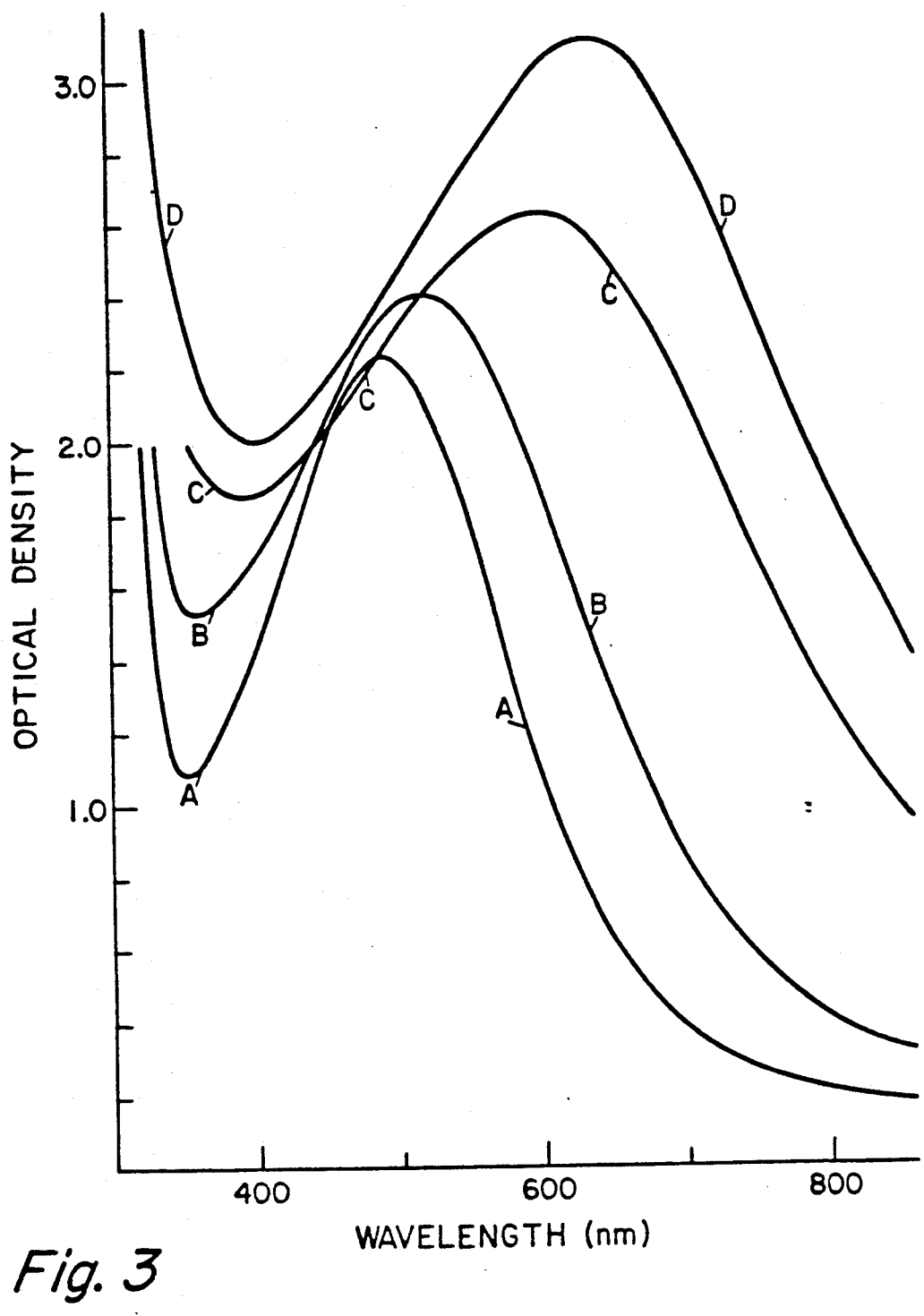
FIG. 3 graphically portrays the E-beam exposure-induced absorption curves of some of the HEBS glass articles and illustrates the variety of the E-beam exposure-induced colorations exhibited thereby.

FIG. 3 illustrates the E-beam exposure-induced absorption curves representing some of the various HEBS glass articles of the present invention and illustrates the variety of the E-beam exposure-induced colorations exhibited thereby.

Curve A of FIG. 3 represents the absorption spectrum of a 25 kv E-beam induced coloration exhibited by Plate 37C of Example 2 (an ion-exchanged plate of glass composition 37 of Table I of Example 1). Curve B of FIG. 3 illustrates the absorption spectrum of the 35 kv E-beam induced coloration displayed by Plate 41 of Example 2. Curves C and D of FIG. 3 depict the absorption spectra of the 35 kv E-beam exposure-induced colorations exhibited by plates 6 and 5, respectively, of Example 2. The E-beam induced colorations corresponding to curves A, B, C and D are red, magenta, violet gray and bluish black, respectively.

Figure 4:
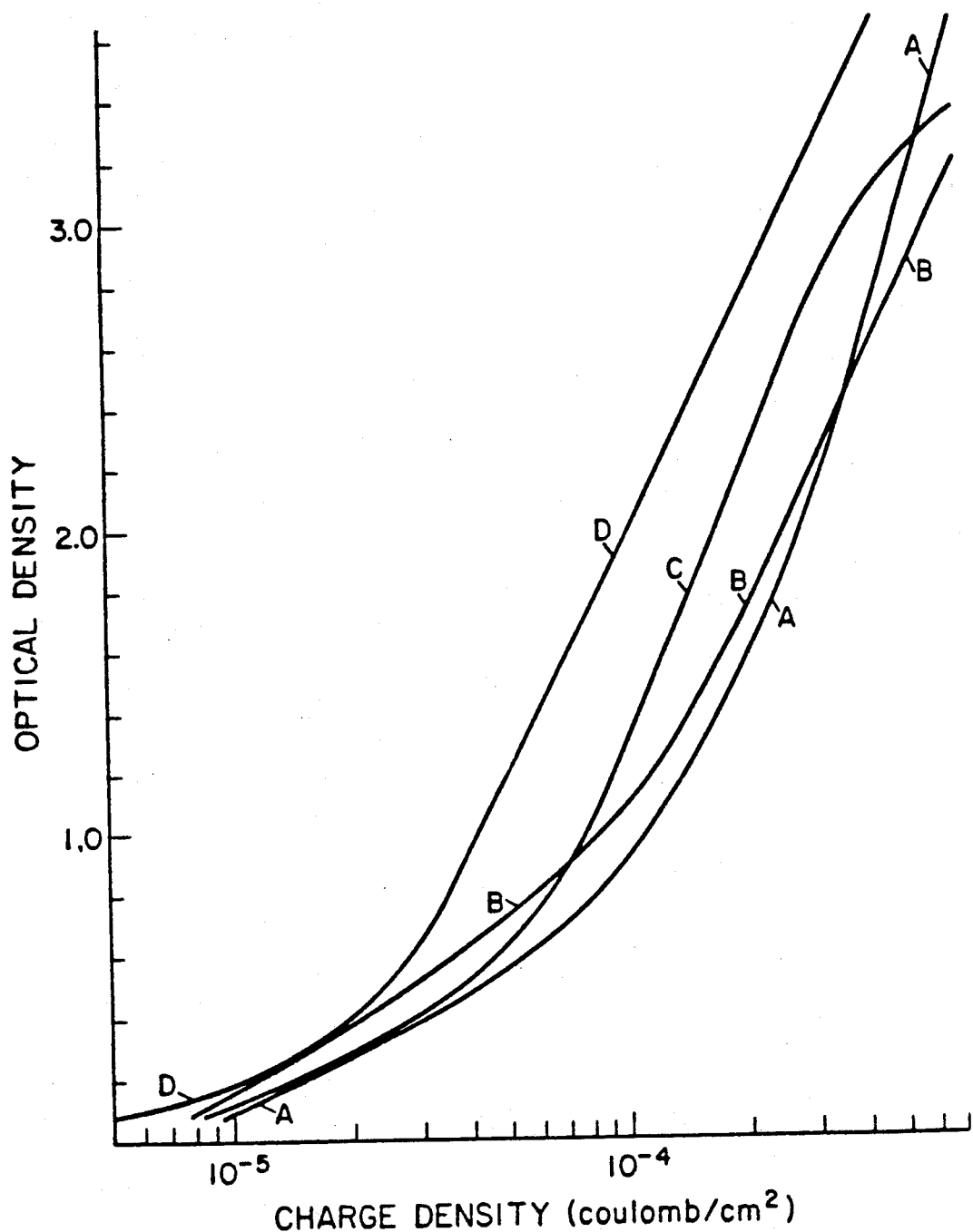
FIG. 4 graphically sets forth some of the general characteristic curves of E-beam darkening at the peak absorption wavelengths.

FIG. 4 depicts the general characteristic curves, of the E-beam exposure-induced absorption at peak wavelengths, displayed by some of the HEBS glass articles of the present invention after being darkened by electron beams with 35 kv accelerating potential.

Curve A of FIG. 4 represents the characteristic curve of Plate I of Example 2. The peak wavelength of the E-beam exposure-induced absorption within the ion-exchanged surface layer of Plate 1 was red shifted from 560 nm to 590 nm, as the E-beam exposure-dosage was increased from $8 \times 10^{-5}$ to $6.4 \times 10^{-4}$ coulomb/cm$^2$.

Curves B of FIG. 4 represent the characteristic curve of Plate 2 of Example 2. The peak wavelength of the E-beam exposure-induced absorption was red shifted from 570 nm to 612 nm, as the E-beam exposure dosage was increased from $8 \times 10^{-5}$ to $6.4 \times 10^{-4}$ coulomb/cm$^2$.

Curve C and D of FIG. 4 represents the characteristic curves of Plates 37 and 46, respectively, of Example 2. The peak wavelength of the E-beam exposure-induced absorption within the ion-exchanged surface layer of the plates is blue shifted from 528 nm to 510 nm for the exemplary composition 37 as the E-beam dosage increases from $8 \times 10^{-5}$ to $6.4 \times 10^{-4}$ coulomb/cm$^2$, and is blue shifted from 524 nm to 510 nm for Plate 46 as the E-beam dosage increases from $3.2 \times 10^{-5}$ to $3.2 \times 10^{-4}$ coulomb/cm$^2$.

Since the characteristic curves of E-beam exposure-induced absorption at the wavelength of He-Ne lasers, at those of semiconductor lasers, at 405 nm and at 436 nm are important parameters of the HEBS glass article for many applications, FIGS. 5, 6, 7 and 8 set forth some of the characteristic curves at these wavelengths.

Figure 5:
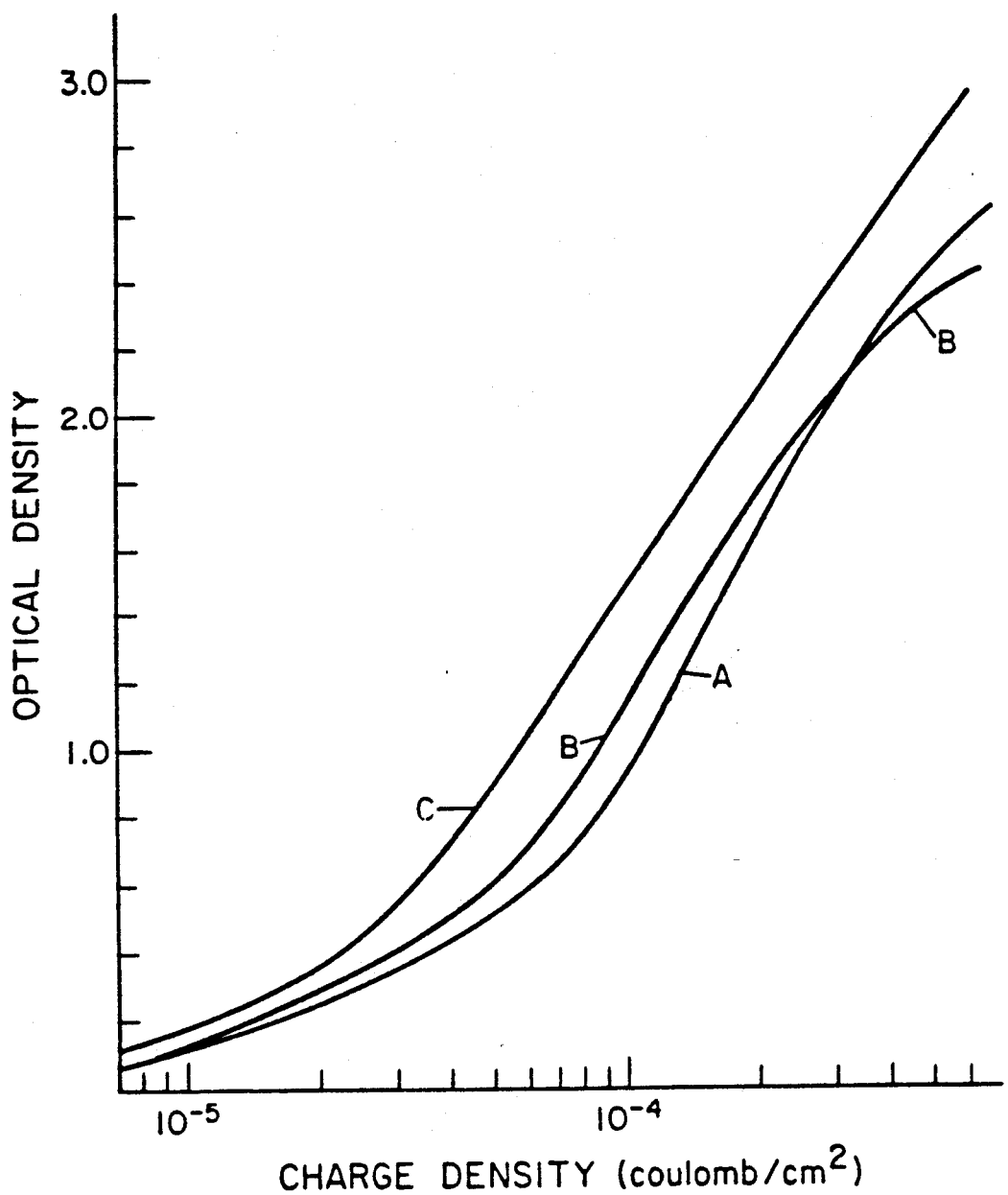
FIG. 5 graphically reports some of the general characteristic curves of E-beam darkening at 436 nm.

FIG. 5 illustrates some of the general characteristic curves of the E-beam exposure-induced absorption at 436 nm, displayed by the ion-exchanged products of the present invention after being darkened by 35 kv E-beams. Curves A, B and C of FIG. 5 represent the characteristic curves of Plates 37, 37B and 46, respectively, of Example 2.

Figure 6:
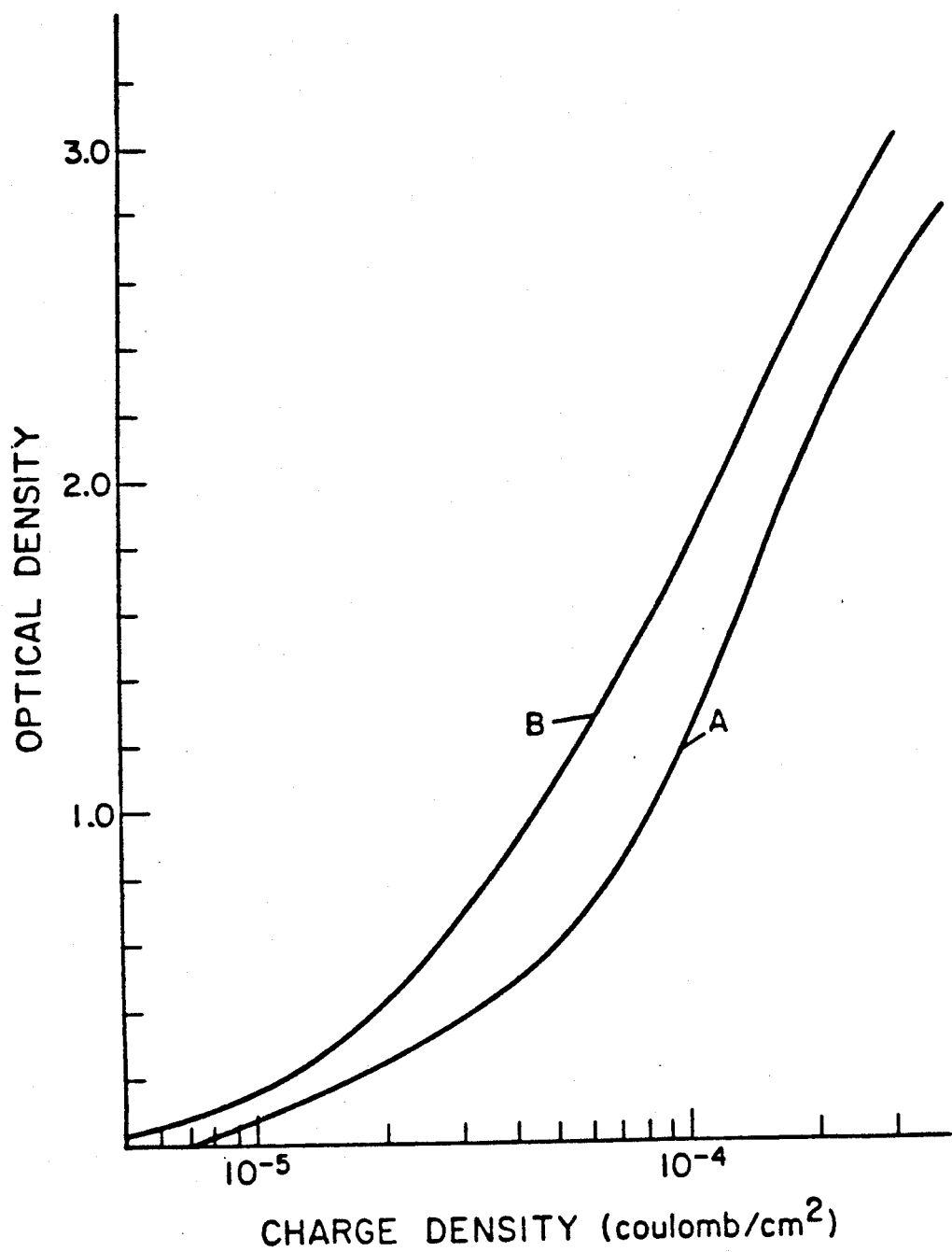
FIG. 6 graphically represents some of the general characteristic curves of E-beam darkening at 546 nm.

FIG. 6 illustrates some of the general characteristic curves of the E-beam exposure-induced absorption at 546 nm, displayed by the HEBS glass articles after being darkened by 35 kv electrons. Curves A and B of FIG. 6 represent the characteristic curves of Plates 37 and 46, respectively, of Example 2.

Figure 7:
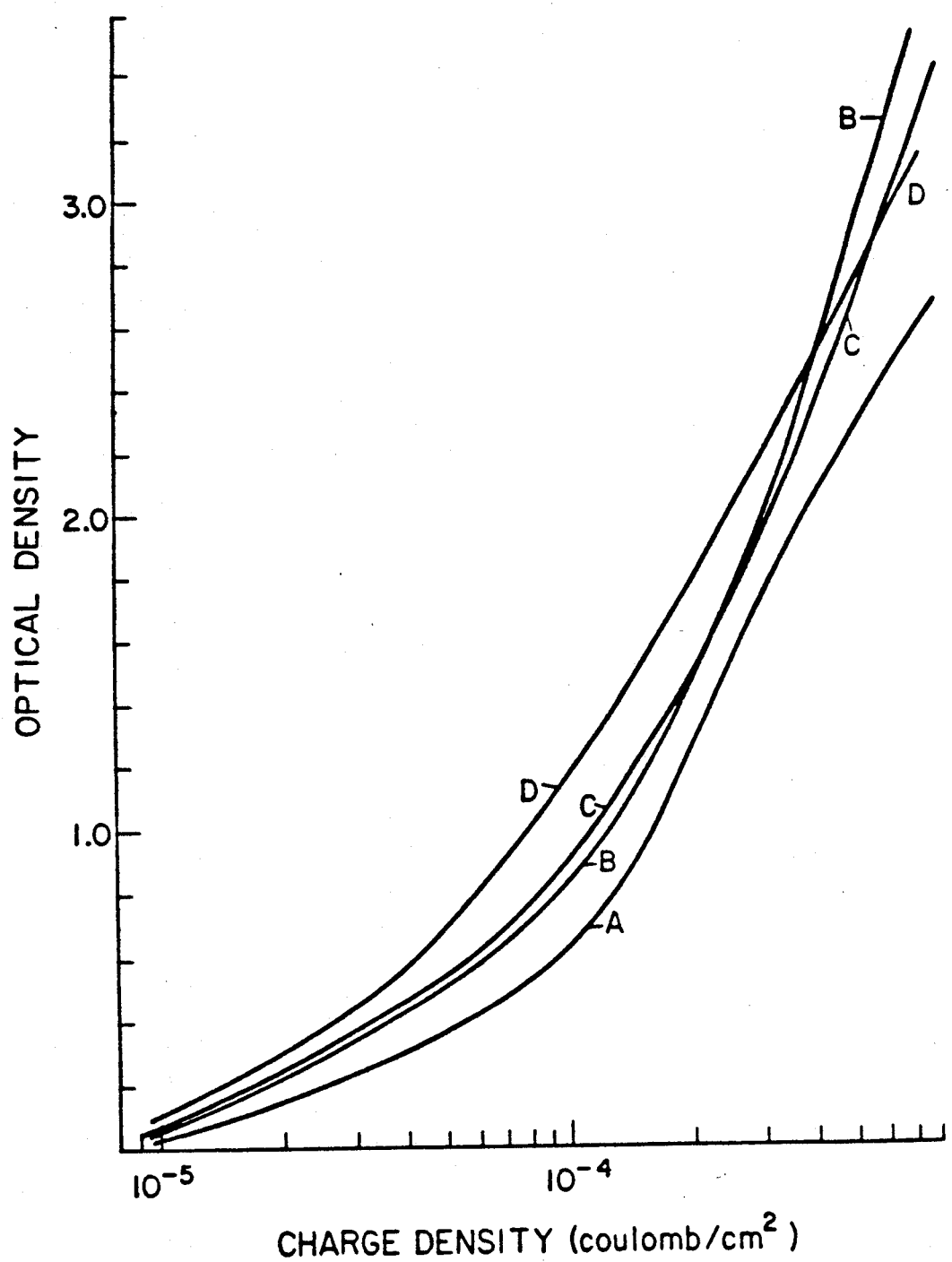
FIG. 7 graphically depicts some of the general characteristic curves of E-beam darkening at 632 nm.

FIG. 7 depicts some of the general characteristic curves of the E-beam exposure-induced absorption at 632 nm displayed by the ion-exchanged products of the present invention after being darkened by 35 kv electrons. Curves A, B, C and D of FIG. 7 represent the characteristic curves of Plates 6, 2A, 5 and 3, respectively, of Example 2.

Figure 8:
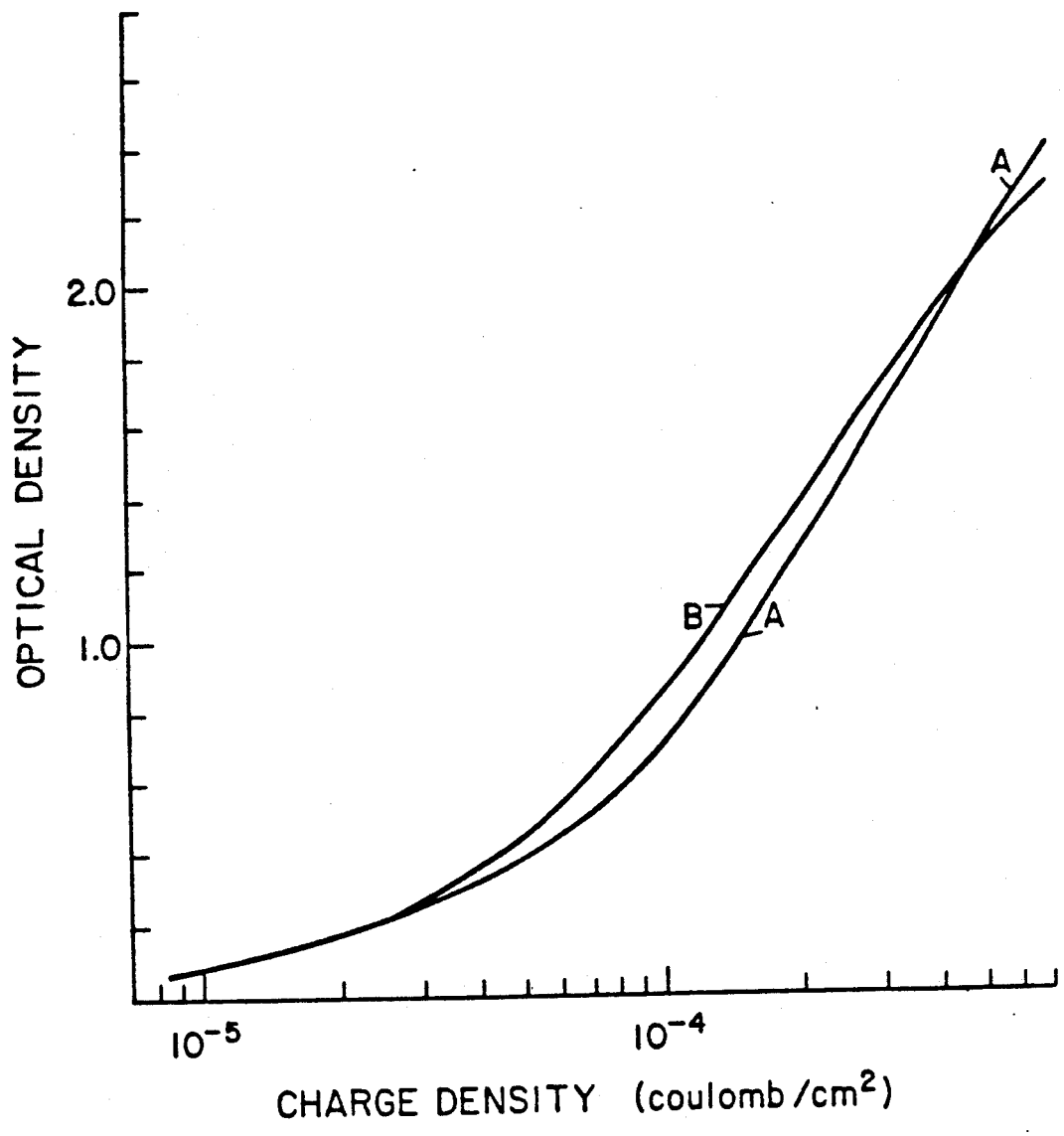
FIG. 8 graphically describes some of the general characteristic curves of E-beam darkening at 750 nm.

FIG. 8 sets forth some of the general characteristic curves of the E-beam exposure-induced absorption at 750 nm, displayed by the ion-exchanged products of the present invention after being darkened by 35 kv electrons. Curves A and B of FIG. 8 represent the characteristic curves of Plates 5 and 3 of Example 2.

Prior to June 24, 1983, the filing date of the parent application, U.S. patent application Ser. No. 507,681, crucible melts of less than one hundred gram glass batches were typically employed in the laboratory to produce the parent glass articles of the HEBS glasses that were employed in the generation of data in this application. It has since been found that the retention of chloride in the glass melts can be increased substantially, e.g., up to a factor of six has been observed, in going from a small crucible melt to a large continuous commercial melter. Such a high chlorine retention was also observed in larger crucible melts. HEBS glasses prepared from base glasses with a higher chloride retention, i.e., with a larger concentration of chloride are in general more sensitive to high energy beams, high voltage electron beams in particular. A given value, e.g., a value of 1.2, 2.0, 3.0 or 3.5, of the E-beam exposure-induced optical density can in general be confined within a thinner IIES layer that is prepared from the precursor glass having a higher chloride concentration. As a result, a large value of the E-beam induced optical density, e.g., in excess of 3.0 in at least a spectral portion of the E-beam exposure-induced absorption band, which was obtained in a low Cl-containing HEBS glass upon exposure to 35 kv electron beams, can be obtained in a high Cl-containing HEBS glass upon exposure to E-beams having substantially lower accelerating voltages, e.g., less than about 20 kv, see for example, FIGS. 13 and 14 of Example 17.

It has been found that the plot of the required E-beam charge density to secure a predetermined information-bearing optical density of e.g., 1.2, 2.0 and 3 at a predetermined wavelength as a function of the accelerating voltage of E beams, deviates from the functional form of FIG. 2, when the glass plate is an HEBS glass having a thinner IIES layer. The curve representing the plot of the required charge density vs. accelerating voltage is typically concaved upward and exhibits a minimum charge density that is required to obtain the predetermined optical density at an optimum accelerating voltage which depends on the thickness of the IIES layer that was prepared from a precursor glass containing in particular a high concentration of chloride.

Throughout the work presented in this application, the wavelength dependence of the information bearing optical density, e.g., the absorption spectra of E-beam darkened HEBS glasses was measured quantitatively with spectrophotometers in at least the visible spectral range. However, when an optical density measurement was done at a single wavelength, e.g., at 436 nm, the experimental set up was assembled temporarily for the particular measurement at the particular time using a light source, a wavelength selective transmission filter and a photo-detector. The single wavelength measurement was a qualitative measurement since the accuracy was not determined and the reproducibility was not better than ±10%.

RS-Suppression Agents (RSS Agents)

It has been found that ground and polished glass plates in the glass composition fields of alkali metal silicates with or without halides in the batch of the glass melts are in general yellow colored spontaneously upon ion-exchange reactions in an aqueous solution containing, by liter, 20 g $AgNO_3$ +2 cc or less of 16N $HNO_3$ with or without other ingredients, such as $Cu_2O$, $Cu(NO_3)_2$, $LiNO_3$ and/or silica gel in the aqueous ion-exchange solution, as long as the temperature of the ion-exchange reaction is sufficiently high to cause a finite rate of the ion-exchange reactions. The spontaneous yellow coloration of the ion-exchanged glasses is intensified from a light yellow tint to a bright gold color to brown with an increasing pH value and/or an increasing concentration of $Ag^+$ ions of the aqueous ion-exchange solution. The identical phenomenon of the spontaneous yellow coloration upon ion-exchange reactions is observed, when glass samples within the glass composition fields of alkali metal silicates are ion exchanged in an aqueous solution containing, by liter, 200 g $AgNO_3$ and 70 cc or less of 16N $HNO_3$, with or without the other ingredients, such as those set forth above.

Figure 9:
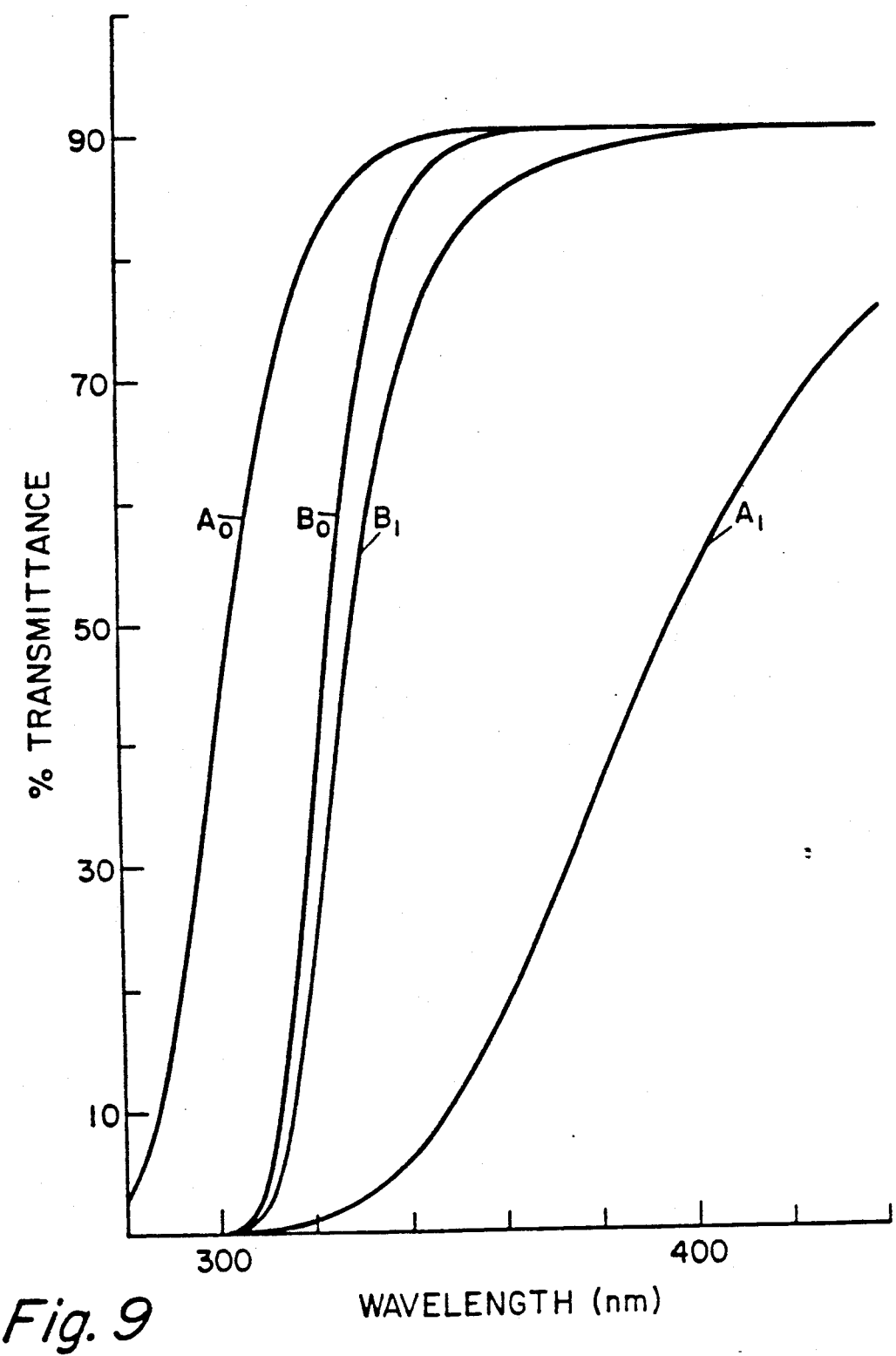
FIG. 9 graphically portrays the role of RS-Suppression agents.

Representative transmission-spectra demonstrating the spontaneous yellow coloring phenomenon are set forth graphically by curves $A_0$ and $A_1$ of FIG. 9. Curve $A_0$ of FIG. 9 represents the visible spectrum exhibited by a parent anhydrous glass plate, 2 mm in thickness, of the exemplary glass composition 25 of Table I of Example 1. Curve $A_1$ of FIG. 9 represents the visible spectrum displayed by the 2 mm glass plate of Plate 25 of Example 2.

The absorption edge of the exemplary glass composition 25 of Table I is red shifted from curve $A_0$ to curve $A_1$ upon ion exchange with an aqueous solution containing $Ag^+$ ion and $HNO_3$. To quantify the amount of spontaneous red shift upon ion exchange, RS is herein defined as the difference of wavelengths in nm between the wavelength $\lambda_{IE}$ of the ion-exchanged glass plate at 50% transmittance and the corresponding wavelength $\lambda_{AN}$ of the parent (non ion-exchanged) anhydrous glass plate at 50% transmittance, and can be expressed mathematically:

$$RS = \lambda_{IE} \text{ (at 50\% T)} - \lambda_{AN} \text{ (at 50\% T)}$$

Plates 25 and 26 of Example 2 prepared by ion exchange of exemplary glass compositions 25 and 26 of Table I of Example 1 exhibit RS values of 92 nm and 166 nm, respectively. The anhydrous glass plate is a glass plate of the base or parent anhydrous glass composition.

A spontaneous yellow coloration occurs when the ion-exchanged silver exists in a reduced state in glass, e.g., in the form of silver metal particles which have an absorption band in the spectral range of near uv to blue light. The red shift of the absorption edge is a manifestation of the spontaneous reduction of ion-exchanged $Ag^+$ ions into metallic silver. Consequently, the value of RS is a quantitative measure of the amount of silver, in an ion-exchanged surface layer, which is reduced spontaneously upon being ion exchanged into the glass. The red shift of the absorption edge is not desirable in two respects. 1) The transmittance of the ion-exchanged glasses are lessened in the wavelength ranges of ultraviolet, blue light, and even longer wavelengths. 2) The concentration of $Ag^+$ ions in the ion-exchanged glass, which are reducible to silver metal particles and/or specks in glass by high energy beams, is diminished. In other words, the available information bearing optical density in the ion-exchanged products diminishes.

Although the addition of heavy metal ions and/or transition metal ions to the glass batch of alkali metal silicate glasses in general causes a red shift of the absorption edge of the resulting anhydrous glasses relative to the absorption edge of the heavy metal-free glasses, I have found that RS values are substantially reduced, when glass batches of parent anhydrous glass compositions include at least one oxide selected from the oxides of the transition metals which have less than half-filled atomic d-orbitals, i.e., one to four d-electrons in an atomic state.

Oxides of transition metals having one to four d-electrons in an atomic state include $Sc_2O_3$, $TiO_2$, $V_2O_5$, $Y_2O_3$, $Ta_2O_5$, $Nb_2O_5$, $La_2O_3$, $HfO_2$, $ZrO_2$, and $WO_3$. These oxides will be referred to herein as RS-Suppression agents or as RSS agents. The effectiveness of suppressing RS values differs a great deal among these oxides. The relative effectiveness among these oxides as a RS-Suppression agent depends to a large extent on the composition field of the base glass as well as on the ion-exchange-parameters, including concentrations and ingredients of the aqueous ion-exchange solution as well as temperature and duration of the ion-exchange reactions.

Within the glass composition fields of alkali metal oxide-ZnO-$Al_2O_3$-$SiO_2$-Cl, particularly effective RSS agents include $TiO_2$, $Ta_2O_5$ and $ZrO_2$; whereas $Y_2O_3$ and $Nb_2O_5$ have only marginal effects and are not effective RSS agents, $V_2O_3$ does not function as an RSS agent and is excluded from the list of RSS agents for this particular glass composition field.

Examples of diminishing RS values through the use of $TiO_2$, $Ta_2O_5$ and $ZrO_2$ are recorded in Tables A and B to illustrate the effects of RSS agents.

It has been determined that the RS values can be substantially diminished within the alkali metal silicate base glass compositions by the addition of at least one RSS agent to the glass melt, i.e., adding an RSS agent to the batch melt of the alkali metal silicate base glass composition. For example, the values of RS of Plates 25, 6A, 7 and 8 (see Table A) decrease from 92 nm to 8 nm to 3 nm and to 2 nm, as the concentration of $TiO_2$ on the mole percent basis in the glass melt increases from 0% to 4.4% to 5.9% and to 7.4%. The exemplary glass compositions 1, 21, 9, 10 and 11 of Plates 1A, 21, 9, 10 and 11 of Example 2 are substantially identical in the proportions, in mole percent, of the batch components $Na_2O$, $K_2O$, $ZnO$, $Al_2O_3$, $SiO_2$ and Cl and contain 1.5% $TiO_2$. The values of RS for Plates 1A, 21, 9, 10 and 11 decrease further from 16 nm (the RS value of Plate 1A, see Table B) to 4 nm due to the addition of a second RSS agent, 1% $ZrO_2$, and decrease further from 16 nm to 9 nm to 7.5 nm and to 2.25 nm (see Table B) due to the addition of a second RSS agent, 0.27%, 0.54% and 0.80% of $Ta_2O_5$, respectively, in the glass melt batches.

Plates 4, 22, 12, 13A and 14 are substantially identical in the proportions of the batch components, in mole percent, $Li_2O$, $Na_2O$, $K_2O$, $ZnO$, $Al_2O_3$, $SiO_2$ and Cl and contain 1.5% $TiO_2$. The values of RS for Plates 4, 22, 12, 13A and 14 of Example 2 decrease further from 14.5 nm to 4 nm (see Table B) due to the addition of a second RS-Suppression agent, 1% $ZrO_2$ (Plate 22), and decrease further from 14.5 nm (the RS value of Plate 4, see Table B) to 9.5 nm to 8 nm and to 7 nm due to the addition of a second RSS agent 0.27%, 0.54% and 0.81% of $Ta_2O_5$, respectively, in the glass melt batches of the exemplary glass composition for Plates 12, 13A and 14, respectively.

Curves $B_0$ and $B_1$ of FIG. 9 depict the transmittance curves of a glass plate 2 mm thick of the exemplary glass composition 15 of Table I of Example 1 before and after being ion exchanged as set forth in Example 2 to prepare Plate 15. The beneficial effect of the addition of RSS agents (1.6% $TiO_2$ and 1.1% $Ta_2O_5$) is graphically displayed in FIG. 9, in which the red shift of curve $B_1$ from curve $B_0$ is compared with the red shift of curve $A_1$ from curve $A_0$, transmittance curves of glass plates of Plate 25 of Example 2 and exemplary glass composition 25 of Table I of Example 1, respectively. As is also illustrated in FIG. 9, the transmittance values of Plate 15 are 86.3%, 92% and 92% at the wavelengths of 365 nm, 405 nm and 436 nm, respectively (see Curve $B_1$). In comparison, the transmittance values of Plate 25, which has been identically ion exchanged, are 24%, 58% and 74% at the wavelengths of 365 nm, 405 nm and 436 nm, respectively (see Curve $A_1$).

Table C records the transmittance values at 365 nm displayed by Plates 1B, 2C, 3B, 9A, 11A, 21A, 4A, 5B, 6C, 12A, 14A and 22A of Example 2 prepared from the exemplary glass compositions 1, 2, 3, 9, 11, 21, 4, 5, 6, 12, 14 and 22 of Table I of Example 1. Table C also recites for comparison the transmittance values at 365 nm exhibited by Plates 25 and 26 of Example 2, the exemplary glass compositions of which contain no RSS agents.

The exemplary glass compositions 26, 1, 2, 3, 21, 9 and 11 of Example 1 are alkali metal silicate glasses in the sub-field of glass composition $Na_2O$-$K_2O$-$ZnO$-$Al_2O_3$-$SiO_2$-Cl containing, with the exception of the composition 26, in addition at least one of the three RSS agents $TiO_2$, $Ta_2O_5$ and $ZrO_2$. The transmittance values (see Table C) of the corresponding ion-exchanged glasses (Plates 26, 1B, 2C and 3B) at 365 nm are improved from 0% to 77.5%, to 83.3% and to 82.2% due to the addition of 1.5%, 3% and 4.4% on the mole percent oxide basis of $TiO_2$, respectively, in the glass melts. The transmittance values of the ion exchanged glasses at 365 nm are further improved from 77.5% (the transmittance value of Plate 1B) to 85.5% by the addition of a second RSS agent, 1 mole percent $ZrO_2$, and further increase from 77.5% to 81.7% and to 85.3% by the addition of a second RSS agent, 0.27 mole percent and 0.8 mole percent $Ta_2O_5$, respectively.

The corresponding effects of $TiO_2$, $Ta_2O_5$ and $ZrO_2$ on the transmittance values of $Li_2O$-$Na_2O$-$K_2O$-$ZnO$-$Al_2O_3$-$TiO_2$-$Ta_2O_5$-$ZrO_2$-$SiO_2$-Cl glasses are illustrated in Table C as well by Plates 25, 4A, 5B, 6C, 22A, 12A and 14A. The transmittance values of these $Li_2O$-containing glasses are in general higher than lithium free glasses of similar compositions.

With the exception of the exemplary glass compositions 25, 26 and 27 which do not contain the three more effective RSS agents, $TiO_2$, $Ta_2O_5$ and $ZrO$, the transmittance values of all the other ion-exchanged glasses in Tables A, B and C are greater than 90% at wavelengths longer than about 400 nm.

TABLE A

| | Plate No. | | | | | | |
|---|---|---|---|---|---|---|---|
| | 25 | 26 | 6A | 7 | 8 | 13 | 15 |
| RS Value in nm | 92 | 166 | 8 | 3 | 2 | 10 | 4.5 |
| $TiO_2$ | 0 | | 4.4 | 5.9 | 7.4 | | |
| | Plate No. | | | | | | |
| | 17 | 18 | 19 | 20 | 23 | 24 | 27 |
| RS Value in nm | 11 | 4.5 | 8.8 | 9.8 | 2.8 | 8.5 | 52 |

TABLE B

| | Plate No. | | | | | | | |
|---|---|---|---|---|---|---|---|---|
| | 1A | 2B | 3A | 4 | 5A | 6B | 9 | 10 |
| RS Value in nm | 16 | 6.5 | 3 | 14.5 | 7 | 3 | 9 | 7.5 |
| $Ta_2O_5$ | 0 | | | 0 | | | 0.27 | 0.54 |
| $ZrO_2$ | 0 | | | 0 | | | 0 | 0 |
| | Plate No. | | | | | | | |
| | 11 | 12 | 13A | 14 | 16 | 21 | 22 | |
| RS Value in nm | 2.25 | 9.5 | 8 | 7 | 12 | 4 | 4 | |
| $Ta_2O_5$ | 0.8 | 0.27 | 0.54 | 0.8 | | 0 | 0 | |
| $ZrO_2$ | 0 | 0 | 0 | 0 | | 1.0 | 1.0 | |

TABLE C

| | Plates No. | | | | | | |
|---|---|---|---|---|---|---|---|
| | 1B | 2C | 3B | 9A | 11A | 21A | 4A |
| % T at 365 nm | 77.5 | 83.3 | 82.2 | 81.7 | 85.3 | 85.5 | 80.0 |
| $TiO_2$ | 1.5% | 3.0% | 4.4% | 1.5% | 1.5% | 1.5% | 1.5% |
| $ZrO_2$ | 0 | 0 | 0 | 0 | 0 | 1.0% | 0 |
| $Ta_2O_5$ | 0 | 0 | 0 | 0.27 | 0.8 | 0 | 0 |
| | Plates No. | | | | | | |
| | 5B | 6C | 12A | 14A | 22A | 25 | 26 |
| T at 365 nm | 85.0 | 84.4 | 83.5 | 88.0 | 88.0 | 24 | 0 |

TABLE C-continued

| | | | | | | | |
|---|---|---|---|---|---|---|---|
| $TiO_2$ | 3.0% | 4.4% | 1.5% | 1.5% | 1.5% | 0 | 0 |
| $ZrO_2$ | 0 | 0 | 0 | 0 | 1.0% | 0 | 0 |
| $Ta_2O_5$ | 0 | 0 | 0.27 | 0.8 | 0 | 0 | 0 |

Photosensitivity-Inhibitors (PI Agents)

The insensitivity and/or inertness of the HEBS glass articles of the present invention to radiations in the wavelength ranges from ultraviolet throughout visible light and longer wavelengths are of paramount importance to their usefulness as phototools and/or as optically retrievable, permanent recording media. It has been found that the inclusion of one or more oxides of transition metals having one to four d-electrons in their atomic state to the glass batches of parent anhydrous base glass compositions not only suppresses the spontaneous reduction of ion-exchanged $Ag^+$ ions in glass, but also eliminates the photosensitivity of the ion-exchanged surface glass layer and, at the same time, substantially increases its sensitivity to electron beams.

The Oxides of transition metals having one to four d-electrons in an atomic state include $Sc_2O_3$, $TiO_2$, $V_2O_5$, $Y_2O_3$, $ZrO_2$, $Nb_2O_5$, $La_2O_3$, $HfO_2$, $Ta_2O_5$ and $WO_3$. These oxides will also be referred to herein as photosensitivity inhibitors or PI agents. The effectiveness of inhibiting photosensitivity differs a great deal among these oxides. The relative effectiveness among these oxides as photosensitivity inhibitors depends to a large extent on the composition field of the base glass as well as on the ion-exchange parameters including concentrations and ingredients of the aqueous ion-exchange solution as well as temperature and duration of the ion-exchange reactions.

Within the glass composition field of alkali metal oxides-$ZnO$-$Al_2O_3$-$SiO_2$-$Cl$, the more effective PI agents include $TiO_2$, $Nb_2O_5$ and $Y_2O_3$.

Although both the RSS agents and PI agents are oxides of transition metals having one to four d-electrons, a particular oxide which functions as a RSS agent in a given glass composition may or may not function as a PI agent in the same glass composition. For example, within the glass composition fields of alkali metal oxide-$ZnO$-$Al_2O_3$-$SiO_2$-$Cl$, $TiO_2$ is an effective PI agent as well as an effective RSS agent, whereas $Nb_2O_5$ and $Y_2O_3$ are effective only as PI agents. On the other hand, $Ta_2O_5$ and $ZrO_2$ are effective RSS agents, but are not as effective in inhibiting photosensitivity.

Figure 10:
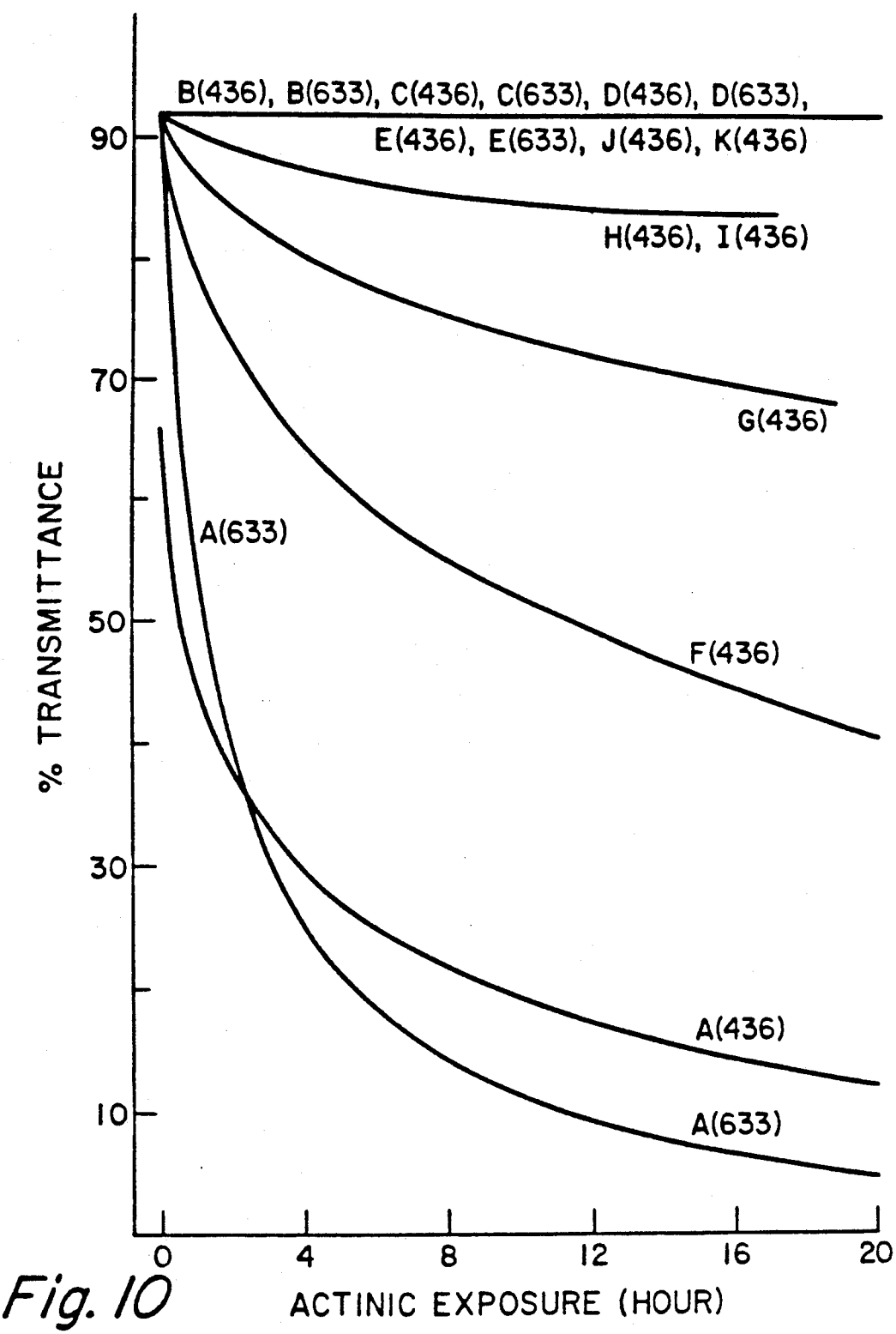
FIG. 10 graphically portrays the role of photosensitivity inhibitors.

FIG. 10 illustrates the role of $TiO_2$, $Ta_2O_5$, $Y_2O_3$ and $Nb_2O_5$ as PI agents. Curves A, B, C, D and E of FIG. 10 set forth the transmittance values at two wavelengths 436 nm and 633 nm as a function of the duration of exposure to actinic radiation at 436 nm on Plates 26A, 4B, 5, 6 and 3C of Example 2.

Each of the plate samples was placed for 20 hours near the focus of a convergent beam which was obtained from the output of a 100 watt mercury arc, using a condensing lens assembly and a 436 nm band pass interference filter. The intensity of the exposure beam at 436 nm was 150 milliwatts/cm² on the glass sample. The transmittance of the glass samples was probed at the wavelength of the exposure beam and at 633 nm. The probing wavelengths are labeled in the parenthesis in FIG. 10.

Plate 26A of exemplary glass composition 26, which does not contain a PI agent, darkened to transmittance values of 12% at 436 nm and 4.5% at 633 nm. Plates 4B, 5, 6 and 3C of exemplary glass compositions 4, 5, 6 and 3, which contain, on a mole percent basis, 1.5% or more $TiO_2$, are not darkened by the actinic radiation at 436 nm. The photosensitivity of the ion-exchanged surface layers of the ion-exchanged glasses containing at least 1.5% $TiO_2$ is totally inhibited.

In good agreement with the foregoing discussions, $TiO_2$ also functions as a RSS agent; whereas the initial transmittance of Plate 26A is 66% at 436 nm, the transmittance of Plates 4B, 5, 6 and 3C are about 92%±1% at 436 nm.

Curves F, G, H, I, J and K of FIG. 10 set forth the transmittance values as a function of the duration of exposure to the actinic radiation at 436 nm of Plates 1C, 4C, 47, 48, 12B and 5C of Example 2, respectively, prepared from exemplary glass compositions 1, 4, 47, 48, 12 and 5, respectively, of Table I of Example 1. Although the ion-exchanged glass plates of the exemplary glass composition 12 (containing 1.5% $TiO_2$ and 0.27% $Ta_2O_5$) and the exemplary glass composition 5 (containing 3.0% $TiO_2$), i.e., Plates 12B and 5C, respectively, are insensitive to actinic radiation at 436 nm, Plates 1C, 4C, 47 and 48 of exemplary glass compositions 1 and 4 (each containing 1.5% $TiO_2$ in the base glass composition), exemplary glass composition 47 (containing 1.5% $Y_2O_3$) and exemplary glass composition 48 (containing 1.3% $Nb_2O_5$), respectively, show residual photosensitivity. The relative effectiveness of $TiO_2$, $Ta_2O_5$, $Y_2O_3$ and $Nb_2O_5$ functioning as photosensitivity inhibitors are displayed by the darkening rate curves F, G, H, I, J and K of FIG. 10.

The effectiveness of a PI agent depends strongly on the concentrations of the various ingredients of the ion-exchange solution. This is evident in FIG. 10 and is particularly apparent in comparing the darkening rate curves B and G of FIG. 10.

The effectiveness of a PI agent also depends on the base anhydrous glass composition, as is apparent in comparing the darkening rate curve F (exemplary glass composition 1) and the rate curve G (exemplary glass composition 4) of FIG. 10.

Further tests of the HEBS glass articles of the present invention on the insensitivity/inertness to actinic radiation were done with exposures to white light and to radiation from a mercury arc at 405 nm and 365 nm. The results of such tests are recited on glass plates, 2 mm thick, of Plates 6, 5 and 4B of Example 2, which were identically ion exchanged. Plate 6 was exposed to actinic radiation at 405 nm for a duration of 64 hours at an intensity level of 80 milliwatt/cm², the transmittance at the monitoring (probed at the exposure wavelength) wavelength of 405 nm remained constant throughout the entire exposure duration. Said ion exchanged glass plate remained colorless and totally transparent, i.e., transmittance values of about 91.5%±1% throughout the spectral ranges of visible and near infrared, after being irradiated to an energy density of $1.85 \times 10^4$ joule/cm² at 405 nm. The same Plate 6 was exposed in addition to actinic radiation at 365 nm for a duration of 64 hours at an intensity level of 56 mw/cm², the glass plate remained colorless and showed no change in transmittance at all wavelengths throughout near-uv, visible and near-infrared spectral ranges.

Plate 5 was exposed to white light composed of radiation having continuous wavelengths of longer than 400 nm for a duration of 10 days at an intensity level of 1.2 watt/cm²; the glass plate remained colorless and displayed before and after the exposure identical transmittance values at all wavelengths throughout the near-ultraviolet, visible and near-infrared spectral ranges.

The HEBS glass articles of the present invention are insensitive and/or inert to radiation of shorter wavelengths as the concentration of PI agents in the base anhydrous glass increases. Plate 6 is insensitive and/or inert to actinic radiation having wavelengths of about 365 nm and longer wavelengths. Plate 5 is insensitive and/or inert to actinic radiation of wavelengths about 400 nm and longer. Plate 4B is insensitive and/or inert to actinic radiation of wavelengths about 436 nm and longer.

It has been determined that the E-beam darkened image within the ion-exchanged products of the present invention exhibits excellent stability under various test exposures to high intensities and/or high dosages of actinic radiation from near-ultraviolet to near-infrared. The results of some of the test exposures are recited below on the glass plates, 2 mm thick, of Plates 5 and 6 of Example 2.

Plate 6 was darkened by an E-beam to an optical density of 1.97 at 436 nm (the corresponding absorption spectrum is closely represented by curve C of FIG. 3). The E-beam darkened area was then exposed to the actinic radiation at 436 nm for a duration of 22 hours at an intensity level of 171 m watt/cm$^2$; the color of the E-beam exposed area remained substantially unchanged and the optical density at 436 nm remained constant at 1.97. The same Plate 6 was darkened by an E-beam on a second area to an optical density of 1.63 at 600 nm. The E-beam darkened area was exposed to a broad band red light for a duration of 38 hours at an intensity level of 161 m watt/cm$^2$; the optical density and the color of the exposed area remained firmly unchanged.

Plate 5 was darkened by an E-beam to an optical density of 1.86 at 796 nm (the corresponding absorption spectrum is closely represented by curve D of FIG. 3). The E-beam darkened area was exposed for a duration of 7 days to a broad band of near infrared radiation at about 796 nm having an intensity of 53.4 m watt/cm$^2$; the optical density and the color of the irradiated area remained firmly unchanged. The same E-beam darkened area was subsequently exposed to white light for 7 days at an intensity level of 1.0 watt/cm$^2$; the optical density still remained substantially unchanged throughout the entire spectral range.

Base Glass Composition Fields

One of the products of the present invention are high energy beam sensitive glass articles exhibiting insensitivity and/or inertness to actinic radiations, consisting of a body portion and an integral ion-exchanged surface layer. The integral ion-exchanged surface layer exhibits coloring and/or darkening effects upon exposure to high energy beams. Colored images delineated and/or replicated by the high energy beam within said integral surface layer are also insensitive and/or inert to actinic radiation. The body portion retains the parent anhydrous glass composition of the integral surface layer.

The parent anhydrous glass compositions suitable for the products of the present invention are in the general composition field of alkali metal silicate glasses consisting of at least one alkali metal oxide selected from the group of $Li_2O$, $Na_2O$, $K_2O$, $Cs_2O$ and $Rb_2O$, at least one of the photosensitivity inhibitors and/or the RS-Suppression agents, and at least one glass network former. The glass melts for the parent anhydrous glass compositions are preferably saturated or super saturated with chlorides.

Durable glasses which are not dissolved and/or etched in the acidic aqueous solution at the temperatures of ion-exchange reactions, are essential in maintaining the optical quality surface and the surface figure of the glass articles being autoclaved in the aqueous ion-exchange solution. It has been found that the transition metal oxides, included in the glass melts to inhibit photosensitivity and/or to suppress RS values, greatly improve the acid durability of the alkali metal silicate base glass and effectively prevent the dissolution and etching of the hydrated glass network in the aqueous ion-exchange solution at elevated temperatures. It has also been found that further improvements in acid-durability and/or further strengthening of the hydrated glass network to prevent even the slightest etching by the aqueous ion-exchange solution are attainable by the addition in the glass melt batch of one or more oxides selected from ZnO, CaO, PbO, SrO, MgO and $Al_2O_3$. Thus the inclusion in glass batches of at least one oxide selected from ZnO, PbO, MgO, CaO, SrO and $Al_2O_3$ are most desirable for the products of the present invention and these oxides are referred to herein as acid-durability-and-glass-network strengtheners.

Although $SiO_2$ is, in general, the choice of the glass network former of the anhydrous base glass of the present invention, other glass network formers such as $B_2O_3$ and $P_2O_5$ can be advantageously employed. $ZrO_2$ is found to substantially improve the acid durability of $B_2O_3$ and/or $P_2O_5$ containing glasses.

Preferred parent anhydrous glass compositions for the products of the present invention comprise, on the mole percent oxide basis, of 5 to 25% total of $Li_2O + Na_2O + K_2O + Cs_2O + Rb_2O$; up to 6% Cl; 0.5-35% of one or more photosensitivity inhibitors, one or more RS-Suppression agents, and mixtures thereof; up to 35% total concentration of acid-durability-and-glass-network strengtheners, up to 4% F, up to 2% Br, up to 2% I, up to 25% $P_2O_5$, up to 25% $B_2O_3$, and 20-93% $SiO_2$, the sum of those components constituting at least 75% of the total composition. Other constituents can be included to modify the chemical and physical properties such as hardness and thermal expansion coefficients, etc. of the base glass and/or the integral ion-exchanged surface layer, and to assist in melting and forming characteristics of the parent anhydrous glass. As illustrative of such, BaO can be included in amounts up to about 35% (mole percent). Cerium can be included up to 0.1% by weight when it is necessary to increase the uv and/or x-ray absorption of the glass article.

The more preferred anhydrous base glass compositions comprise, on the mole percent oxide basis, about 5 to 25% total of $Li_2O + Na_2O + K_2O + Cs_2O + Rb_2O$, up to about 6% Cl, about 0.5-35% total concentration of photosensitivity inhibitors and RS-Suppression agents, up to about 20% ZnO, up to about 20% MgO, up to about 15% $Al_2O_3$, up to about 20% PbO, up to about 20% CaO, about 2-35% total of MgO+ZnO+$Al_2O_3$+PbO+CaO, up to about 4% F, up to about 2% Br, up to about 2% I and about 50-89% $SiO_2$.

Besides enhancing the sensitivity to electron beam, chloride is in general a necessary component of the anhydrous base glass in obtaining most of the E-beam induced coloration other than yellow.

In the absence of any precipitated phases, e.g., AgCl, the reduced silver in the form of metallic silver particles is manifested in the silicate glasses as an absorption band centered at 390 nm to 460 nm. The E-beam exposure-induced yellow colorations in the ion-exchanged product of the present invention were obtained with and without chloride in the glass melts of the base glass.

The HEBS glass articles not containing chlorides do not have photosensitivity, even in the absence of any photosensitivity inhibitor in the glass melts. However, the RS values of chloride-free glasses are in general much larger than glasses of identical compositions having chlorides added in the glass melts, and thus RSS agents are in a greater demand for the chloride-free glasses.

The inclusion of at least one RS-Suppression agent in the anhydrous base glass is deemed necessary for the chloride-free glasses. On the other hand, the inclusion of at least one photosensitivity inhibitor in the anhydrous base glass is deemed necessary for the chloride-containing glasses.

It is desirable to include at least two oxides selected from the group of $Li_2O$, $Na_2O$ and $K_2O$ in the anhydrous base glass. The inclusion of $Li_2O$ as one of the alkali metal oxides is preferred for the following reasons. When part of the contents of $Na_2O$ and/or $K_2O$ in a $Na_2O$-$K_2O$-$TiO_2$-$ZnO$-$Al_2O_3$-$SiO_2$-Cl glass is replaced on an equal mole percent basis by $Li_2O$, the advantageous effects may include the following:

(a) lower expansion coefficient of the anhydrous base glass;
(b) hydration of the surface glass layer to a lower water content;
(c) a lower rate of thickness penetration of the ion-exchange reactions in an aqueous solution;
(d) a lower expansion coefficient of the integral ion-exchanged surface layer; and
(e) a more durable integral ion-exchanged surface layer.

The advantageous effects (c), (d) and (e) are at least partly the consequence of effect (b). When the alkali metal oxides are batched in optimized proportions in the base glass, further advantageous effects include:

(a) a more complete exchange of alkali metal ions in the integral ion-exchange surface layer by $Ag^+$ ions from the aqueous ion-exchange solution; and
(b) closely matched thermal expansion coefficients between the body portion and the integral ion-exchanged surface layer of the ion-exchanged glasses of the present invention.

Thickness and Properties of the Image-Bearing Surface Layer

One of the advantages of the present products which are deemed particularly suitable for use as permanent mass storage media and/or as phototools is based on the fact that the permanently darkened image upon exposure to high energy beam is within the integral ion-exchanged surface layer which is part of the monolithic parent anhydrous glass body. In other words, the information bearing surface layer is in (not coated on) the glass substrate. At least equally significant is the fact that any desirable thickness of the integral ion-exchanged surface layer ranging from a small fraction, e.g., about one micrometer, to the total thickness of the parent anhydrous glass body may be produced precisely and repeatedly.

The depth of the E-beam darkened image does not exceed the penetration depth of the fast electrons. Bethe ranges which are conventionally defined as the path lengths through which the energy of electrons reduces to zero are about 1.2, 3.7, 5.2, 8.7 and 12.8 micrometers for electrons with accelerating potentials of 10 kv, 20 kv, 25 kv, 35 kv and 45 kv, respectively. On the other hand, the penetration depths of ion beams and far-uv are in general less than one micrometer.

It is desirable for some applications that the thickness of the information bearing layer in the IIES layer be limited by the depth of penetration of high energy beams and not by the thickness of the ion-exchanged surface layer. On the other hand, for various reasons such as improved line definition, better edge acuity and minimum linewidth delineated by a focused electron beam, it is desirable in many applications that the thickness of the silver (and copper) ion-exchanged surface layer is less than the Bethe range and/or is only a small fraction of the Bethe ranges.

The thickness of the E-beam sensitive integral ion-exchange surface layer of the HEBS glass articles is equal to that of silver (and copper) ion-exchanged surface layer which is in turn equal to, or less than, the depth of hydration. The depth of hydration is herein defined as the penetration depth of ion-exchange reactions. Ion-exchange reactions include the exchange of $Ag^+$ ions for alkali metal ions in glass, as well as hydration and/or an exchange of $H^+$ and/or $H_3O^+$ ions for alkali metal ions in the base glass.

Since the hydration front is clearly observable under a microscope in a cross-section which is perpendicular to the glass surface that contacted the aqueous ion exchange solution, the thickness of the hydrated layer was measured from photomicrographs of thin cross-sections of the HEBS glass articles.

The penetration depth of hydration/ion-exchange reactions has been measured for a number of HEBS glass article samples which were ion exchanged for various durations from 0.5 hours up to 16 hours. It has been found that the penetration depth of hydration/ion-exchange reactions is proportional to the square root of the duration of the ion-exchange reactions, and consequently, an accurate value of the thickness of the hydrated layer corresponding to an ion exchange duration of 0.5 hours or less may be verified and/or calculated from the thickness values of samples which have been ion exchanged for longer durations.

The measured values of the thickness of the hydrated layers are 1.7, 3.8 and 7.3 micrometers in Plates 6D, 3D and 4D of Example 2, respectively.

It has been determined that the rate of thickness-penetration of ion-exchange reactions is strongly dependent on the parent anhydrous glass compositions. In general, the rate of penetration of ion-exchange reaction/hydration reduces substantially via either one or more of the following compositional alterations:

(1) lowering the total concentration of alkali metal ions;
(2) replacing the larger alkali metal ions by the smaller ones; particularly effective is the replacement of sodium and/or potassium ions by lithium ions. An example of such an effect is illustrated by the measured thickness values cited above. Namely, the thickness values reduce from 3.8 micrometers to 1.7 micrometers in going from the parent anhydrous glass of the exemplary composition 3 of Table I of Example 1 to the exemplary composition 6 of Table I of Example 1. Exemplary glass composition 3, on the mole percent oxide basis contains 10.5% $Na_2O$ and 3.3% $K_2O$, whereas exemplary glass composition 6 contains 3.9% $Li_2O$, 6.2% $Na_2O$ and 3.3% $K_2O$;

(3) an increase in concentrations and/or addition of one or more oxides selected from ZnO, TiO₂, PbO, Al₂O₃ and ZrO₂ in the batch of the glass melts for the base glass composition; and (4) replacing, on the mole percent oxide basis, a portion of silica by one or more of the oxides selected from TiO₂, ZnO, Al₂O₃, PbO and ZrO₂. An example of the effect of replacing silica by titanium oxide is illustrated by the measured thickness values cited above. Namely, the rates of penetration of the ion-exchange reactions reduce from 7.3 micrometers per 0.5 hour to 1.7 micrometers per 0.5 hour in going from the parent anhydrous glass of exemplary composition 4 to the exemplary composition 6 (the exemplary glass compositions 4 and 6 of Table I of 5 Example 1 contain 1.5 mole percent and 4.4 mole percent $TiO_2$, respectively).

As can be expected, the rate of penetration of ion exchange reactions increases with increasing temperature of the ion-exchange reactions. The thickness values of the hydrated layers are 3.4 and 4.4 micrometers in Plates 37A and 37B of Example 2, respectively, that were ion exchanged in identical solutions at 310° C. and 320° C.

It has also been determined that the rate of penetration of ion-exchange reactions is strongly dependent on the ingredients of the ion-exchange solution. In particular, the rate of penetration decreases rapidly with an increasing pH value of the aqueous ion-exchange solution.

Through the choice of base glass composition, ingredients and acidity of the aqueous ion-exchange solution and reaction temperature and duration, there is no difficulty in reproducing precisely the thickness of ion-exchanged surface layer of about 2 micrometer and/or less. It is thus desirable to explore the theoretical as well as the practical limits on the minimum thickness of the silver (and copper) ion-exchanged surface layer which may render a net optical density (i.e., information carrying optical density) of 2 or more.

It is known that the covering power of silver grains in chemically developed photographic silver halide emulsions increases with decreasing grain size down to sizes of less than 0.04 micrometer and that the specific gravity of the chemically developed silver grains is about 2.5 g/cm³ which is much less than that of the compact silver metals. If the above mentioned knowledge (which is pertinent to photographic silver halide emulsions) is applicable to the ion-exchanged products of the present invention, the saturation optical density within an ion-exchanged surface layer can be estimated from the improved Nutting expression which relates the saturation optical density in a photographic deposit to the size and number of silver grains. The improved Nutting expression employed is an empirical equation which has been described by W. Romer, et al. in the *Journal of Photographic Science*, Volume 11, pages 132-135 (1963).

It has been determined that the concentration of silver ions in an ion-exchanged surface layer readily exceeds 10 mole percent $Ag_2O$, i.e., about 30% $Ag_2O$ by weight, provided that the parent anhydrous glass contains more than 10 mole percent total alkali metal oxides, and that proper combinations of the base glass compositions, the ingredients of the ion-exchange solution and the conditions of the ion-exchange reactions exist. It has also been determined that the sizes of the AgCl-containing and/or $Ag_2O$-containing and/or $Ag^+$ ion-containing microcrystals and/or microphases within the ion-exchanged surface layer is in general less than about 0.02 micrometer.

Based on the facts stated immediately above, it has been estimated, using the improved Nutting expression, that a saturation optical density of 3 or more can in principal be obtained within a surface layer of 0.1 micrometer, provided that all the silver ions in the ion-exchanged surface layer can be reduced through a prolonged exposure to high energy beams. With a finite E-beam exposure dosage, e.g., $5 \times 10^{-5}$ coulomb/cm², only a fraction of the reducible silver ions in the inventive product is transformed into silver specks of molecular dimension and/or minute silver metal particles. Therefore, an ion-exchanged surface layer of thickness more than 0.1 micrometer will in general be necessary to secure an optical density of 3 in a direct E-beam writing mode. A direct E-beam writing mode is defined herein as a mode of recording wherein an image with a high/good contrast is produced by exposure to an electron beam without any requirement for a subsequent development and/or image enhancement step.

It is most desirable to increase the fraction of silver ions which are reduced to silver metal specks and/or particles by a finite exposure-dosage of electron beams. Two approaches are realized and are elaborated in the paragraphs immediately below.

In the first approach, E-beam sensitivity of the ion-exchanged surface layer is increased in a direct writing mode through proper combinations of the various constituents of glass compositions, the ingredients of the ion exchange solution and the condition, i.e., temperature and duration of the ion-exchange reactions. Since it is the combination of these variables in the proper relationships that produce the HEBS glass articles having good sensitivity to electron beams and exhibiting insensitivity and/or inertness to actinic radiation, it is in general difficult to interpret the effects of any single variable. Nevertheless, notable improvements in the E-beam sensitivity are readily observed resulting from the inclusion of $TiO_2$ and/or chloride in the glass batches of the parent anhydrous glasses.

The inclusion of $TiO_2$ in otherwise $TiO_2$-free glasses may increase the E-beam sensitivity of the resulting HEBS glass articles up to more than 1,000 folds, provided proper combinations of other variables disclosed herein are achieved. The increase in the E-beam sensitivity with an increasing concentration of $TiO_2$ usually levels off quickly beyond a certain concentration of $TiO_2$. For example, the relative E-beam sensitivities of the inventive products whose photosensitivity curves have been depicted by curves A, B, C and D of FIG. 10 are approximately about 1:100:100:100, where the corresponding parent anhydrous glass compositions contain 0, 1.5, 3.0 and 4.4% $TiO_2$, respectively. In this particular case, an increase of about two order of magnitudes in the E-beam sensitivity results from the initial addition of 1.5 mole percent $TiO_2$, and a further increase in the concentration of $TiO_2$ in the glass melts of the anhydrous base glass does not have a strong effect on the E-beam sensitivity.

The addition of ZnO, $TiO_2$, PbO, $ZrO_2$ and/or $Al_2O_3$ in the glass batches of the inventive products can be advantageously employed to increase the chemical durability of the base glass and slow down the rates of the ion-exchange reactions and thus render a better control in reproducing a thin ion-exchanged surface layer, e.g., of 1 micrometer in thickness. It has been further determined that the addition and/or the increase in the concentrations of these oxides, $TiO_2$ in particular, not only slow down the rates of the ion-exchange reactions, but also prevent the formation of a leached surface layer which may otherwise form on top of the silver (and copper) ion-exchanged surface layer, i.e., the integral ion-exchanged surface layer. The leached surface layer, wherein most of the alkali metal ions are leached out instead of being exchanged by $Ag^+$ ions, has little or no sensitivity to electron beams. In the worst case, the leached surface layer may have a thickness comparable with or even exceeding the Bethe ranges of high voltage electron beams. Nevertheless, through proper combinations of the parent anhydrous glass compositions, the ingredients of the ion-exchange solution and ion-exchange reaction conditions, the thickness of the leached surface layer can be reduced to zero. Since the presence of a leached surface layer prevents the ion-exchanged surface layer from seeing the full E-beam exposure-dosage, an apparent increase in E-beam sensitivity results from the diminution of the thickness of the leached layer on top of the ion-exchanged surface layer.

The E-beam sensitivity of the integral ion-exchanged surface layer increases with increasing chloride concentration. It is desirable that the melting of the base glass batch of the present invention be done in a chlorine or chlorine-containing or chloride-containing atmosphere to increase the Cl content of the glass. Alternatively, a surface glass layer may be enriched or doped with chloride ions before and/or after the surface glass layer is ion exchanged with silver ion by one or more of the following methods:

(1) Heat-treat the glass surface having chloride or chlorine in contact therewith at temperatures in excess of the annealing point of the surface glass layer, and/or (2) laser assisted diffusion of chloride ions into the glass surface; namely, the glass surface layer having chloride or chlorine in contact therewith is heated point by point by a scanning laser beam, and/or (3) doping the surface glass layer with chloride from high voltage ion beams consisting of $Cl^-$ ions.

The amount of silver ions which are directly associated with chlorides, e.g., in the form of AgCl may constitute a small fraction up to 100% of the total silver ions in the integral ion-exchanged surface layer. Nevertheless, the E-beam sensitivity of the inventive product is in general increased by a factor of more than two, due to the addition of chloride in the batch of the base glass melt.

There may exist at least two mechanisms of enhancing the E-beam sensitivity due to the presence of chloride in the glass melts. First, silver ions in the AgCl-containing microphases and/or microcrystals are more susceptible to reduction by electron beams. Second, the E-beam exposed AgCl-containing microphases and/or microcrystals act as a catalyst during E-beam exposure on the silver ions which are not directly associated with the chloride in glass, much like the heat development phenomenon described immediately below.

In a second approach to increase the fraction of silver ions which is reduced to metallic silver with a finite exposure dosage of electron beams, the optical density in the E-beam exposed areas of the HEBS glass articles is increased via a post heat treatment process or heat development step. Whereas the heat development step is found to increase the optical density of the E-beam exposed area, the areas not exposed to an electron beam show no change in transmittance and are totally unaffected by the post heat treatment. It is believed that heat causes the E-beam exposed AgCl in the AgCl-containing microphases and/or microcrystals to act as a catalyst on the silver ions dissolved in the glass of the integral ion-exchange surface layer and on the other ionic silver-compound-containing phases/crystals, i.e., $Ag_2O$-containing and/or $Ag^+$ ion-containing microphases/microcrystals, as well as on silver ions not directly associated with $Cl^-$ in the AgCl-containing microphases/microcrystals to form metallic silver specks and/or particles.

The heat development step typically consists of heating at least the surface glass layer, i.e., the integral ion-exchange surface layer, of the E-beam exposed HEBS glass articles to a temperature of about 100° C. for a few seconds, up to several hours. The heat development temperature is in general well below the annealing point of the ion-exchanged surface layer and also below the strain point of the parent anhydrous glass.

The post heat treatment to enhance the contrast of E-beam recorded image is not a necessary step for the products of the present invention to obtain values of optical density in excess of 2 within an integral ion-exchanged surface layer of thickness down to about and/or below 2 micrometers. However, the post heat treatment may be helpful to obtain adequate optical densities when approaching the limiting thickness of 0.1 micrometer for the surface layer and/or in reducing the required E-beam dosage.

Although the heat development step is a useful image contrast enhancement process, optical densities in excess of 3 are readily obtained without the heat development step. Therefore, the absorption spectra of FIGS. 1 and 3, and the characteristic curves of FIGS. 4 to 8, as well as the E-beam sensitivity plot of FIG. 2 discussed previously represent those of the direct E-beam writing mode, wherein the image is produced instantaneously upon exposure to electron beams without the post heat treatment.

The heat development step will in general represent an improvement in E-beam sensitivity of less than one order of magnitude over the E-beam sensitivity in the direct writing mode. Nevertheless, a chemical development process to develop surface relief images which is discussed immediately below, has been found to increase the E-beam sensitivity of the products of the present invention up to and beyond two orders of magnitude over the sensitivities of the colored image formation in the direct E-beam writing mode.

It has been found that latent images and/or latent patterns delineated by electron beams on HEBS glass articles, having little or no detectable optical density, can be developed into surface relief images and/or relief patterns of very high quality, through a brief immersion of the glass article bearing the latent image/pattern in an aqueous solution containing HF. Apparently, the rate of dissolution and/or etching of the integral ion-exchanged surface layer, by a HF containing solution, is substantially different between the E-beam exposed areas and the unexposed areas.

The latent images and/or latent patterns, which are suitable for the chemical development into relief patterns/images, are delineated by electron beams with exposure dosages which are sufficient to produce an optical density of more than about 0.01. The extent of thickness modulation, i.e., the aspect ratio in the relief pattern, is a function of the etching time and the concentration of HF in the chemical developer. In general, a longer etching time is necessary, when a lower concentration of HF solution is employed. The upper limit on the extent of thickness-modulation in the relief pattern is apparently related to the smaller value of either the Bethe-range of the electron beam or the thickness of the integral ion-exchanged surface layer. Since the minimum optical density in the E-beam generated image to render the latent images and/or latent patterns developable to relief images/patterns is very minimal, e.g., about 0.01, the accelerating voltage of the electron beams which are employed to delineate the latent images/patterns may be any value ranging from less than 5 kv to more than 50 kv.

Since the surface relief is permanent and durable, the potential applications of the products of the present invention includes phase gratings, surface relief holograms, and integrated optics.

Mass information may also be recorded in the HEBS glass articles in the form of surface relief, through an exposure to electron-image and a subsequent chemical development. A reflective coating deposited thereafter on the relief surface renders the recorded information retrievable optically in a reflection mode. Thus digital video disks, digital audio disks and the like can be produced utilizing the HEBS glass articles via the following three process steps: first, the digital information is recorded with an electron beam pattern generator, or is replicated using parallel exposure systems such as the 1:1 photocathode electron-image projection system or the demagnified electron-image projection system; second, the latent image generated from the exposure to electron beams is developed into a surface relief through a selective etching means; third, a reflective coating, e.g., thermally evaporated Al or Cr, is vacuum deposited on the relief surface.

The E-beam darkened/colored image within the ion-exchanged surface layer is due to the absorption of visible light by the silver specks therein of molecular dimensions and/or silver metal particles of less than a few hundred angstroms. The silver particles/specks in an oxidizing silicate glass matrix can often be redissolved at temperatures above about the annealing point of the glass matrix, i.e., of the ion-exchanged surface layer. The dissolution process may be explained as reoxidation of the silver particles/specks to ionic states at elevated temperatures by the oxide-glass constituents. The temperature at which redissolution takes place can be substantially lowered via either one or both of the following compositional modifications of the inventive products. First, when the HEBS glass articles of the present invention are prepared from more oxidized glass melts, the minimum temperature at which redissolution of silver particles/specks takes place is lowered. Consequently, whenever the erasure of the E-beam darkened image by heat is desirable, the glass batch of the parent glass melts shall contain oxidizing agents such as nitrates, e.g., at least part of the alkali metal oxide is added as alkali metal nitrate in the glass batches. Second, as the water content and/or the concentration of the silanol groups in the integral ion-exchanged surface layer increases, the annealing point of the ion-exchanged surface layer decreases, and thus the minimum temperature at which redissolution of silver particles takes place is lowered. For example, the redissolution temperature of silver particles in a durable silicate glass matrix containing little or no water (e.g., silanol groups) is about 600° C., whereas, the redissolution temperature of silver particles in the corresponding hydrated glass of the ion-exchange surface layer can be as low as or even below 250° C.

The E-beam sensitive surface layer contains in general a finite concentration of water/silanol groups, e.g., up to more than 6% by weight of $H_2O$. Consequently, the strain point, annealing point, and softening point of the ion-exchanged surface layer is sufficiently lower, e.g., up to and/or more than 300° C. lower than the corresponding temperatures of the anhydrous base glass. The redissolution of silver particles can in general be carried out at temperatures where the anhydrous base glass body is totally rigid. Therefore, no distortion of the surface figures of the glass articles may occur during the heat-erasure treatment, particularly in cases where the ion-exchanged surface layer is limited to less than a few micrometers. The strain point, annealing point and softening point of glasses are conventionally defined as the temperatures at which the viscosities of the glasses are $4 \times 10^{14}$ poises, $2.5 \times 10^{13}$ poises and $4 \times 10^7$ poises, respectively.

Flood erasure, i.e., erasure of all the recorded bits within a macroscopic area of a HEBS glass article, such as within an entire disk, can be achieved readily by contacting at least the surface portion of the recorded disk with a heat source. On the other hand, bits-by-bits erasure as well as flood erasure can be done with high intensity light beams which are absorbed by the E-beam darkened image and/or the glass constituents of IIES layer.

Among the most prominent absorption bands due to the glass constituents of the IIES layer are those due to vibrational motions of $SiO_4$ tetrahedron, water and/or silanol groups, alkali metal ions and silver ions. The stretching vibrations of SiO bonds give rise to a broad absorption band in the region of 8–11.5 micrometers. This very intense absorption band/bands coincides with the wavelength of $CO_2$ lasers. A $CO_2$ laser may be employed to erase the E-beam recorded image and/or data within the ion-exchanged surface layer of the HEBS glass article. The fundamental and the combination modes of water and/or silanol groups give rise to absorption in the wavelength ranges of 2.7–3.6 $\mu m$ and 1.8–2.6 $\mu m$, respectively.

One of the products of the present invention is a HEBS glass article bearing high-energy-beam-darkened areas and/or image. The high energy beam darkened area includes macroscopic area, e.g., an entire glass disc being uniformly darkened by a high energy beam and microscopic spots, e.g., bits of binary recorded information.

The high-energy-beam-darkened areas, spots and images are stable indefinitely, i.e., no loss of image/data ever observed, at ambient temperatures. Nevertheless, the information bearing optical density in portions or the entire area of the high energy beam darkened areas can be erased by heat at temperatures exceeding the redissolution temperature of silver particles/specks of molecular dimensions in the IIES layer. The redissolution temperature is a function of the glass compositions of the HEBS glass article as well as the ingredients and conditions of the ion exchange reactions and is in general more than about 100° C. Since the redissolution process does not take place at temperatures below the redissolution temperature, there exists a threshold temperature in heat erasure, namely, heat erasure takes place only when and where the high-energy-beam-darkened area or spots are heated to temperatures above the threshold temperature.

Bit by bit erasure of high-energy-beam-darkened image as well as bit by bit recording using erasure mode on an IIES layer having been flood/blanket exposed and uniformly darkened with a high energy beam, are most readily carried out via employing a high intensity light beam. The high intensity light beam is in general a focused laser beam for the following two reasons. First, the energy of a laser beam can be focused on the recording material to a microscopic spot size, e.g., a diffraction limited spot size, and heat the spot to high temperatures in a very short duration, e.g., one tenth of a microsecond. Second, optical recording utilizing laser and heat threshold effects is a well known technology and optical recording systems are becoming commercially available.

One of the products of the present invention is a glass plate bearing a recorded image readable in actinic radiation, said glass plate having an integral ion-exchanged surface layer (IIES layer) bearing the recorded image, said IIES layer having been flood/blanket exposed and uniformly darkened with a high energy beam, the recorded image being formed in the darkened IIES layer by erasing in a predetermined pattern, portions of said darkened layer to produce the recorded image using a high intensity light beam, e.g., a focused laser beam. The energy of the high intensity light beam is absorbed by the high-energy-beam-darkened IIES layer and/or by the glass constituents of the IIES layer. Depending on the wavelength of the high intensity light beam, the absorption of the photon energy of the high intensity light beam by the high energy beam darkened IIES layer to bring about heat erasure can be due to an information bearing optical density or due to a non-information bearing optical density or due to a combination thereof. In the paragraphs immediately below the discussion is first confined to the situation where the absorption is due solely to the information bearing optical density which exists in general in the visible spectral range.

As shown in FIG. 3, there exists an absorption band in the visible spectral of an E-beam darkened IIES layer. In the erasure mode of recording and/or erasure, a portion of the energy of the erasure laser beam is absorbed within the volume of the darkened IIES layer, which is exposed to the focused laser beam; the high-energy-beam-darkened IIES layer having optical densities of 0.5, 1.0 and 2.0 within said volume absorbs 69%, 90%, and 99% respectively of the energy of the laser beam before said volume is being heated up to the threshold temperature. The energy of a pulse of laser beam that is needed to heat up said volume of IIES layer to or above the threshold temperature depends, besides the intensity of recording beam and parameters related to glass compositions and ion exchange treatments on factors including:

(1) The optical density of the high-energy-beam-darkened IIES layer at the wavelength of the erasure beam.

(2) The heat capacity of said volume of the IIES layer that is exposed to the focused laser beam. Obviously for a given thickness of the high-energy-beam-darkened IIES layer, the laser beam energy that is required for erasure to take place decreases rapidly as the optical density of the IIES layer at the wavelength of the laser beam increases from zero to about unity, and higher values of optical density beyond about unity have relatively less effects. The information bearing optical density obtainable in the high-energy-beam-darkened IIES layer increases with an increasing thickness of the darkened IIES layer, but the amount of laser beam energy required to cause heat erasure also increases with the increasing thickness of the darkened IIES layer (due to a corresponding increase in the volume of the darkened IIES layer that has to be heated up by the focused laser beam). As a consequence there exists an optimum optical density of a darkened IIES layer for laser erasure mode of recording and/or erasure to take place with a minimum laser energy. Said optimum optical density depends on a number of factors including, for example, the heat capacity of the IIES layer and the available optical density per unit thickness of the IIES layer, and thus is a function of the glass composition of the IIES layer as well as the ion exchange treatment.

The optimum optical density also differs between a transmission mode and a reflection mode of recording. In a reflection mode of recording (or reading), a reflective thin film usually a metallic film such as chrome film is spattered or vacuum coated on the darkened IIES layer. The recording (or reading) beam enters the body portion of the recording disc before it focuses on the darkened IIES layer. Due to the presence of the reflective film, the recording beam passes the darkened IIES layer (as well as the body portion of the recording disc) twice. In a transmission mode of recording the recording beam passes the darkened IIES layer only once. It is desirable that the information bearing optical density of the darkened IIES layer is more than about 0.5 and unity for reflection mode and transmission mode of recording respectively.

The wavelengths of laser beams that are effective to cause heat erasure are different for darkened IIES layers having different absorption spectra. In a transmission mode of recording, the effective wavelengths of erasure laser beams to cause heat erasure in the E-beam darkened IIES layers whose spectral absorption curves are represented by curve A of FIG. 3, include wavelengths from uv to about 610 nm. The effective wavelengths of lasers to cause heat erasures in the darkened IIES layers represented by curves B, C and D of FIG. 3 includes wavelengths from uv to about 680 nm, to about 850 nm and to about 930 nm respectively.

In a reflection mode of recording, the effective wavelengths to cause heat erasure in the darkened IIES layers represented by curves A, B, C and D of FIG. 3 include wavelengths ranging from uv to about 654 nm, to about 740 nm, to about 940 nm and to about 1045 nm respectively.

In optical recording and/or optical pattern generation applications utilizing Argon ion laser (which typically lase at wavelengths in the spectral ranges of 454.5–514.5 nm and 351.1–363.8 nm) or frequency-doubled semiconductor lasers having wavelength in the range of blue light, the recording medium can be chosen from various high-energy-beam-darkened IIES layer whose absorption spectra include curves A, B, C and D of FIG. 3. In optical recording an/or optical pattern generation applications utilizing He-Ne lasers (which lase at 632 nm) or semiconductor laser diode which lase in the wavelength range of red light, the recording medium can be chosen from various high-energy-beam-darkened IIES layers whose absorption spectra include curves B, C and D of FIG. 3. In optical recording and pattern generation applications utilizing semiconductor laser diode having emitting wavelengths in the near infrared, the recording medium can be chosen from various high-energy-beam-darkened IIES layers whose absorption spectra include curves C and D of FIG. 3.

Curves A and B of FIG. 11 represent the spectral absorption curves of plates 52M and 52N of Example 17 having been blanket/flood exposed and uniformly darkened with 20 kv and 15 kv electron beams respectively, using an ElectronCure 30M Electron Beam Exposure System marketed by Electron Vision Corporation of San Diego, Calif. The E-beam darkened plates 52M and 52N have such a broad E-beam exposure-induced absorption band that these plates are suitable for heat erasure mode of recording using any wavelength within the spectral range of near uv, visible and near infrared.

Curves A and B of FIG. 12 depict the spectral absorption curves of plates 53M and 53N of example 17 having been blanket/flood exposed and uniformly darkened with 20 kv electron beams using an ElectronCure 30M Electron Beam Exposure System. The E-beam darkened plates 53M and 53N have a broad absorption band centered at about 800 nm and 820 nm respectively and are particularly useful for heat erasure mode of recording using wavelengths in the near infrared.

The products of the present invention can be utilized as an optical recording medium. The recording systems that may utilize the products of the present invention includes various optical disc drives as well as optical pattern generators employing precision stage movements and/or laser scanning and modulation techniques. The latter includes, for example, Models N52256 and N52256DPL Laser Micromachining Center marketed by Newport Electro-Optics systems of Melbourne, Fla.

The recording systems that can be employed to record images in HEBS glasses include laser marking systems which have a large installed base worldwide. Currently, more than 3000 laser marking systems are installed in the U.S. The marking systems are typically employed in the marking of consumer products such as beverage containers, packages of pharmaceuticals, cosmetics and other mass produced goods, consumer electronic components, connectors and name plates, etc. The marking effect is generally caused by ablating-/evaporating a surface layer of material to expose a contrasting lower layer, as in marking printed or coated materials. The commercially available laser marking systems include mask markers and stroke markers. In a mask marking system, the laser illuminates a mask that is either in close contact with the surface of the work piece or imaged onto the work-piece by a lens. The available energy density of a commercially available mask marking system, using e.g., a TEA $CO_2$ laser, is typically about 20 joule/$cm^2$ to expose a rectangular area of about 5 $cm^2$ in a single laser pulse. The stroke marking system combines typically Nd:YAG laser with a microprocessor-controlled galvanometer scanning system, focusing optics and a workpiece handling system. The Nd:YAG lasers employed in the stroke-markers typically has an available power of about 100 watt at a wavelength of 1064 nm.

HEBS glass plates 52M having been exposed and darkened with electron beams were employed to record computer output graphics using stroke markers, laser scanning kits LK1001 and LK2001, marketed by General Scanning Inc. of Watertown, Mass. Models LK1001 and LK2001 employ $CO_2$ laser TEMoo mode at the wavelength of 10.6 $\mu$m and YAG multi-mode laser at the wavelength of 1.06 $\mu$m respectively. Both stroke marking systems mark/record graphic image in the HEBS glass plates by ablating a portion or the entire thickness of the IIES layer is addition to heat erasure. This type of recording in the HEBS glasses is herein referred to as an engraving mode of recording.

At the wavelength of $CO_2$ laser, 10.6 $\mu$m, the absorption of the laser beam energy by the IIES layer is due mainly to the stretching vibrations of SiO bonds, and is not due to the silver speck-color centers which give rise to the information bearing optical density. A pure ablation mode of recording i.e., without the accompanying heat erasure, occurs in the IIES layer, when the HEBS glass plates without being pre-darkened by E-beam were marked with a $CO_2$ laser.

To avoid ablating the IIES layer by the stroke-marker LK2001, it was demonstrated experimentally that by reducing the laser output power of the stroke-marker LK2001 from 70 watt to less than about 2 watt, graphic image was recorded in the HEBS glass plate in the heat erasure mode instead of the engraving mode. The recording of graphics was done with LK2001 having the YAG laser output attenuated to about 2 watt, using a focused laser spot diameter of 68 $\mu$m moving at 760 mm/sec.

Using a mask-marker to print image in the E-beam darkened HEBS glasses and to effect the erasure mode of recording instead of the engraving mode, it is only necessary to reduce the intensity of the laser pulses from a commercially available mask-marker by a factor of about 20. Since the required intensity (or power) to print image in the E-beam darkened HEBS glasses is about 5% of the available intensity (or power) from a conventional mask-marker equipped with a $CO_2$ laser, it is likely that a large area of image e.g., about 100 $cm^2$, can be printed in the E-beam darkened HEBS glasses in the erasure mode with each one of the laser pulses. Therefore, images and/or information can be mass produced in HEBS glasses in erasure mode of recording/-printing using a mask marking system.

The information bearing optical density of a HEBS glass is defined herein as the high energy beam exposure-induced optical density, i.e., the net optical density which is obtainable via substracting the optical density of the HEBS glass prior to being exposed to high energy beams from the optical density of the HEBS glass having been exposed to high energy beams. The optical density of an IIES layer prior to being exposed to high energy beams is herein defined as the non-information bearing optical density.

A recorded image can be formed in an E-beam darkened IIES layer by heat-erasure in a predetermined pattern using a high intensity light beam, including focused laser beams, at whose wavelength there is absorption of light within the darkened IIES layer. It has been determined experimentally that the wavelength of laser beams that are suitable for heat erasure can be selected from any wavelength in the spectral range of uv, visible, near infrared and infrared. Whereas the absorption of the photon-energy of light by a high energy beam darkened IIES layer, in the visible and near infrared spectral range is at least partly due to the information bearing optical density, e.g., E-beam exposure induced optical density, the absorption of photon energy of light in the spectral range of uv and infrared is in general mainly due to the base glass composition and/or water species and/or the spontaneous warm-in silver. The spontaneous warm-in silver which forms during or upon ion exchange reactions generally absorbs in the near uv and blue light spectral range and cause the absorption edge of the clear IIES layer to move toward or into visible spectral range. The absorption spectra of the base glass composition, water species and the spontaneous warm-in silver are in general in the spectral ranges of uv, infrared and near infrared, and contribute to non-information bearing optical density. Any colorant due to dopping or ingredients, e.g., CuO, $Fe_2O_3$, CoO, NiO, $Cr_2O_3$, $V_2O_5$, MnO, $Pr_2O_3$ and $Er_2O_3$ in the HEBS glass composition contributes to non-information-bearing optical density in the visible spectral range.

Laser beams, e.g., uv laser and $CO_2$ laser, at whose wavelength there exist a non-information bearing optical density in an IIES layer, can be advantageously employed for heat erasure mode of recording. Using a high intensity light beam, e.g., uv and $CO_2$ lasers at whose wavelengths only a non-information-bearing optical density exists in an IIES layer, the efficiency of heat erasure is independent of the information bearing optical density of the IIES layer, thus the image with a gray scale of the information bearing optical density and/or images with more than one level or tone of information bearing optical densities can be heat erased at the same speed using the same laser power level.

The products of the present invention can be utilized as phototools, e.g., photomasks and reticles, for photolithographic applications. One may define a dark field phototool as a phototool in which more than 50% of the area in the masking surface is opaque or have an optical density value of more than about unity, and define a clear field phototool as a phototool in which less than 50% of the area in the masking surface is opaque or have an optical density value of more than about unity. It is apparent that using a direct E-beam writing mode to record images in an IIES layer, a clear field phototool can be patterned more economically than a dark field phototool. On the other hand, using a laser erasure mode to record images in a high-energy-beam-darkened IIES layer, a dark field phototool can be generated more economically than a clear field phototool.

One of the products of the present invention is a high-energy-beam-sensitive glass exhibiting photoinsensitivity and/or inertness to at least a spectral portion of the actinic radiation comprising $SiO_2$, at least one alkali metal oxide, an amount of halide from zero up to its saturation level in the glass melt, at least one photosensitivity inhibitor and/or RS-suppression agent, silanol groups and/or water having a concentration of more than about 0.01% by weight $H_2O$, and silver components comprising Ag+ ions and/or AgX (i.e., silver halide)-containing and/or $Ag_2O$-containing and/or Ag+ ion-containing microcrystals and/or microphases, the amounts of said silver components, halide and photosensitivity inhibitors being effective to render the glass substantially photoinsensitivity to substantially all actinic radiation having a wavelength longer than about 365 nm and photosensitive to radiation of photon energy higher than that of a wavelength of about 365 nm.

Another of the products of the present invention is a high-energy-beam-sensitive glass exhibiting photoinsensitivity and/or inertness to at least a spectral portion of the actinic radiation comprising $SiO_2$, at least one alkali metal oxide, an amount of halide from zero up to its saturation level in the glass melt, at least 0.5% total of at least one photosensitivity inhibitor and/or RS-suppression agent, silanol groups and/or water having a concentration of more than about 0.01% by weight $H_2O$, and silver components comprising Ag+ ions and/or AgX-containing and/or $Ag_2O$-containing and/or Ag+ ion-containing microcrystals and/or microphases, the amounts of said silver components, halide and photosensitivity inhibitors being effective to render the glass substantially photoinsensitive to substantially all actinic radiation having a wavelength longer than about 400 nm and photosensitive to radiation of photon-energy higher than that of a wavelength of about 400 nm.

One of the products of the present invention is a high-energy-beam-sensitive glass article capable of recording images upon exposure to said high energy beams, comprising an integral ion-exchanged surface layer (IIES layer) which exhibits photoinsensitivity to at least a portion of the actinic spectrum, said IIES layer being prepared by ion exchanging silver ions into a precursor glass to render the IIES layer sensitive to high energy beams, the glass composition of said precursor glass comprising $SiO_2$, at least one alkali metal oxide, an amount of halide from zero up to its saturation level in the glass melt, and at least 0.5% total of at least one photosensitivity inhibitor (PI agent) and/or RS-suppression agent (RSS agent), said IIES layer having silver components comprising Ag+ ions and/or AgX-containing and/or $Ag_2O$ containing and/or Ag+ ion containing microcrystals and/or microphases, said IIES layer containing silanol groups and/or water having a concentration of more than about 0.01% by weight $H_2O$, the amount of said silver components, halide and photosensitivity inhibitors in said IIES layer being effective to render the IIES layer substantially photoinsensitive to substantially all actinic radiation having a wavelength longer than about 400 nm and photosensitive to radiation of photon energy higher than that of a wavelength of about 400 nm.

The glass articles of the present invention can be prepared with the method comprising the steps:

(a) contacting the surface of a parent glass article with a Ag+ ion-containing material and/or an aqueous solution containing Ag+ ions, the parent glass article being prepared from a glass batch melt and having glass composition comprising at least one alkali metal oxide selected from the group comprising $Li_2O$, $Na_2O$, $K_2O$, $Cs_2O$ and $Rb_2O$, at least one photosensitivity-inhibitor (PI agent) and/or RS-Suppression agent (RSS agent), $SiO_2$, and zero up to saturation of halide in the glass melt, the glass composition containing an effective amount of photosensitivity inhibitors and an effective amount of halide to render the IIES layer substantially photoinsensitive to substantially all actinic radiation having a wavelength longer than about 400 nm, and photosensitive to radiation of energy higher than that of a wavelength of about 400 nm, (b) heating said parent glass article together with said Ag+ ion-containing material and/or said aqueous solution containing Ag+ ions in contact therewith to a temperature sufficient to effect an exchange of Ag+ ions for said alkali metal ions in at least the surface of said parent glass article for a period of time sufficient to allow the ion exchange reactions to proceed in thickness dimension into the surface of said parent glass article to form the IIES layer.

Using a flood/blanket electron beam exposure system, such as an ElectronCure 30M Electron Beam Exposure System, large areas of the IIES layer of the HEBS glasses can be exposed economically to a high dosage of electron beam, e.g., in excess of 1000 $\mu c/cm^2$ to secure a saturation or near saturation-optical density. Therefore, suitable optical density for various applications can be obtained in an IIES layer of thickness ranging from less than about 0.1 micrometer up to more than several micrometers.

A preferred glass composition contains an effective amount of halide and contains photosensitivity inhibitor and/or RS-suppression agent which is an amount of at least 0.5% total of oxides of transition metals which have 1 to 4 d-electrons in the atomic state, effective to render said IIES layer substantially photoinsensitive to substantially all actinic radiation having a wavelength longer than about 400 nm and photosensitive to radiation of energy higher than that of a wavelength of about 400 nm. Another preferred glass composition contains sufficient amounts of halides and photosensitivity inhibitors being effective to render said IIES layer substantially photoinsensitive to substantially all actinic radiation having a wavelength longer than about 200 nm and photosensitive to radiation of energy higher than that of a wavelength of about 200 nm. Another preferred glass composition contains sufficient amounts of halides and photosensitivity inhibitors which are effective to render said IIES layer substantially photoinsensitive to substantially all actinic radiation having a wavelength longer than about 300 nm and photosensitive to radiation of energy higher than that of a wavelength of about 300 nm. Another preferred glass composition contains sufficient amounts of halides and PI agents that are effective to render said IIES layer substantially photoinsensitive to substantially all actinic radiation having a wavelength longer than about 365 nm and photosensitive to radiation of energy higher than that of a wavelength of about 365 nm. A more preferred glass composition contains an effective amount of halides and contains photosensitivity inhibitor and/or RS-suppression agent which is an amount of less than about 35% total of oxides of transition metals which have 1 to 4 d-electrons in the atomic state, effective to render said IIES layer substantially photoinsensitive to substantially all actinic radiation having a wavelength longer than about 400 nm and photosensitive to radiation of energy higher than about 400 nm. Another preferred glass composition contains sufficient amounts of halide and PI agents that are effective to render said IIES layer substantially photoinsensitive to substantially all actinic radiation having a wavelength longer than about 436 nm and photosensitive to radiation of energy higher than that of a wavelength of about 436 nm.

One of the preferred glass compositions contains photosensitivity inhibitor and/or RS-suppression agent which is at least one oxide of a transition metal selected from $TiO_2$, $Ta_2O_5$, $ZrO_2$, $Nb_2O_5$, $La_2O_3$, $Y_2O_3$ and $WO_3$. Another of the preferred glass compositions contains photosensitivity inhibitor which is at least one oxide of a transition metal selected from $TiO_2$, $Ta_2O_5$, $Y_2O_3$ and $Nb_2O_5$. Another of the preferred glass compositions contains photosensitivity inhibitors which is at lest one oxide of a transition metal selected from $TiO_2$, $Y_2O_3$ and $Nb_2O_5$. Another of the preferred glass compositions contains in mole percent, at least 0.5% $TiO_2$. One of the more preferred glass compositions contains in mole percent, at least 1.5% $TiO_2$. Another of the preferred glass compositions contains in mole percent on the oxide basis at least about 2% total of at least one acid-durability-and-glass-network-strengthener selected from the group comprising ZnO, PbO, MgO, CaO and $Al_2O_3$. Another of the preferred glass compositions contains in mole percent, 0.4–3% Cl, in the glass batch. Another of the preferred glass composition contains in mole percent 0.5–12% $B_2O_3$. One of the more preferred glass composition contains in mole percent 1–6% $B_2O_3$. Another of the preferred glass composition contains in mole percent about 0.5–5% $Al_2O_3$. Another of the preferred glass composition contains in mole percent about 2–15% ZnO. One of the more preferred glass compositions contains in mole percent about 4–10% ZnO. Another of the preferred glass compositions contains in mole percent about 0.5 to 15% PbO. One of the preferred glass compositions which contains little or no ZnO, contains about 1–10% PbO on the mole percent oxide basis. One of the more preferred glass compositions contains in mole percent about 2–15% total of the oxides selected from the group consisting of ZnO, PbO and mixture thereof. Preferably, the IIES layer contains in mole percent, 0.1–25% $Ag_2O$.

The products of the present invention include glass filters, encoder disks, glass scale, optical reticles, phototools and the like products. Within at least one surface of a glass filter of the present invention, the optical density at any point or any portion of the surface area may have a value independent of adjacent points or areas ranging from zero to more than 3. Numerous possibilities of glass filter applications exist; for example, filters with gray scale patterns, filters with half tone patterns, filters for shaping laser beam intensity profile (the filter can be placed at expanded beam diameter before it is being focused) and filters to correct light exposures (e.g., to correct non-uniformity) in photolithographic processes. The products of the present invention include glass plates and glass slides employed in E-beam recording, optical recording, optical read out and/or optical projection of images with or without gray scale and include microfiches with or without gray scale as well as glass filters for light intensity filtering an/or for color filtering, i.e., wavelength selective filtering, with or without spatial variation of transmittance and/or color in the IIES layer.

The products of the present invention include optical software disks bearing recorded image readable in actinic radiation, employed to load programs into various computers as well as supplying a recording medium to serve the market for personal computers, video games, office systems, data distribution systems, and other information systems. Said recorded image is selected from a group comprising data, image with or without gray scale, digital information and servo tracks.

One of the products of the present invention is a product selected from the group comprising a read-only-disc, and a glass substrate or disc containing digital data and/or servo tracks for optical recording. Spiral or concentric servo tracks and/or digital data may be recorded in the IIES layer of the glass substrate or disc through any one of the following methods:

(1) high-energy-beam-printing modes including contact printing and projection printing; the high energy beam is selected from uv having photon energy of higher than that of a wavelength of about 365 nm, electron beam and x-ray.

(2) bit-by-bit heat erasure mode of recording using a focused laser beam.

(3) bit-by-bit high-energy-beam-darkening mode of recording using a high energy beam selected from uv radiation having photon energy of higher than that of a wavelength of about 365 nm, and electron beams (i.e., the direct E-beam writing mode). The uv radiation may be a uv laser whose intensity is kept below the level at which sufficient heat is generated to cause heat erasure.

(4) Heat erasure printing mode using recording/printing systems such as mask-markers.

(5) The modulations in optical density obtained in any one of the above four methods can be converted into modulations in surface relief through selective etching means using e.g., HF containing aqueous solutions or plasma etching.

(6) Engraving mode of recording in high energy beam darkened IIES layers using laser marking systems.

(7) Pure ablation mode of recording in clear IIES layers using laser marking systems.

The optical discs of the present invention includes read-only discs, write-once-read-many (WORM) discs and write-erasable discs. In a reading mode employing a focused laser beam, the intensity of the read beam is kept below the intensity level at which sufficient heat is generated to cause heat erasure. In general, the intensity of the read beam is about one tenth (1/10) to one one hundredth (1/100) of the intensity of the recording beam in erasure mode.

Data, image and information in read-only discs can be recorded with a high-energy-beam printing mode, or recorded with a heat-erasure printing mode or pure ablation mode using a mask marking system. Bit by bit recording modes may also be utilized.

Data, image and information in write-once-read-most discs may be recording using bit by bit recording mode on IIES layers with or without pre-recorded servo tracks. Bit by bit recording modes include heat-erasure-mode of recording using focused laser beam and high-energy-beam-darkening mode of recording using a high energy beam selected from electron beams and uv radiation, uv laser in particular having photon energy of higher than that of a wavelength of about 400 nm.

Data, image and information in a write-erasable disc of the present invention can be written using the heat-erasure-mode and can be erased using the high-energy-beam-darkening mode, or vice versa, namely, written with the high-energy-beam-darkening mode and erased with the heat-erasure mode. It is particularly useful that two or more power levels of a uv laser may be employed for the heat erasure mode and the high-energy-beam darkening mode. Write-erase as well as over-writing a recorded disc can be done using a uv laser beam modulated between two power levels. The two power levels are so chosen that heat erasure takes place at a higher power level and uv darkening occurs at a lower power level. Both the higher power level and the lower power level may have a spread of sub-divided levels to record gray scales.

Resolution test patterns were written with the direct E-beam writing mode having an E-beam accelerating voltage of 20 kv on plates 52 F using an electron beam pattern generator, MEBES III which is manufactured and marketed by Perkin Elemer Corp. of U.S.A. for IC photomask and reticle generation. E-beam written lines and spaces down to 1.0 micrometer (i.e., 2.0 $\mu$m period) were resolved in the test patterns written at 20 kv, as was evidenced in optical microscopic examination. It was estimated that the thickness of the IIES layer of plates 52F is about 1.5 $\mu$m. The Bethe range which is conventionally defined as the path length through which the energy of electrons reduces to zero is about 3.7 $\mu$m for 20 kv electrons. Apparently, the E-beam written image in plate 52F has a depth/thickness equal to the thickness of the darkenable IIES layer which is less than the Bethe range of 20 kv electrons.

Resolution test patterns were written with the direct E-beam writing mode at 10 kv and at 15 kv on plates 52H using MEBES III electron beam pattern generator. E-beam written lines and spaces down to 0.5 micrometer (i.e., 1.0 $\mu$m period) were resolved in the test patterns written with an E-beam accelerating voltage of 10 kv, whereas lines and spaces down to 0.8 micrometer (i.e., 1.6 micrometer pitch) were resolved in the test patterns written with an E-beam accelerating voltage of 15 kv.

It was estimated that the thickness of the IIES layer of plates 52H is about 3.0 micrometer. The Bethe ranges are about 1.2 $\mu$m and 2.3 $\mu$m for electrons with accelerating voltages of 10 kv and 15 kv respectively.

It was determined that the thicknesses of the 10 kv and 15 kv E-beam-darkened images are less than the thickness, 3.0 $\mu$m of the IIES layer of plates 52H and may also be less than the corresponding Bethe ranges (1.2 $\mu$m and 2.3 $\mu$m at 10 kv and 15 kv respectively). It is likely that before the kinetic energy of penetrating electrons drops to zero, they no longer have a sufficient energy to overcome the potential barrier in the formation of silver particles/specks of molecular dimension within IIES layers, and that the depth of E-beam darkened images in IIES layers is limited to an E-beam darkening range which is generally less than the Bethe ranges.

From the discussion immediately above, it is apparent that there are at least two approaches to record linewidths and geometries of less than about one micrometer using heat erasure mode of recording in IIES layers. First, the IIES layers are made to have a thickness of equal to or less than about 1 micrometer. Second, to record submicrometer geometries in an IIES layer whose thickness is substantially more than about one micrometer, the thickness of the E-beam darkened images is limited by the kinetic energy of the flood/blanket exposure-electrons; namely, electron beams having an accelerating voltage of less than about 15 kv is employed to flood expose the IIES layer.

Optical recording on E-beam flood exposed and darkened IIES layer using heat erasure mode was carried out at recording rates of 4.65 up to 7.75 MHz depending on the recorded spot size. Glass plate samples, e.g., 1"×3" in size, were mounted on a turn table rotating at 500 rpm. The recording head (comprising a microscope objective) is located at the recording track having a diameter of about 7.0 inch. The recording beam is a focused laser spot moving at a linear speed of about 4.65 meter per second. A cw TEMoo mode laser beam having a beam diameter of 1.4 mm and a wavelength of 488 nm from Ar-ion laser (spectra physics Model No. 2016) passes the following optical elements before it focused on the surface of an E-beam darkened IIES layer:

(1) A mechanical shutter having a 1 mm aperture; since the duration for the turntable to make one revolution is 120 m sec, a laser pulse of 120 m sec ensures that one track with one pass only is recorded on the glass plate sample.

(2) A beam expander with or without a spacial filter; the cross section of the laser beam is expanded to fill the objective lens.

(3) A recording head comprising an objective lens; the objective lens has a NA value of 0.40.

The recording surface power of the focused laser beam on the glass plate sample is in general about 30 to 50% of the laser output power.

In order to compare the recording sensitivity of a large number of glass plate samples, glass plate samples were recorded in a transmission mode of recording and were mounted slightly inclined from the horizontal surface of the turntable and were recorded with an laser output power of 30 mulli watt up to 200 milli watt. The IIES layer of the glass plate samples was so positioned with a tilt, on the turntable that a section of the IIES layer along the recording track will always come into the focus range of the objective lens, although the recording system has no servo focusing. It is found that a laser output power of 200 milli watt ensures that all glass plate samples of example 17 are sufficiently sensitive to record a heat-erasure-track at a linear speed of 4.65 meter per sec. The relative line width as well as the relative length of the recorded heat-erasure-tracks among the glass plate samples relate to the relative recording sensitivity of the glass plate samples in the heat-erasure-mode of recording. It is found that among the glass plate samples of example 17, the recorded line widths range from 0.6 $\mu$m up to more than 4 $\mu$m using a laser output power of 200 milli watt. It is observed in all the recorded samples that the recorded heat-erasure-tracks show an abrupt transition from opaque to totally transparent at the edge of the line widths. This is apparently the manifestation of a threshold heat erasure phenomenon. It is observed that the edge acuity of the recorded lines using heat erasure mode is superior than those images recorded with the direct E-beam writing mode using the same E-beam accelerating voltage as for flood exposure.

Due to the tilt of the recording surface, i.e., the e-beam darkened IIES layer, from the horizontal plane, the IIES layer is brought into perfect focus, only within a few micrometer length along the recording track. As the recording spot on the glass surface moves along the recording track away from the sharp focus, the laser spot is no longer in sharp focus. The recorded line width increases as the laser spot went out of focus further. The E-beam darkened IIES layers whose information bearing optical density being heat erased at a lower threshold temperature have a better recording sensitivity of heat erasure. A more sensitive glass plate thus recorded a longer trace of laser erasure. In this experiment, the larger/wider line width recorded in the more sensitive glass plate, is due to heat erasure by a more defocused laser beam.

In the erasure mode of recording using a focused laser beam having a wavelength at which there exist the information bearing optical density, the recorded line width in the HEBS glasses is self-limiting. The phenomenon of the self-limiting line width is discussed immediately below. The E-beam darkened IIES layer absorbs light energy of a focused laser beam; as soon as the spot of the IIES layer being exposed to a focused laser beam reaches the threshold temperature, it becomes transparent and no longer absorbs the energy of the write beam, and no more heat is generated within the spot. Therefore, using heat erasure mode of recording HEBS glasses showed a wide exposure dosage latitude that is advantageous for recording a constant line width provided that the information bearing optical density exist at the wavelength of the recording beam. This phenomenon is herein referred to as self-limiting linewidth.

Since the recorded lines and images resulted from heat erasure mode of recording are totally transparent, the MTF (modulation transfer funtion) from 1-bit to 0-bit is simply a function of the optical density of the E-beam darkened areas of the glass plate and the MTF values can be very large. For example, in a reflective mode of read the MTF values are 0.82 and 0.98 for the glass plates having information bearing optical density values of 0.5 and 1 respectively.

It is found that for a HEBS glass composition of table 1 of example 1 the sensitivity of the IIES layer in heat-erasure-mode of recording can in general be optimized through the surface treatment so that it can be recorded with a surface power of less than about 50 mw within a recording spot size of 1 $\mu$m diameter at 5 M Hz recording rate.

In many of the glass compositions the IIES layer can in general be recorded with a surface power of less than about 25 milli watt using a recording spot size of 1 $\mu$m, at 5 MHz rate. For example, 0.8 $\mu$m lines were recorded at 5.8 MHz rate in plate 52 N. The surface power was about 15 milli watt. The required writing energy density of plate 53N is about 300 to 500 mj/cm$^2$.

Due to heat threshold effect, the wavelength of the read beam can in general be the same as the write beam. To demonstrate the capability of non-destructive read out, the write beam was reduced to 1 milli watt on the recording surface. Plate 52N showed no evidence of recording after 24 hours exposure to the focused CW TEMoo write beam at 488 nm at the reduced write beam intensity of about 1 mw/$\mu$m$^2$ along the circular track, 7" in diameter, rotating at 500 rpm.

One of the products of the present invention is a glass plate bearing a recorded image readable in actinic radiation, said glass plate having an integral ion-exchanged surface layer (IIES layer) bearing the recorded image, said IIES layer composed of a glass layer of a glass composition that has been ion-exchanged with an acidic aqueous solution containing soluble ionic silver to diffuse silver ions into said IIES layer to render said IIES layer sensitive to high energy beams, said glass composition comprising at least one alkali metal oxide selected from the group comprising $Li_2O$, $Na_2O$, $K_2O$, $Cs_2O$ and $Rb_2O$, at least one photosensitivity inhibitor and/or RS-Suppression agent, $SiO_2$ and up to saturation of chloride in its glass melts, said integral ion-exchanged surface layer having Ag+ ions therein and/or AgCl-containing and/or $Ag_2O$ containing and/or Ag+ ion-containing microcrystals and/or microphases therein, containing silanol groups and/or water in the concentration range between about 0.01–12% by weight $H_2O$, the concentration of alkali metal ions in said integral ion-exchanged surface layer being less with an increase in the concentration of Ag+ ions, said integral ion-exchanged surface layer containing at least a portion of the amount of the photosensitivity inhibitors, the RS-Suppression agents, the glass network formers and chloride contained in said glass composition, the amounts of the photosensitivity inhibitors, the silver components and chloride being effective to render the IIES layer substantially photoinsensitive to substantially all actinic radiation having a wavelength longer than about 365 nm and photosensitive to radiation of energy higher than that of a wavelength of about 365 nm, the surface quality and surface figure of said IIES layer remaining substantially the same before and after ion exchange reactions, said IIES layer having been flood/blanket exposed and uniformly darkened with a high energy beam, the recorded image being formed in the darkened IIES layer by erasing in a predetermined pattern, portions of said darkened layer to produce the recorded image using a high intensity light beam which is absorbed by the E-beam darkened IIES layer and/or by glass constituents of the IIES layer.

The high energy beam can be selected from a high voltage electron beam, an ion beam, an atomic beam, a molecular beam, x-ray radiation or deep uv radiation having wavelengths shorter than about 300 nm. Flood/blanket exposures with a high energy beam can be achieved without a highly directional or parallel beams. Therefore, the atomic beam and the molecular beam are herein defined to include gases at elevated temperatures. The preferred gas molecules or atoms are small molecules or atoms, particularly the electron donor molecules or atoms such as hydrogen and the like which can penetrate and/or diffuse through at least a portion of the IIES layer in thickness dimension at relatively low temperatures, e.g. about 200° C. Said temperature is preferably less than about 400° C., more preferably less than about 300° C. and most preferably less than about 200° C.

In another product of the present invention, the recorded image is formed in the darkened IIES layer using engraving mode of recording in a predetermined pattern to produce the recorded image using a high intensity light beam which is absorbed by the E-beam darkened IIES layer and/or by glass constituents of the IIES layer.

In another product of the present invention, the recorded image is formed in a clear IIES layer which is not pre-darkened by high energy beams, with a pure ablation mode of recording to produce the recorded image using a high intensity light beam, e.g., a $CO_2$ laser, which is absorbed by glass constituents of the IIES layer, and/or by the clear IIES layer.

It has been found that the addition of MgO in the glass composition of the HEBS glasses in general and in ZnO-containing glasses in particular, promotes and/or enhances photosensitivity of HEBS glasses, thus the addition of MgO in the HEBS glass compositions can be advantageously employed in HEBS glasses for applications, e.g., write-erasable optical discs using a uv laser modulated at two intensity or power levels to write and to erase. The IIES layer may contain sufficient amounts of the photosensitivity inhibitors, MgO, the silver components and chloride being effective to render the IIES layer substantially photoinsensitive to substantially all actinic radiation having a wavelength longer than about 436 nm and photosensitive to radiation of energy higher than that of a wavelength of about 436 nm.

In a preferred product, the IIES layer contains sufficient amounts of the photosensitivity inhibitors, MgO, the silver components and halide being effective to render the IIES layer substantially photoinsensitive to substantially all actinic radiation having a wavelength longer than about 400 nm and photosensitive to radiation of energy higher than that of a wavelength of about 400 nm.

In another preferred product, the IIES layer contains sufficient amounts of the photosensitivity inhibitors, MgO, the silver components and chloride being effective to render the IIES layer substantially photoinsensitive to substantially all actinic radiation having a wavelength longer than about 300 nm and photosensitive to radiation of energy higher than that of a wavelength of about 300 nm.

In still another preferred product, the IIES layer contains sufficient amounts of the photosensitivity inhibitors, MgO, the silver components and halide being effective to render the IIES layer substantially photoinsensitive to substantially all actinic radiation having a wavelength longer than about 254 nm and photosensitive to radiation of energy higher than that of a wavelength of about 254 nm.

One of the preferred glass compositions contains on the mole percent oxide basis, 0.5–10% MgO. One of the more preferred glass compositions contains in mole percent 0.5–10% MgO and 2–15% ZnO. Another of the more preferred glass compositions contains in mole percent 1–6% MgO. Another of the more preferred glass compositions contains on the mole percent oxide basis, 2–5% MgO.

In a preferred product, the glass compositions consists essentially of, in mole percent on the oxide basis, about 3–30% total of one ore more alkali metal oxides, about 0.5–35% total of photosensitivity inhibitors (PI agents) and RS-suppression agents, up to 35% of acid-durability-and-glass-network strengtheners (ADAGNS), up to 20% $P_2O_5$, up to 25% $B_2O_3$, up to 4% F, up to about 6% Cl, up to 2% Br, up to 2% I, and 20–93% $SiO_2$, the sum amount of the above components constituting at least 75 mole percent of the glass composition.

One of the preferred glass composition consists essentially of, in mole percent on the oxide basis, about 9–20% of $Li_2O$, $Na_2O$, $K_2O$, $Rb_2O$, $Cs_2O$ or combinations thereof, 0.5–8.4% total of photosensitivity inhibitors (PI agents) and RS-suppression agents (RSS agents) including 0.5 to 7.4% $TiO_2$, 3.6–10% ZnO, 6.0–4% $Al_2O_3$, up to 6% MgO, up to 4% CaO, up to 4% BaO, up to 3.5% PbO, up to 4% SrO, up to 7.2% $B_2O_3$, up to 7.2% $P_2O_5$, up to 1.5% halide selected from the group consisting of F, Br, I and combinations thereof, 0.2–6% Cl and 58.5–86% $SiO_2$. The glass composition contains at least an effective amount of PI agents to render said IIES layer photoinsensitive to at least a spectral portion of the actinic radiation. A more preferred glass composition contains 0.5–6% $B_2O_3$. Another more preferred glass composition contains about 10–20% of $Li_2O$, $Na_2O$, $K_2O$, $Rb_2O$, $Cs_2O$ or combinations thereof, and about 0.8–6% Cl in the glass batch. Another more preferred glass composition contains about 12–16% of $Li_2O$, $Na_2O$, $K_2O$ or combinations thereof and 0.4–3% Cl.

Another of the preferred glass composition consists essentially of, in mole percent on the oxide basis, about 5–25% of $Li_2O$, $Na_2O$, $K_2O$, $Cs_2O$, $Rb_2O$, or combinations thereof, up to about 6% Cl, about 0.5–25% total concentration of photosensitivity inhibitors and RS-suppression agents, up to about 20% ZnO, up to about 20% MgO, up to about 15% $Al_2O_3$, up to about 20% PbO, up to about 20% CaO, about 2–25% total of at least one acid-durability-and-glass-network-strengthener selected from the group comprising MgO, ZnO, $Al_2O_3$, PbO, CaO, and combinations thereof, up to about 15% $B_2O_3$, up to about 4% F, up to about 2% Br, up to about 2% I, and about 50–89% $SiO_2$.

Another preferred glass composition consists essentially of, in mole percent on the oxide basis, about 12–18% of $Li_2O$, $Na_2O$, $K_2O$ or combinations thereof, about 3–10% total of oxides of transition metals having 1 to 4 of d-electrons in the atomic state, including about 3–10% $TiO_2$, up to 10% $B_2O_3$, about 4–15% ZnO, about 0.5–5% $Al_2O_3$, about 0.4–3% Cl, and about 60-80% $SiO_2$. The glass composition contains a sufficient amount of the oxides of transition metals having 1 to 4 d-electrons in the atomic state to render the IIES layer photoinsensitive to at least a spectral portion of the actinic radiation. One of the more preferred glass composition contains 12-16% $Li_2O$, $Na_2O$, $K_2O$ or combinations thereof, 3% to 10% $TiO_2$. The glass composition contains a sufficient amount of $TiO_2$ to render the IIES layer photoinsensitive to at least a spectral portion of the actinic radiation. Another of the more preferred glass compositions consists essentially of about 13-16% of $Li_2O$, $Na_2O$, $K_2O$ or combinations thereof, about 1.0-7% $TiO_2$, about 0.5-6% $B_2O_3$, about 5-10% ZnO, about 0.5-2.5% $Al_2O_3$, about 65-75% $SiO_2$ and chloride that is saturated or supersaturated in the glass melt. Another more preferred glass composition contains 1-4% $B_2O_3$.

In another preferred product the glass composition consists essentially of, in mole percent on the oxide basis, about 5-25% total of one or more alkali metal oxides, at least 1.5%, but less than 15% total of at least one photosensitivity inhibitor (PI agents) selected from the group comprising $TiO_2$, $Nb_2O_5$, $Y_2O_3$, $Ta_2O_5$, and combinations thereof, 0-about 10% MgO, 0-about 10% CaO, 0-about 10% SrO, 0-about 15% ZnO, 0-about 10% $Al_2O_3$, 0-about 10% PbO, 0-about 10% BaO, 0-about 12% $B_2O_3$, about 2-20% total of at least one of acid-durability-and-glass-network-strengtheners (ADAGNS) selected from the group comprising MgO, ZnO, $Al_2O_3$, PbO, and CaO, 0-about 3% of F, Br, I or combinations thereof, 0-about 6% Cl, and about 50-89% $SiO_2$. The composition containing at least an effective amount of the photosensitivity inhibitors to render the IIES layer photoinsensitive to at least a spectral portion of the actinic radiation. A more preferred glass composition contains 4-15% total of at least one ADAGNS. Another more preferred glass composition contains 1.5-15% $TiO_2$.

In still another preferred product, the glass composition consists essentially of, in mole percent on the oxide basis, about 5-25% of one or more alkali metal oxides, about 0.5-20% total of at least one photosensitivity inhibitor (PI agent) and RS-suppression agent (RSS agent) selected from oxides of transition metals having 1 to 4 d-electrons in the atomic state, 0-about 15% MgO, 0-about 15% CaO, 0-about 15% SrO, about 2-20% ZnO, 0-about 15% $Al_2O_3$, 0-about 15% BaO, 0-about 15% PbO, provided that the sum amount of acid-durability-and-glass-network-strengtheners (ADAGNS) selected from the group comprising MgO, ZnO, $Al_2O_3$, PbO and CaO is from about 2% to 30% 0-about 15% $B_2O_3$, 0-about 3% of F, Br, I or combinations thereof, 0-about 6% Cl, and about 50-89% $SiO_2$. A preferred glass composition contains 0.2-2% Cl in the glass melt batch. Another preferred glass composition contains 0.4-4% Cl in the glass batch.

To produce HEBS glasses with a high sensitivity of heat erasure, strong oxidizing glass batch containing e.g., alkali nitrates can be employed. The glass batch can be melted under strong oxidizing melting conditions. On the other hand, to increase the threshold temperature of the heat erasure, less oxidizing glass batch can be employed. The glass batch can be melted under less oxidizing or slight reducing conditions.

The ion exchange reactions were carried out in aqueous solutions containing silver ions having a concentration ranging from less than 0.01 mole per liter up to the concentration of a saturated $AgNO_3$ solution, and containing hydrogen ions ranging from about $10^{-6}$ mole per liter to more than 3 mole per liter. A preferred concentration range of Ag+ ion in the aqueous solution is from about 0.01 mole per liter up to the concentration of a saturated $AgNO_3$ solution. A preferred concentration of H+ ions in the aqueous solution is from about 0.01 to about 3 moles per liter. One of the more preferred concentration ranges of Ag+ ions in the aqueous solution is from about 0.1 mole per liter up to the concentration of a saturated $AgNO_3$ solution. One of the more preferred concentration ranges of H+ ions in the aqueous solution is about 0.05-1.5 moles per liter of the aqueous solution. The hydrogen ions are in general added to the aqueous ion exchange solution in the form of strong acids such as Nitric acid, although weak acids such as $H_3BO_3$, $H_3PO_4$ and acetic acid can be employed. HCL is not most desirable due to the very low solubility products of AgCl. One of the preferred aqueous solution contains $HNO_3$ ranging from about 3 cc up to about 70 cc of 16 N $HNO_3$, per liter of the aqueous solution. Another of the preferred aqueous solution contains silver ions ranging from about 100 grams of $AgNO_3$ per liter of the aqueous solution up to the concentration of a saturated $AgNO_3$ solution. Another of the preferred aqueous solution contains about 400 g $AgNO_3$ per liter of the aqueous solution, and about 3 to 100 cc of 16N $HNO_3$ per liter of the aqueous solution. Another of the preferred aqueous solution contains about 20 g $AgNO_3$ per liter of the aqueous solution, and has a pH of between abut 1 to 6.

It has been determined that from zero up to saturated concentrations of one or more alkali metal ion containing salts can be included in the aqueous ion exchange solution to bring about desirable rates and/or extents of the ion exchange reactions. Said salts include $LiNO_3$, $NaNO_3$ and $KNO_3$. The aqueous solution may also contain up to saturation of dissolved $SiO_2$, and/or silica gel, and/or water soluble silicate, and/or glass powder of HEBS glasses and/or one or more constituent cations of the HEBS glass composition.

The cycle time for the ion exchange treatment may range from less than 20 minutes up to more than eight hours. A preferred cycle time ranges from about 20 minutes up to about four hours. Another preferred cycle time ranges from 30 minutes up to two hours. The cycle time is herein defined as the duration of an autoclave run and is the time it takes to heat the reaction vessel (i.e., the autoclave) containing the glass articles and ion exchange solution therein, up from room temperature to a maximum temperature and back to room temperature. The cycle time includes the duration at reaction temperature with or without one or more constant temperature holds as well as the heat-up and cooling down through lower temperature range where ion exchange reaction ceases. The cycle time can be quite different for reaction vessels of different sizes and will in general be longer for a larger (massive) reaction vessel. However, the duration at the reaction temperatures should be independent of the size of the reaction vessel to obtain an IIES layer with identical properties. The maximum temperature of ion exchange reactions is preferably between about 300° C. and the annealing point of the base glass composition. The glass article is in general treated at ion exchange reaction temperatures for a period of time between about 1 minute to more than 8 hours. The glass article is preferably ion exchanged at reaction temperatures above about 250° C. for a duration of time between about 1 minute to two hours, and more preferably above about 300° C. for a duration of time ranging from about one minute up to about 2 hours. The glass article can be treated at ion exchange temperatures of about 350° C. below the strain point of the glass composition up to the annealing point of the glass composition. Preferably the ion exchange reactions are at temperatures between about 200° C. and 400° C. And more preferably the ion exchange reactions are at temperatures between about 300° C. and the annealing point of said glass composition.

It has been determined that the spectral band shape, the wavelength of the absorption peak and the absorption-band-width of the high energy beam exposure induced absorption in HEBS glasses are functions of the HEBS glass composition, temperature and duration of the ion exchange reactions, the acidity and ingredients of the ion exchange solution, and the energy (e.g., the accelerating voltage of electron beams) and dosage of the high energy beam. It has been found that the wavelength of the absorption peak ranges from less than 430 nm to more than 820 nm, and that the E-beam exposure induced coloration in HEBS glasses includes yellow, reddish orange, reddish brown, brown, red, reddish magenta, reddish black, magenta, bluish magenta, blue, violet gray, blue gray, bluish black, gray and black. Therefore, the coloration and/or the spectral band shape and/or the wavelengths of the absorption peaks and/or the band width of the absorption spectra can be tailored for applications through the choice of base glass composition, ingredients and acidity of the aqueous ion exchange solution, temperature and duration of the ion exchange reactions, and/or energy (e.g., the accelerating voltage of electron beams) and dosage of the high energy beam.

For many HEBS glass compositions, the wavelength of the absorption peak and/or the saturation optical density and/or the absorption band-width increase with an increasing temperature and/or duration of ion exchange reactions, and decrease with an increasing acidity of the aqueous ion exchange solution. Therefore, a variety of colorations and/r a variety of the spectral band shape including the wavelength of the absorption peak and the absorption band width of the high energy beam darkened HEBS glasses can be prepared from a single base glass composition, using temperature and duration of the ion exchange reactions, and the acidity and ingredients of the ion exchange solution as variable parameters to tailor HEBS glasses for various applications.

The coloration and hue of HEBS glasses, and/or the absorption band shapes including the wavelength of the absorption peak and the absorption band width can also be tailored for applications using the energy (e.g., the accelerating voltage of electron beams) and dosage of the high energy beam as variable parameters. Namely, a variety of coloration and/or hues, and/or a variety of spectral band shapes can be obtained within a single piece of a HEBS glass article using the energy and dosage of the high energy beam as variable parameters.

Mechanism of Darkening by High Energy Beams

The composition and/or microstructure of the AgCl-containing microcrystals and/or microphases of the present inventive products are undoubtedly different than the various photosensitive AgCl crystals present in conventional photographic emulsions, photochromic glasses of U.S. Pat. Nos. 3,208,860 and 4,102,693, and photosensitive colored glasses exhibiting alterable photo-anisotropic effects of U.S. Pat. Nos. 4,191,547 and 4,297,417.

The mechanism of E-beam darkening as well as the compositional and/or structural origin within the microcrystals and/or microphases of the present products in eliminating the photosensitivity are not totally understood. It is believed, based upon present findings, that the energy band gap between the valence band and the conduction band of the AgCl-containing microcrystals and/or microphases within the ion-exchanged surface layer of the HEBS glass articles increases due to the addition of the photosensitivity inhibitors, e.g., $TiO_2$, in the glass melts of the anhydrous base glasses. As long as the energy band gap is sufficiently large, e.g., sufficiently larger than the quanta of impinging radiation, the photosensitivity is eliminated.

It is believed that the energy W, which is the work necessary to remove an electron from a contacting silver metal particle/speck into a conduction level of a AgCl-containing microcrystal or microphase of the inventive products, increases as said band gap increases. In other words, the conduction energy levels of the AgCl-containing microcrystals and/or microphases of the inventive products are raised relative to the valence band of the microcrystals and/or microphases, and are also raised relative to the filled conduction levels of the contacting metallic silver particles and/or specks, via the addition of photosensitivity inhibitors in the glass melts.

The energy W is the minimum quanta of energy required to bleach or dissolve silver atoms or specks of silver metal which are in contact with the AgCl-containing microcrystals and/or the microphases. For example, the latent image of a AgCl-photographic emulsion having a W value of 1.3 ev can be bleached by red light. Therefore, when the value of W of E-beam exposed, silver specks-containing, microphases and/or microcrystals is greater than all the quanta of radiations, including visible light and ultraviolet, the E-beam darkened image within the HEBS glass articles is inert to actinic radiation, and can not be bleached by red light or other actinic radiations, including uv and longer wavelengths.

AgCl-containing microcrystals and/or microphases within the IIES layer act as very effective traps for the secondary and tertiary electrons that are generated by the high voltage E-beam, that is the primary electrons, in the silicate glass network. Apparently very efficient mechanisms of reduction of silver ions by E-beam exist.

The direct E-beam writing mode is the manifestation of a print-out effect of the integral ion-exchanged surface layer. The reduction of silver ions in the E-beam sensitive IIES layer by a high voltage electron beam may have a quantum efficiency of up to or even in excess of 1,000 due to the large number of secondary and third electrons. Apparently each primary electron causes the reduction of up to or more than one thousand silver ions within the ion-exchanged surface layer of the present invention, provided that the accelerating potential of the electron beam is in excess of about 10 kv. A print-out effect is herein defined as the direct reduction, of silver ions by high energy beams to silver metal particles and/or specks, which results in an image of high/good contrast without any requirement for a subsequent development and/or image enhancement step.

The print-out effect is expected to take place, whenever the integral ion-exchanged surface layer of the HEBS glass article is bombarded with a high energy beam which generates scattered electrons within the surface layer. Besides the high voltage electron beams, other high energy beams operable on the HEBS glass articles include ion beams (e.g., H+, H$_2$+, Li+, He+, Ar+, F− and Cl− ions), atomic beams (e.g., spattered and/or thermally evaporated alumihum), molecular beams and x-ray.

The print-out effect of the integral ion-exchanged surface layer upon exposure to actinic radiation such as depicted by curves A, F and G of FIG. 10 is not desirable, and the absence of such photosensitivity is one of the primary characteristics of the products of the present invention. Nevertheless, it is possible to adjust the value of energy W which is defined in the preceding paragraphs above to a proper value that the image within the ion-exchanged products is permanent under prolonged exposure to intense visible light and/or near-uv, yet, the print-out effect of the integral ion-exchanged surface layer is effective using the radiation having wavelengths of less than about 300 nm as a write beam. A suitable recording light beam is far-uv light, e.g., in the wavelength range of about 180 nm to 200 nm. The advantages of employing the far-ultraviolet radiation in the wavelength range of about 180 nm to 200 nm are as follows: (1) the intense absorption of the radiation by the HEBS glass articles effectively limits the far-uv darkened image within a thickness of less than one micrometer; (2) either excimer lasers at 193 nm or the low-pressure mercury line at 185 nm can be employed as the write beam; (3) the optics can be fabricated from high-purity quartz.

Ion Exchange Reactions

The exact chemical reactions during the ion-exchange process depend on the specific base glass composition, the ingredients of the ion-exchange solution as well as the temperature and duration of the ion-exchange reactions. Although the exact chemical reactions are not known with complete certainty, the following equations describe those reactions, at elevated temperatures, which appear most reasonable and common to all alkali metal silicate glasses immersed in aqueous ion-exchange solutions of the present invention.

$$H^+_{solu} + SiO^-M^+_{GL} \rightarrow SiOH + M^+_{solu} \quad (1)$$

$$Ag^+_{solu} + SiO^-M^+_{GL} \rightarrow SiO^-Ag^+_{GL} + M^+_{solu} \quad (2)$$

Ions with the subscripts "solu" are in the ion exchange solution. Compounds and ions with the subscript "GL" are in the base glass. M+ represents alkali metal ions, such as Na+ ion. At least a portion of the alkali metal ions M+$_{GL}$ in the glass network of the surface layer are replaced by silver ions Ag+$_{solu}$ and hydrogen ions H+$_{solu}$ of the aqueous ion-exchange solution. According to the Law of Mass Action $$\frac{[SiOH][M^+_{solu}]}{[H^+_{solu}][M^+_{GL}]} = K_1 \quad (1a)$$

and $$\frac{[Ag^+_{GL}][M^+_{solu}]}{[Ag^+_{solu}][M^+_{GL}]} = K_2 \quad (2a)$$

Where K$_1$ and K$_2$ are the equilibrium constants of reactions (1) and (2) respectively. Combining equations (1a) and (2a), the concentration of silver ions in the integral ion-exchanged surface layer is obtained. Namely, $$[Ag^+_{GL}] = \frac{K_2}{K_1} [SiOH] \frac{[Ag^+_{solu}]}{[H^+_{solu}]} \quad (3)$$

K$_1$ is a function of the differences between the chemical potentials of hydrogen ions in glass and those of the various species of alkali metal ions in the glass matrix. K$_2$ relates to the chemical potentials of silver ions in glass relative to those of the various species of alkali metal ions in the matrix of the glass network.

For at least some of the alkali metal-titanium-zinc-alumino-silicate glasses, it has been determined that the smaller alkali metal cations in the glass network favors a greater extent of ion exchange by silver ions and hydrogen ions. Thus for example, a larger fraction of Na+ ions in glass is exchanged by Ag+ ions and H+ ions than the fraction of K+ ions being exchanged. It has been further determined that the relative amounts of silver ions and hydrogen ions being exchanged into the glass network is strongly dependent upon the acidity of the ion-exchange solution, and that the total amount (on the mole percent oxide basis) of alkali metal ions diffused out of the glass network of a given glass composition is relatively insensitive to the acidity of the aqueous ion exchange solution.

From equation (3), it is seen that the concentration of silver ions in the integral ion-exchanged surface layer is proportional to the concentration ratio [Ag+$_{solu}$]:[H+$_{solu}$] of silver ion to hydrogen ion in the aqueous ion-exchange solution, and relates to the relative chemical potential of silver ions and hydrogen ions in glass, and is proportional to the concentration of silanol groups in glass.

The concentration of silanol groups, as is indicated in equation (3), is proportional to the concentration ratio [H+$_{solu}$]:[Ag+$_{solu}$] of hydrogen ions to silver ions in the aqueous ion-exchange solution. However, the concentrations of silanol groups are not determined solely by the ion-exchange reaction, since the silanol groups are also the reaction products of the glass hydration which occurs concomitantly with and/or precedes the ion exchange reactions of equations (1) and (2). The hydration reaction can be represented by equation (4).

$$SiOSi + H_2O \rightleftharpoons 2\, SiOH \quad (4)$$

In the ion-exchanged surface layer, some of the silanol groups may recombine while cooling in the autoclave to room temperature (as represented by the shorter arrow of equation (4), pointing left). It is conceivable that the forms of molecular water which are present in steam hydrated glasses (i.e., alkali metal silicate glasses having been hydrated in the gas phases), and were described by the present inventor in *Journal of Non-Crystalline Solids*, 41 (1980) 381–398, may exist in the ion-exchanged surface layer at room temperature. Namely, molecular water may exist in resonance forms in equilibrium with hydrogen bonded silanol groups and hydroxyl groups.

The amount of total water in the integral ion-exchanged surface layer is readily measurable experimentally and is a function of the glass composition, the ingredients of the aqueous ion-exchange solution and the temperature of the ion-exchange reactions. The total water content in ion-exchanged glasses was determined experimentally from the weight loss on ignition at temperatures exceeding 800° C. The concentrations of various species of water including free silanol groups, hydrogen bonded silanol groups and molecular water in the ion-exchanged surface layer can be determined from near infrared spectra. However, the total water content as well as the concentrations of the various species of water at elevated temperatures during the ion-exchange reactions are in general not known precisely, since the ion-exchange reactions are not frozen instaneously from the elevated temperature. It is conceivable that the concentrations of the silanol groups at the reaction temperature increase with an increasing temperature of ion-exchange reactions in an aqueous solution. Namely, the extent of forward reaction (toward right) in equation (4) increases at a higher reaction temperature. Due to the added concentration of silanol groups from hydration, the forward reaction of equation (1), i.e., the exchange of hydrogen ions for alkali metal ions in glass is suppressed. Consequently, more alkali metal ions in the glass network are available for exchanging with silver ions of the contacting aqueous solution. As a result, the concentration of silver ions in the integral ion-exchanged surface layer increases with the temperature of the ion-exchange reactions.

Other operational parameters which have been employed to alter (or increase) the concentration of silver ions in the ion-exchanged surface layer are the concentrations of silver ions and hydrogen ions/hydronium ions in the aqueous ion-exchange solution. (Even when the hydrogen ion, i.e., proton is the diffusion species, the hydronium ion is the predominant form of the proton in aqueous solutions, however, for the convenience of the presentation, hydronium ion and hydrogen ion are used herein interchangeably.) As is expected from equation (3), when the concentration of silver ions in the aqueous solution is kept constant, the concentration of silver ions in the ion-exchanged surface layer increases as the concentration of hydrogen ions in the aqueous ion-exchange solution decreases. On the other hand, when the acidity of the aqueous solution is kept constant, the concentration of silver ions in the ion-exchanged surface layer increases with an increasing concentration of silver ions in the aqueous solution.

It has been determined that as the acidity of the aqueous ion-exchange solution is increased, the water content of the ion-exchanged surface layer increases. All the diffusion species in glass, e.g., alkali metal ions, $H^+$ (and/or $H_3O^+$) and $Ag^+$ have larger values of diffusion coefficients in a more highly hydrated glass layer, and diffuse across the ion-exchanged surface layer more quickly. Consequently, the rate of penetration of silver ions into the glass article in the thickness dimension increases with an increasing acidity of the aqueous ion-exchange solution.

As is apparent from the foregoing discussion, the important effects of the concentration of hydrogen ions in the aqueous ion-exchange solution on the products of the present invention are at least twofold. Namely, as the acidity of the aqueous solution decreases, the penetration rate of the ion-exchange reactions decreases, and the concentration of silver ions in the ion-exchanged surface layer increases.

It is to be observed that there exists a lower limit on the concentration of hydrogen ions in the aqueous ion exchange solution. This is because the etching and/or dissolution of silicate glass network by the aqueous ion exchange solution become significant when the pH values of the aqueous solution exceeds about 3 to 7 depending on the glass composition. It is thus desirable to employ a buffered solution when the pH value of the aqueous solution employed is in excess of unity. A buffered solution is particularly desirable when the pH value of the aqueous ion-exchange solution is in excess of 2. Copper salts, such as $Cu_2O$ and $Cu(NO_3)_2$, have been found to be good buffering agents for the ion-exchange solution. The etching and/or dissolution of the glass article can be further retarded through the inclusion in the aqueous ion exchange solutions of cations, $SiO_2$ in particular, of the glass constituents. Soluble silicates, e.g., $Na_2SiO_3$ and $K_2SiO_3$, are desirable sources of $SiO_2$, and silica gel is a convenient source of $SiO_2$.

The temperature of the ion-exchange reactions is another important parameter in producing the products of the present invention. The concentration of silver ions in the ion-exchanged surface layer as well as the penetration rate of the ion-exchange reactions increase with an increasing temperature of the ion-exchange reactions.

The applicable range of the temperature of the ion exchange reactions is closely related to the anhydrous base glass compositions. The lower limit of the reaction temperature is observed at about 250° C. to 400° C. below the strain point of the anhydrous base glass and the upper limit is at about the annealing point of the base glass. Preferably the ion-exchange reaction is carried out between about 200° C. and 400° C., most preferably between about 240° C. and 360° C. At high temperatures, such as 360° C. or higher, the ion-exchange reaction is very rapid, and makes it difficult to control the depth of penetration of the reaction.

Lithium ion is present in the ion-exchange solution, to advantage, during the ion-exchange reaction. To some extent lithium ions appear to limit hydration of the glass. Lithium is conveniently added to the ion-exchange solution as $LiNO_3$, but other soluble lithium salts can be used. We have not discovered a critical lithium concentration range, and for convenience we have generaly used 200 g of $LiNO_3$ per liter of ion-exchange solution.

The ion-exchange reaction can be conducted in a molten salt bath containing $Ag^+$ ion and free of water. Preferably the salt bath is prepared from silver salts with relatively low melting points, such as $AgNO_3$. $LiNO_3$, $NaNO_3$, $KNO_3$, $Cu(NO_3)_2$, and the like can be added to further reduce the melting point of the salt bath.

The invention may be further understood by reference to the following illustrative examples.

EXAMPLE 1

Table I below sets forth a group of batch glass compositions useful for the production of HEBS glass articles. The components of the base glass are expressed in approximate mole percent on the oxide basis. The compositions are stated to be in approximate mole percent since the proportions cited reflect direct calculations from weight percent of the batch ingredients, e.g., $Na_2O$ from $Na_2CO_3$ and/or $NaNO_3$. The sum of the individual ingredients closely approaches 100 mole percent, and, for practical purposes, the amounts listed (other than halides) can be deemed to represent the mole percent of the components in the glass. The actual batch ingredients (other than halides) can comprise any materials, either the oxides or other compounds, which, when melted together, will be converted into the desired oxide composition in the proper proportions. The halides in the batch were commonly included in alkali metal containing compounds. Inasmuch as it is not known with which cation(s) the halides are combined in the glass melt, they are simply reported as F, Cl, Br and I in accordance with conventional practice in the glass art. Due to evaporation of halides during melting, the amounts of halides in the glass are in general less than the amounts listed in Table I which are calculated from weight percent of the batch ingredients.

Glasses of the chemical compositions specified in Table I below were prepared in the following manner. The batch ingredients were thoroughly blended together, in a ball mill to assist in securing a homogeneous melt, and the mixture deposited in platinum crucibles (some melts were melted in quartz or alumina crucibles). The crucibles were then placed in a laboratory furnace operating at about 1300°–1550° C. The batches were melted for 2-24 hours, and the melts were then poured into patties and annealed. Plates were prepared by grinding the patties to glass plate of uniform thickness, about 1-2 mm thick, and polishing the surfaces to optical quality surfaces.

These plates were then subjected to ion-exchange reactions for the purpose of replacing at least a portion of the alkali metal ions within a surface layer of the glass plates by silver ions as described in Example 2.

TABLE I

| | GLASS NO. | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| $SiO_2$ | 72.5 | 71.4 | 70.0 | 72.9 | 71.8 | 70.7 | 69.1 | 67.5 | 72.3 | 72.1 | 71.9 | 72.7 | 72.5 | 72.3 | 70.9 | 73.2 | 68.9 | 69.3 | 71.0 |
| $Li_2O$ | | | | 4.1 | 4.0 | 3.9 | 4.0 | 4.0 | | | | 4.0 | 4.0 | 4.0 | 4.2 | 4.1 | 9.2 | 4.0 | 4.1 |
| $Na_2O$ | 10.9 | 10.7 | 10.5 | 6.4 | 6.3 | 6.2 | 6.3 | 6.3 | 10.8 | 10.8 | 10.8 | 6.4 | 6.4 | 6.4 | 6.6 | 6.0 | 6.1 | 6.3 | 6.4 |
| $K_2O$ | 3.4 | 3.4 | 3.3 | 3.4 | 3.4 | 3.3 | 3.4 | 3.4 | 3.4 | 3.4 | 3.4 | 3.4 | 3.4 | 3.4 | 3.6 | 3.4 | | 3.4 | 3.5 |
| $TiO_2$ | 1.5 | 3.0 | 4.4 | 1.50 | 3.0 | 4.4 | 5.9 | 7.4 | 1.5 | 1.5 | 1.5 | 1.5 | 1.5 | 1.5 | 1.6 | 1.51 | 3.8 | 4.5 | 1.5 |
| $Ta_2O_5$ | | | | | | | | | 0.27 | 0.54 | 0.8 | 0.27 | 0.54 | 0.8 | 1.1 | | | | 0.57 |
| $Al_2O_3$ | 1.2 | 1.2 | 1.2 | 1.2 | 1.2 | 1.2 | 1.2 | 1.2 | 1.2 | 1.2 | 1.2 | 1.2 | 1.2 | 1.2 | 1.3 | 1.2 | 1.2 | 2.3 | 2.4 |
| ZnO | 7.3 | 7.2 | 7.1 | 7.4 | 7.2 | 7.1 | 7.2 | 7.2 | 7.3 | 7.3 | 7.3 | 7.3 | 7.3 | 7.3 | 7.6 | 7.4 | 6.9 | 7.2 | 7.4 |
| $La_2O_3$ | | | | | | | | | | | | | | | | | | | |
| PbO | | | | | | | | | | | | | | | | | | | |
| $Y_2O_3$ | | | | | | | | | | | | | | | | | | | |
| $Nb_2O_5$ | | | | | | | | | | | | | | | | | | | |
| $ZrO_2$ | | | | | | | | | | | | | | | | | | | |
| CaO | | | | | | | | | | | | | | | | | | | |
| $WO_3$ | | | | | | | | | | | | | | | | | | | |
| MgO | | | | | | | | | | | | | | | | | | | |
| SrO | | | | | | | | | | | | | | | | | | | |
| BaO | | | | | | | | | | | | | | | | | | | |
| $B_2O_3$ | | | | | | | | | | | | | | | | | | | |
| $P_2O_5$ | | | | | | | | | | | | | | | | | | | |
| $Rb_2O$ | | | | | | | | | | | | | | | | | | | |
| $Cs_2O$ | | | | | | | | | | | | | | | | | | | |
| Cl | 3.1 | 3.1 | 3.0 | 3.1 | 3.1 | 3.0 | 3.0 | 3.1 | 3.1 | 3.1 | 3.1 | 3.1 | 3.1 | 3.1 | 3.2 | 3.1 | 3.8 | 3.0 | 3.1 |
| Br | | | | | | | | | | | | | | | | | | | |
| I | | | | | | | | | | | | | | | | | | | |

| | GLASS NO. | | | | | | | | | | | | | | | | | | |
|---|---|---|---|---|---|---|---|---|---|---|---|---|---|---|---|---|---|---|---|
| | 20 | 21 | 22 | 23 | 24 | 25 | 26 | 27 | 28 | 29 | 30 | 31 | 32 | 33 | 34 | 35 | 36 | 37 | 38 |
| $SiO_2$ | 70.3 | 72.2 | 72.6 | 69.9 | 70.9 | 74.0 | 73.8 | 68.3 | 61.8 | 59.8 | 58.8 | 70.7 | 69.8 | 69.8 | 69.8 | 66.2 | 62.4 | 69.5 | 69.5 |
| $Li_2O$ | 4.0 | | 4.0 | 4.0 | 4.0 | 4.1 | | | | | | 3.9 | 3.9 | 3.9 | 3.9 | 3.9 | 6.3 | 6.2 | 6.2 |
| $Na_2O$ | 6.7 | 10.8 | 6.4 | 6.3 | 6.7 | 6.5 | 10.9 | 10.3 | 10.3 | 10.3 | 10.3 | 6.2 | 6.2 | 6.2 | 6.2 | 6.2 | 6.2 | 6.2 | 6.2 |
| $K_2O$ | 3.4 | 3.4 | 3.4 | 3.4 | 3.4 | 3.5 | 3.4 | 3.2 | 3.2 | 3.2 | 3.2 | 3.3 | 3.3 | 3.3 | 3.3 | 3.3 | 2.3 | 2.3 | 2.3 |
| $TiO_2$ | 1.5 | 1.5 | 1.5 | 4.5 | 1.5 | | | | 1.5 | 4.5 | 1.5 | 1.5 | 1.5 | 4.0 | 1.5 | 1.5 | 0.5 | 4.4 | 4.4 |
| $Ta_2O_5$ | 0.56 | | | | 0.56 | | | | | | | 0.5 | 1.5 | | 1.0 | 1.0 | | | |
| $Al_2O_3$ | 2.4 | 0.6 | 0.6 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| ZnO | 7.3 | 7.3 | 7.3 | 7.2 | 7.3 | 7.5 | 7.4 | 6.9 | 6.9 | 6.9 | 6.9 | 3.6 | 4.0 | 4.0 | 4.0 | 7.1 | 7.2 | 7.1 | 7.1 |
| $La_2O_3$ | | | | | | | | | 4.0 | | 4.0 | 2.5 | | | | 1.5 | | | |
| PbO | | | | | | | | | | | | 3.5 | | | | | | | |
| $Y_2O_3$ | | | | | | | | | | | | | | 1.5 | | | | | |
| $Nb_2O_5$ | | | | | | | | | | | | | | | 2.0 | | | | |
| $ZrO_2$ | | 1.0 | 1.0 | 0.6 | 0.64 | | | | 1.0 | 3.5 | 4.0 | | 4.0 | | | 1.0 | | | |
| CaO | | | | | | | | | | | | | | | | | | | |
| $WO_3$ | | | | | | | | | | | | | 0.5 | | 0.5 | | | | |
| MgO | | | | | | | | | | | | | | | 4.0 | | | 10.8 | |
| SrO | | | | | | | | | | | | | | | | 4.0 | | | |
| BaO | | | | | | | | | | | | | | | | | 4.0 | | |
| $B_2O_3$ | | | | | | | | | 7.2 | 7.2 | 7.2 | | | | | | | | |
| $P_2O_5$ | | | | | | | | | | | | 7.2 | | | | | | | |
| $Rb_2O$ | | | | | | | | | | | | | | | | | | | |
| $Cs_2O$ | | | | | | | | | | | | | | | | | | | |
| Cl | 3.7 | 3.1 | 3.1 | 3.0 | 3.7 | 3.1 | 3.1 | 3.1 | 3.1 | 3.1 | 3.1 | 3.0 | 3.0 | 3.0 | 3.0 | 3.0 | 3.0 | 3.0 | 3.0 |
| Br | | | | | | | | | | | 0.2 | | | | | | | | |
| I | | | | | | | | | | | | | | | | | | | |

| | GLASS NO. | | | | | | | | | | | |
|---|---|---|---|---|---|---|---|---|---|---|---|---|
| | 39 | 40 | 41 | 42 | 43 | 44 | 45 | 46 | 47 | 48 | 49 | 50 |
| $SiO_2$ | 69.5 | 69.9 | 70.4 | 70.3 | 70.4 | 70.4 | 70.4 | 69.3 | 72.5 | 72.7 | 70.8 | 59.3 |
| $Li_2O$ | 6.2 | 6.2 | 4.3 | 7.1 | 4.3 | 4.3 | 4.3 | 7.3 | | | 4.9 | 9.4 |
| $Na_2O$ | 6.2 | 6.1 | 6.2 | 3.4 | 4.8 | 4.8 | 4.8 | 6.3 | 10.9 | 6.4 | 5.1 | 8.2 |
| $K_2O$ | 2.3 | 2.3 | 3.3 | 3.5 | 4.8 | 3.4 | 3.3 | 1.3 | 3.4 | 7.9 | 3.4 | 3.3 |
| $TiO_2$ | 4.4 | 4.2 | 4.4 | 4.4 | 4.4 | 4.4 | 4.4 | 4.4 | | | 4.5 | 4.4 |

TABLE I-continued

| | 1 | 2 | 3 | 4 | 5 | 6 | 7 | 8 | 9 | 10 | 11 | 12 |
|---|---|---|---|---|---|---|---|---|---|---|---|---|
| $Ta_2O_5$ | | | | | | | | | | | 1.5 | 1.5 |
| $Al_2O_3$ | 1.2 | 1.2 | 1.2 | 1.2 | 1.2 | 1.2 | 1.2 | 1.2 | 1.2 | 1.2 | 1.2 | 1.2 |
| ZnO | 7.1 | 7.0 | 7.1 | 7.1 | 7.1 | 7.1 | 7.1 | 7.1 | 7.3 | 7.3 | 7.1 | 7.1 |
| $La_2O_3$ | | | | | | | | | | | | |
| PbO | | | | | | | | | | | | |
| $Y_2O_3$ | | | | | | | | | 1.5 | | | |
| $Nb_2O_5$ | | | | | | | | | | 1.3 | | |
| $ZrO_2$ | | | | | | | | | | | 1.5 | 2.5 |
| CaO | | | | | | | | | | | | |
| $WO_3$ | | | | | | | | | | | | |
| MgO | | | | | | | | | | | | |
| SrO | | | | | | | | | | | | |
| BaO | | | | | | | | | | | | |
| $B_2O_3$ | | | | | | | | | | | | |
| $P_2O_5$ | | | | | | | | | | | | |
| $Rb_2O$ | | | | | | | 1.4 | | | | | |
| $Cs_2O$ | | | | | | | | 1.4 | | | | |
| Cl | 3.0 | 1.5 | 3.0 | 3.0 | 3.0 | 3.0 | 3.0 | 3.0 | 3.1 | 3.1 | | 3.1 |
| Br | | 1.5 | | | | | | | | | | |
| I | 0.15 | | | | | | | | | | | |

Other base glass compositions can be prepared in accordance with the methods disclosed herein. For example, the following base glass compositions, comprising on a mole percent oxide basis (other than halides), can be prepared:

TABLE II

| | | | | | | | | | |
|---|---|---|---|---|---|---|---|---|---|
| $Li_2O$ | 6% | 8% | 7% | 0% | 7.8% | 1% | 5% | 6% | 2% |
| $Na_2O$ | 6% | 9% | 7% | 5% | 12% | 2% | 0% | 8% | 4% |
| $K_2O$ | 7% | 8% | 7% | 4% | 0% | 1.9% | 5% | 6% | 4% |
| $TiO_2$ | 31% | 21% | 10.5% | 0.5% | 1.2% | 1.2% | 0.5% | 1% | 3% |
| ZnO | 0% | 0% | 15% | 1% | 2% | 8% | 12% | 20% | 2% |
| BaO | 0% | 0% | 0% | 0% | 0% | 10% | 0% | 0% | 0% |
| $Al_2O_3$ | 0% | 0% | 0% | 0% | 14% | 8% | 7% | 1% | 1% |
| $SiO_2$ | 50% | 53% | 53.5% | 89% | 60% | 67.8% | 70.3% | 52% | 82% |
| Cl | 0% | 1% | 0% | 0.5% | 3% | 0.1% | 0.2% | 6% | 2% |

TABLE III

| | | | | | | | | |
|---|---|---|---|---|---|---|---|---|
| $Li_2O$ | 6% | 4% | 4.5% | 5% | 3% | 5% | 6% | 4% |
| $Na_2O$ | 5.5% | 4% | 9% | 5% | 6% | 5.5% | 0% | 7.5% |
| $K_2O$ | 6% | 4% | 4.5% | 2% | 4% | 5% | 8.8% | 5% |
| $TiO_2$ | 10% | 3% | 9.5% | 3% | 3% | 6% | 5% | 7.5% |
| ZnO | 4% | 9% | 3% | 8% | 6.5% | 6.5% | 10% | 7.5% |
| $Al_2O_3$ | 0.5% | 0.6% | 5% | 1% | 1.5% | 4% | 2% | 1% |
| $SiO_2$ | 65% | 75% | 63.5% | 75.5% | 74% | 67% | 67.5% | 65.8% |
| Cl | 3% | 0.4% | 1% | 0.5% | 2% | 1% | 0.7% | 1.7% |

Optionally, the base glass compositions can include $Rb_2O$, $Cs_2O$, MgO, CaO, SrO, BaO, PbO, $B_2O_3$, F, Br, I, $Ta_2O_5$, $ZrO_2$, $Nb_2O_5$, $La_2O_3$, $Y_2O_3$, $WO_3$ and mixtures thereof as set forth herein.

EXAMPLE 2

Polished and ground glass plates of the exemplary glass compositions of Table I were prepared. The plates had a nominal thickness of 2 mm. Each of the plates was ion exchanged in aqueous solution containing the chemicals and the amounts set forth in Table II below. The ion exchange reaction was conducted in an autoclave at the reaction temperature set forth in column G and for the duration set forth in column H. Each ion-exchanged plate is identified by a number corresponding to the number of the exemplary glass composition of Table I of Example 1 ion exchanged to produce the plate. When an exemplary glass composition was used as the base glass for two or more plates produced under different ion-exchange reactions employing different ion-exchange solutions or conditions, the resulting plates are identified with the number corresponding to the number of the exemplary glass composition used as a base glass and a letter to signify that different ion-exchange reactions were employed.

The values in columns A, B, C, D, E and F are the amounts, in grams or cc, of the identified chemicals added together with distilled water to make one liter of the aqueous ion-exchange solution.

Plate No. is the identification number of the ion-exchanged plate. The arabic number portion of the Plate No. identifies the Glass No. of the exemplary glass composition of Table I of Example 1 ion exchanged with an aqueous solution containing chemicals in the amounts identified in columns A through F and at the temperature and for the time set forth in columns G and H, respectively, to produce the Plate. For example, Plate 2A was prepared from exemplary Glass No. 2 of Table I of Example 1.

A is the grams of $AgNO_3$.
B is the grams of $Cu(NO_3)_2$.
C is the grams of $Cu_2O$.
D is the grams of $LiNO_3$.
E is the grams of silica gel.
F is the cc of 16N $HNO_3$.
G is the reaction temperature of the ion-exchange reaction.
H is the reaction time in minutes of the ion-exchange reaction.

| PLATE NO. | A | B | C | D | E | F | G | H |
|---|---|---|---|---|---|---|---|---|
| 41 | 20 g | 40.9 g | 5.7 g | 200 g | 1.1 g | 10.8 cc | 320° C. | 30 min. |
| 1, 2A, 3C, 4B, 5, 6 and 26A | 40 g | 40.9 g | 4.4 g | 200 g | 1.1 g | 8.9 cc | 310° C. | 40 min. |
| 1C, 2, 3, 4C, 5C, 12B, 47 and 48 | 20 g | 40.9 g | 4.4 g | 200 g | 1.1 g | 7.55 cc | 310° C. | 60 min. |
| 37, 46 | 200 g | 55.6 g | 0 | 200 g | 2.2 g | 36.7 cc | 320° C. | 30 min. |
| 37A | 200 g | 55.6 g | 0 | 200 g | 2.2 g | 70 cc | 310° C. | 30 min. |
| 37B, 38, 39 | 200 g | 55.6 g | 0 | 200 g | 2.2 g | 70 cc | 320° C. | 30 min. |
| 6A, 7, 8, 13, 15, 17, 18, 19, 20, 23, 24, 25, 26 and 27 | 200 g | 0 | 0 | 0 | 1.1 g | 44.4 cc | 310° C. | 60 min. |
| 1A, 2B, 3A, 4, 5A, 6B, 9, 10, 11, 12, 13A, 14, 16, 21 and 22 | 200 g | 0 | 0 | 0 | 1.1 g | 60 cc | 310° C. | 20 min. |
| 1B, 2C, 3B, 4A, 5B, 6C, 9A, 11A, 12A, 14A, 21A and 22A | 200 g | 25 g | 0 | 0 | 1.1 g | 70 cc | 305° C. | 60 min. |
| 3D, 4D and 6D | 200 g | 0 | 0 | 0 | 1.1 g | 70 cc | 300° C. | 30 min. |
| 37C | 200 g | 55.6 g | 0 | 200 g | 1.67 g | 70 cc | 320° C. | 30 min. |

EXAMPLE 3

Ground and polished glass plates of the exemplary glass compositions 3, 6, 10, 13, 14 and 21 of Table I above were ion exchanged at 310° C. for 0.5 hour in an aqueous solution consisting of 20 g $AgNO_3$ + 200 g $LiNO_3$ + 4.4 g $Cu_2O$ + 40.9 g $Cu(NO_3)_2$ + 7.55 cc of 16 N $HNO_3$ + 1.1 g silica gel/liter of the aqueous solution to produce Plates 3E, 6E, 10A, 13B, 14B and 21B.

The cuprous oxide reacted in the aqueous solution with the nitric acid therein. As results of the presence of $Cu_2O$, $Cu(NO_3)_2$ and $HNO_3$, the aqueous solution buffered at a pH value of about 2.75 and, the effective molar ratio $[Ag^+]:[H^+]$ of silver ions to hydronium ions was about 65 in the aqueous solution. The very large value of the molar ratio insures a very high concentration of $Ag^+$ ions within the ion-exchanged surface layer.

The presence of more than about 1.5 mole percent $TiO_2$ in the anhydrous base glasses as RS-Suppression agents effectively suppressed the spontaneous yellow or brown coloration which may otherwise be present in the ion-exchanged surface layer due to the very high concentration of silver therein. The RS-Suppression agents prevented spontaneous reduction of $Ag^+$ ions in glass upon ion-exchange reactions, to silver atoms and/or silver specks of molecular dimension and/or silver metal particles. $TiO_2$ also acted as a photosensitivity inhibitor in said solution ion-exchanged glasses and at the same time, greatly improved the intrinsic and apparent sensitivity of the ion-exchanged surface layer to electron beams. As a result, said solution ion-exchanged glasses are colorless and transparent, are highly sensitive to electron beams, and are insensitive/inert to the radiation in the spectral ranges of ultraviolet throughout visible and longer wavelengths.

The combination of a high pH value in the aqueous ion-exchange solution and the presence of $TiO_2$ in the parent anhydrous glasses, i.e., base glasses, additively slows down the penetration rate of the ion-exchange reactions, and confines the thickness of the ion-exchanged surface layer to less than a couple of micrometers for an ion-exchange duration of 0.5 hour.

Said ion-exchanged glass plates were exposed to focused electron beams having an accelerating voltage of 20 kv. Isolated lines as well as square patches were recorded in the direct writing mode. To prevent static charges built up on the glass surface during E-beam exposures, a thin conducting film of gold of about 100 Å in thickness was coated prior to the E-beam exposure onto the ion-exchanged glass samples in a JEOL JEE4C thermal evaporator. The conductive coating was removed after the E-beam exposure by an aqua regia wash. Other conductive coatings may be used, such as carbon coatings.

The measured line width is 0.8 micrometer within all the samples of 3E, 6E, 10A, 13B, 14B and 21B. Since the linewidths were measured with an optical microscope and the measured line widths of 0.8 micrometer is most likely the diffraction limited dimension, the true line widths in the glass samples are equal to or less than 0.8 micrometer.

Optical densities in excess of 2.5 at the absorption peak were obtained in the direct writing mode using 20 kv electron beams. The color of the darkened square areas in said ion-exchanged surface layer, observed under intense white light illumination in an optical microscope, is blue gray in Plates 6E and 3E, is magenta in Plates 10A, 13B and 14B, and is red in Plate 21B.

The above experiments demonstrate that various colors of E-beam darkened images can be obtained through the variation of the parent anhydrous glass composition alone. The above experiments also demonstrate that the minimum geometries, e.g., line width, that can be delineated in the products of the present invention is less than 1 micrometer and most likely less than 0.8 micrometer.

EXAMPLE 4

Several sets of parallel lines of about 0.8 micrometer line width were recorded with a variety of E-beam exposure dosages using the direct writing mode within Plate 6E of Example 3. The line patterns were then contact printed onto photoresist coated silicon wafers using mercury lines at 436 nm and 405 nm for the contact exposures of the photoresist. Visually (observed under a microscope) perfect line patterns were replicated in the developed photoresist, from the various masking patterns (i.e., sets of parallel lines whose optical density varied from one set to another) delineated with various E-beam dosages down to $3 \times 10^{-5}$ coulomb/cm$^2$.

As demonstrated, the HEBS glass articles of the present invention can be employed to make photomasks which are suitable for photo-fabrication of microelectronic circuits or the like, and that the minimum E-beam dosage which is necessary to delineate the masking patterns within the ion-exchange products of the present invention in the direct writing mode is equal to or less than about $3 \times 10^{-5}$ coulomb/cm$^2$.

EXAMPLE 5

Ground and polished glass plates of the exemplary glass compositions 13 and 14 of Table I were ion exchanged at 340° C. for 5 minutes in an aqueous solution composed of 40 g AgNO$_3$+200 g LiNO$_3$+4.4 g Cu$_2$O+40.9 g Cu(NO$_3$)$_2$+8.9 cc of 16 N HNO$_3$+1.1 g silica gel/liter of the aqueous solution to produce Plates 13C and 14C.

The aqueous solution buffered at a pH value of about 2.5 and the effective molar ratio [Ag$^+$]: [H$^+$] of silver ions to hydronium ions was about 75 in the aqueous solution. TiO$_2$ and Ta$_2$O$_5$ which were included in the glass batches of the parent anhydrous glasses acted as photosensitivity inhibitors and/or RS-Suppression agents.

Plates 13C and 14C are colorless and transparent, highly sensitive to electron beams, and insensitive/inert to the radiation in the spectral ranges of visible and longer wavelengths.

Plates 13C and 14C were darkened in the direct writing mode by focused electron beams having an accelerating voltage of 20 kv. The measured line widths of the E-beam darkened lines were 0.8 micrometer. The color of the darkened square areas observed under an optical microscope with intense white light illumination is blue gray in Plate 13C and gray in Plate 14C.

Example 5 together with Example 3 serves to demonstrate the effect of the concentrations of the ingredients of the aqueous ion-exchange solution and/or the conditions of the ion-exchange reactions, in altering the E-beam induced coloration.

EXAMPLE 6

Ground and polished glass plates of the exemplary glass composition 6 of Table I were ion exchanged at 310° C. for 1 hour in an aqueous solution consisting of 200 g AgNO$_3$+70 cc of 16 N HNO$_3$+1.1 g silica gel/liter of the aqueous solution to produce Plate 6F.

The very high concentration of silver ions in the aqueous solution ensures a very high concentration of silver within the ion-exchanged surface layer.

The measured line widths of the E-beam darkened lines delineated with a focused electron beam operated at 20 kv in the direct writing mode are again 0.8 micrometer within the ion-exchanged surface layer. The color of the E-beam exposed areas observed under a microscope with intense white light illumination is reddish orange.

EXAMPLE 7

A set of six gratings consisting of three latent gratings and three absorption gratings were delineated by focused electron beams within Plate 6F of Example 6. The net optical density of the grating rulings were varied from about 0.01 to 2 among the various gratings delineated by the focused electron beams. The net optical density is less than about 0.05 in the latent gratings and is more than 0.5 in the absorption gratings. The variation in the net optical density of the gratings was obtained via the variation in the exposure dosage (i.e., the charge density) and the accelerating voltages of the electron beams. The accelerating voltages of the electron beams employed are 10 kv and 20 kv.

Said Plate 6F bearing the absorption gratings and the latent gratings therein was etched in an aqueous solution containing 2.5% by weight of HF at room temperature for 3 minutes. After being removed from the aqueous HF solution, the glass sample was rinsed with distilled water.

All of the six gratings delineated by the electron beams, within Plate 6 were transformed into surface relief gratings through selective etching in the HF solution. Surface relief gratings having a spatial frequency of 600 line-pairs per millimeter were obtained. Pure phase gratings which are colorless in the grating rulings were obtained from the latent gratings. Absorption phase gratings were made from the absorption gratings, namely, a thickness modulation due to surface relief is superimposed on the absorption gratings.

EXAMPLE 8

Ground and polished glass plates of the exemplary glass composition 6 of Table 1 were ion exchanged at 300° C. for 1 hour in an aqueous solution composed of 200 g AgNO$_3$+76.6 cc of 16 N HNO$_3$+55.5 g Cu(NO$_3$)$_2$+200 g LiNO$_3$+1.1 g silica gel/liter of the aqueous solution to produce Plate 6G.

The measured line widths of the E-beam darkened lines delineated with a focused electron beam operated at 20 kv in a direct writing mode are 0.8 micrometer within Plate 6G. The color of the E-beam exposed area observed under a microscope with intense white light illumination is magenta.

Example 8 together with Examples 6 and 3 serve to demonstrate that various E-beam induced colorations can be obtained within a variety of ion-exchanged glasses, i.e., HEBS glass articles, which are prepared from a single base glass, i.e., parent anhydrous glass composition.

EXAMPLE 9

Plate 6G of Example 8 bearing E-beam darkened areas was immersed into a preheated oil bath at 100° C. for 2 hours. The optical density of the E-beam darkened square patches was increased from 1.86 to 2.20 at the wavelength of the absorption peak due to the low temperature heat treatment. The areas unexposed to E-beam remained colorless and have a transmittance value of 91.5% throughout the visible spectral range, before and after the low temperature heat treatment. Example 9 demonstrates the possibility of utilizing a low temperature heat treatment to enhance the contrast of images delineated with electron beams.

EXAMPLE 10

Ground and polished glass plates of the exemplary glass compositions 41, 42 and 43 of Table 1 were ion exchanged at 310° C. for 0.5 hour in an aqueous solution consisting of 100 g $AgNO_3$+30 cc of 16N $HNO_3$+1.1 g silica gel +55.6 g $Cu(NO_3)_2$+200 g $LiNO_3$/liter of the aqueous solution to produce Plates 41A, 42 and 43. The colorations of the areas exposed to electron beam at 25 kv are reddish brown, gold yellow and brown in Plates 41A, 42 and 43 respectively.

EXAMPLE 11

Ground and polished glass plates of the exemplary glass compositions 41, 42, 43, 44 and 45 of Table I were ion exchanged at 310° C. for 0.5 hour in an aqueous solution consisting of 20 g $AgNO_3$+200 g $LiNO_3$+5.7 g $Cu_2O$+41 g $Cu(NO_3)_2$+10.8 cc of 16N $HNO_3$+1.1 g $SiO_2$/liter of the aqueous solution to produce Plates 41B, 42A, 43A, 44 and 45. The colorations of the areas exposed to electron beam at 25 kv are bluish magenta, magenta, magenta, bluish magenta and red in Plates 41B, 42A, 43A, 44 and 45 respectively.

EXAMPLE 12

Seven square areas, 1.2 mm×1.2 mm each, were uniformly darkened within Plate 41B of Example 11, in a direct writing mode to optical densities of 2.40, 2.10, 1.55, 0.97, 0.52, 0.37 and 0.24 at the wavelength of the absorption peak. The corresponding optical densities at 436 nm were 1.93, 1.64, 1.25, 0.81, 0.47, 0.36 and 0.24. The glass plate bearing the seven E-beam darkened areas was then immersed into a preheated oil bath at 100° C. for a total of six hours. At every two hour interval, the sample was taken out of the oil bath to examine under a microscope, paying particular attention to any change in the color of the E-beam darkened square patches and the surface quality of the glass sample. The optical densities of the square patches were measured at 436 nm at the 2 hour intervals.

No change in the optical densities and color/hue of the E-beam darkened square patches were detected throughout the stability test at 100° C. The transmittance of the areas unexposed to E-beam remained constant at 92% throughout the visible spectral range, and the surface quality of the ion-exchanged glass plate remained unchanged throughout the test.

In a separate experiment, the surface of Plate 41B bearing the seven E-beam darkened areas was brought into contact with a hot plate at 350° C. for a very brief period of less than about a couple of seconds. The contact is thought to be just sufficient to heat the integral ion-exchanged surface layer to about 350° C. It was found that all seven E-beam darkened patches disappeared without leaving any trace of being previously darkened. Thus, the E-beam darkened color images were thermally erased to a colorless state which is totally transparent in the visible spectral range. The transmittance of the erased areas as well as the areas not exposed previously to electron beams have identical transmittance throughout the entire spectral range. Apparently, the color centers, i.e., the silver metal particles and/or specks of molecular dimensions are redissolved, within the ion-exchanged surface layer, instantaneously at the hot plate temperature of about 350° C.

EXAMPLE 13

Two square areas of Plate 46 of Example 2 were darkened in a direct E-beam writing mode to an optical density of 3.30 (the absorption spectra is represented by curve 4 of FIG. 1) at the wavelength of the absorption peak. The corresponding optical density at 436 nm was 2.48. The glass plate bearing the E-beam darkened areas was immersed into a pre-heated oil bath at 100° C. for a total of 6 hours. At every 2 hour interval, the sample was taken out of the oil bath to examine under a microscope paying particular attention to any change in the color of the E-beam darkened square patches and the surface quality of the glass sample. The optical density of the square patches was measured at 436 nm at the two hour intervals. No change in the optical density and color/hue of the colored square patches were detected throughout the stability test at 100° C. The transmittance of the areas unexposed to E-beam remained constant at 90.6% throughout the visible spectral range, and the surface quality of Plate 46 remained unchanged throughout the test.

In a separate experiment Plate 46, bearing the two E-beam darkened square patches, was immersed into a preheated oil bath at 232.2° C. (450° F.). The optical density at 436 nm was reduced from 2.48 to 0.16 in 10 minutes and was further reduced to 0.04 after 1 hour immersion in oil at 232.2° C.

EXAMPLE 14

The E-beam induced colorations of Plates 37B, 38 and 39 of Example 2 exposed to electron beams at 25 kv are more or less identical. For these three plates, the E-beam induced coloration changes with an increasing E-beam exposure dosage from very light gray to light bluish magenta, to magenta and to a deep colored red.

EXAMPLE 15

Six square areas, 1.2 mm×1.2 mm each were uniformly darkened within Plate 37B of Example 2 in a direct writing mode with 35 kv electron beams to optical densities of 0.42, 0.64, 1.33, 1.94, 2.53 and 2.76 at the wavelength of the absorption peak. The charge densities employed to darken these square patches were $(1.92\pm0.25)\times10^{-5}$, $(32\pm0.25)\times10^{-5}$, $(8\pm0.25)\times10^{-5}$, $(16\pm0.25)\times10^{-5}$, $(32\pm0.25)\times10^{-5}$, $(64\pm0.25)\times10^{-5}$, coulomb/cm$^2$, respectively. The corresponding optical densities were 0.35, 0.525, 1.05, 1.52, 2.01 and 2.23, respectively, at 436 nm, and were 0.39, 0.63, 1.27, 1.73, 2.10 and 2.21, respectively, at 546 nm.

The E-beam darkened square images were totally erased by immersing Plate 37B bearing the color patches into a preheated oil bath at 232.2° C. (450° F.) for two hours.

Plate 37B after being darkened and erased was again exposed to the electron beam at 35 kv. Six square areas, 1.2 mm×1.2 mm each, were again darkened in the direct writing mode, using the same charge densities at the six dosage levels previously employed. The optical densities of the square patches at the wavelength of the absorption peak are 0.33, 0.54, 1.23, 2.01, 2.67 and 2.98. The corresponding optical densities are 0.30, 0.46, 0.97, 1.60, 2.16 and 2.43, respectively, at 436 nm, and are 0.32, 0.53, 1.16, 1.75, 2.10 and 2.30 at 546 nm, respectively.

The optical densities as well as the absorption band shapes, peak wavelengths, and the absorption band widths are identical within experimental precision, before and after the erasure. Thus, the sensitivity to E-beam in a direct writing mode and the E-beam induced coloration are unchanged by the heat erasure treatment.

Plates 6F of Example 6, 6G of Example 8, 41A, 42 and 43 of Example 10, 41B, 42A, 43A, 44 and 45 of Example 11, and 37B, 38, 39 and 46 of Example 2 are colorless and transparent, are highly sensitive to electron beams, and insensitive/inert to radiation in the spectral range of ultraviolet throughout visible and longer wavelengths.

EXAMPLE 16

Images delineated with high voltage electron beams within the following ion-exchanged glasses were yellow in color which is the manifestation of an E-beam induced absorption band centered in the blue to near-ultraviolet spectral ranges:

(a) ground and polished glass plates of the exemplary glass composition 40, of Table I above, which have been ion exchanged at 310° C. for 0.5 hour in an aqueous solution consisting of 200 g $AgNO_3$ + 70 cc $HNO_3$ + 111 g $Cu(NO_3)_2$ + 400 g $LiNO_3$ + 1.33 g silica gel/liter of the aqueous solution;

(b) ground and polished glass plates of exemplary glass composition 49, of Table I above, which have been ion exchanged at 300° C. for 30 minutes in an aqueous solution consisting of 20 g $AgNO_3$ + 200 g $LiNO_3$ + 41 g $Cu(NO_3)_2$ + 26.4 cc of 16N $HNO_3$ + 13.2 g $Cu_2O$ + 1.1 g silica gel/liter of the aqueous solution; and (c) ground and polished glass plates of exemplary composition 8 of Table I, which have been ion exchanged at 320° C. for 0.5 hour in an aqueous solution consisting of 200 g $AgNO_3$ + 33.3 cc of 16N $HNO_3$ + 55.6 g $Cu(NO_3)_2$ 200 g $LiNO_3$ + 1.67 g silica gel/liter of the aqueous solution.

EXAMPLE 17

Glass compositions 4, 5, 6, 7 and 8 of table I of Example 1 and glass compositions 51, 52, and 53 were ion exchanged in aqueous solution containing, per liter of the aqueous solution, 400 gr (i.e., grams) of $AgNO_3$, 2 gr of silica gel, 2 gr of crushed glass powder of the glass composition 52, and 30 cc of 16N $HNO_3$ to produce plates 4E, 4F, 4G, 4H, 4I, 5E, 5F, 5G, 5H, 5I, 6E, 6F, 6G, 6H, 6I, 7E, 7F, 7G, 7H, 7I, 8E, 8F, 8G, 8H, 8I, 51E, 51F, 51G, 51H, 51I, 52E, 52F, 52G, 52H, 52I, 53E, 53F, 53G, 53H, and 53I. 200 gr of $LiNO_3$, 200 gr of $NaNO_3$, 200 gr of $KNO_3$ and/or 45 gr of $Cu(NO_3)_2$ are optionally added to the aqueous ion exchange solution in some of the autoclave runs. The glass composition 51 was prepared from the glass batch of the glass composition 6 of Table I of Example 1 with the addition of 2% $B_2O_3$ on the mole percent oxide basis. The glass composition 52 was prepared from the glass batch of the glass composition 7 of Table I of Example 1 with the addition of 2 mole % $B_2O_3$. The glass composition 53 was prepared from the glass batch of the glass composition 52 with the addition of 0.5 mole % $Li_2O$, 1.0 mole % of $Na_2O$ and 0.5 mole % $K_2O$. The glass composition 4, 5, 6, 7 and 8 of Table I of example 1 and the glass compositions 51, 52, and 53 were also ion exchanged in aqueous solution containing per liter of the aqueous solution 400 gr of $AgNO_3$, 2 gr of silica gel, 2 gr of crushed glass powder of the glass composition 52, and 8 cc of 16 N $HNO_3$ to produce plates 4J, 4K, 4L, 4M, 4N, 5J, 5K, 5L, 5M, 5N, 6J, 6K, 6L, 6M, 6N, 7J, 7K, 7L, 7M, 7N, 8J, 8K, 8L, 8M, 8N, 51J, 51K, 51L, 51M, 51N, 52J, 52K, 52L, 52M, 52N, 53J, 53K, 53L, 53M, and 53N. In each of the ion exchange runs at ion exchange conditions E, F, G, H, I, J, K, L, M and N, glass plate samples selected from the eight glass compositions were ion exchanged. Plates 4E, 5E, 6E, 7E, 8E, 51E, 52E, and 53E were ion exchanged for a duration of 3 minutes at reaction temperatures up to a maximum of 330° C. Plates 4F, 5F, 6F, 7F, 8F, 51F, 52F, and 53F were ion exchanged for a duration of 5 minutes at reaction temperatures up to a maximum of 340° C. Plates 4G, 5G, 6G, 7G, 8G, 51G, and 53G were surface treated at reaction temperatures up to 350° C. for 6.5 minutes. Plates 4H, 5H, 6H, 7H, 8H, 51H, 52H, 53H were ion exchanged for a duration of 7.5 minutes at reaction temperatures up to 360° C. Plates 4I, 5I, 6I, 7I, 8I, 51I, 52I, and 53I were ion exchanged for a duration of 9.5 minutes at reaction temperatures up to 370° C. Plates 4J, 5J, 6J, 7J, 8J, 51J, 52J, and 53J were ion exchanged for a duration of 3 minutes at reaction temperatures up to 330° C. Plates 4K, 5K, 6K, 7K, 8K, 51K, 52K, and 53K were ion exchanged for a duration of 5 minutes at reaction temperatures up to 340° C. Plates 4L, 5L, 6L, 7L, 8L, 51L, 52L, and 53L were ion exchanged for a duration of 6.5 minutes at reaction temperatures up to 350° C. Plates 4M, 5M, 6M, 7M, 8M, 51M, 52M, and 53M were ion exchanged for a duration of 9.5 minutes at reaction temperatures up to 360° C. Plates 4N, 5N, 6N, 7N, 8N, 51N, 52N, and 53 N were ion exchanged for a duration of 9.5 minutes at reaction temperatures up to 370° C. In determining the values of the duration of the ion exchange reactions stated immediately above the reaction temperatures for glass compositions 4, 5, 6, 7, 8, 51, 52, and 53 were defined as temperatures above 320° C.; namely, the reaction vessel was heated up to above 320° C. and was cooled down from 320° C. to room temperature sufficiently fast that no significant extent of reactions takes place during the periods when the glass article was at temperatures below 320° C. in the autoclaving cycle.

The solution ion exchanged glass plates were flood/blanket exposed to and uniformly darkened with 20 kv electron beams at a dosage level of 250 $\mu c/cm^2$. Additional sets of glass plate samples were blanket exposed to electron beams at dosage levels ranging from 100 to 2000 $\mu c/cm^2$, and at accelerating voltages ranging from 5 to 30 kv.

With or without a conductive coating, e.g., chrome, gold or carbon on the surface of the IIES layer, HEBS glass plates were flood exposed and uniformly darkened with a pre-set dosage or to a pre-set optical density using a flood/blanket electron beam exposure system. Although a conductive coating on IIES layer is usually required for draining off electric charges during bit by bit E-beam exposure using E-beam pattern generators such as MEBES, the conductive coating is not necessary for flood/blanket E-beam exposures using exposure systems such as ElectronCure 30M.

The flood/blanket electron beam exposure system employed is ElectronCure 30M Electron Beam Exposure System marketed by Electron Vision Corporation of San Diego, Calif. The system comprises a wide field electron source which is capable of blanket exposing a large area, e.g., a 6" diameter area.

A partial fading with time wherein optical density values of more than about 1.5 were reduced by up to about 20% has been observed in plates 52L–N in ion exchange conditions and in glass composition, whose precursor glass was prepared from a strong oxidizing glass batch with an excess of chloride, and melted in a large glass melter in particular to ensure a high Cl-retention. For glass plates that exhibit partial fading, it is recommended that such plates after exposure be permitted to age until the E-beam exposure induced optical density is stabilized.

Typically, the observed partial fading of optical densities, i.e., decreasing E-beam exposure induced optical density with time at room temperature, was dominantly in the wavelength range of about 350 nm to about 550 nm; the reduction in optical density in this wavelength range is in some glass plates accompanied by an increase in optical density in the wavelength range of about 500 nm to 700 nm and/or by an increase in optical density in the wavelength range of below about 375 nm, while the optical density in the wavelength range of above about 700 nm remain substantially constant.

The optical density of the E-beam darkened areas and/or of the recorded image in the glass plates that exhibit partial fading, behaves approximately as a linear function of log t, time in logarithmic scale, and the change in optical density from 0.01 day to 10 days is in general about the same magnitude as the subsequent change in the next 990 days. Therefore, for glass plates that exhibit partial fading it is recommended that such plates after darkening by exposure to E-beam be permitted to age until the E-beam induced optical density is stabilized.

It has been found that the aging process can be accelerated through a post exposure treatment, a post exposure bake in particular. The preferred temperature of the post exposure bake depends on the HEBS glass composition and ion exchange parameters, and is in general between about 50° C. to about 100° C., although a higher temperature can be employed. The preferred duration of the post exposure bake is from less than 1 hour to about 16 hours, although a longer duration can be employed. Stabilization of optical densities for the glass plates that exhibit partial fading can in general be accomplished through any one of a large number of combinations of duration and temperature of the post exposure bake. Many of the preferred schedules are within 60° C. to 85° C. for 1 to 16 hours. One of the more preferred schedule of the post exposure bake is 70° C. for 2 hours. Another of the more preferred schedule of the post exposure bake is 70° C. for 16 hours. Still another of the more preferred schedule of the post exposure bake is about 70° C. to about 85° C. for one hour.

As stated elsewhere, the recorded image and/or the high energy beam darkened area or spots in the HEBS glasses are stable indefinitely at ambient temperatures. This is also true for the HEBS glasses that exhibit partial fading, because the recorded image in these glasses is retrievable, i.e., can be read back optically, before, during and after the aging process, and/or before and after the post exposure bake.

The absorption spectra in the visible spectral range, i.e., the wavelength dependence of the information bearing optical density were measured with spectrophotometers for the E-beam darkened glass plate samples. As is expected from the description and Examples 1 to 16 above, the wavelength of the absorption peak and the absorption-band-width are functions of the HEBS glass composition, temperature and duration of the ion exchange reactions, the acidity and ingredients of the ion exchange solution and the accelerating voltage and dosage of the electron beam. It has been determined that the wavelengths of the absorption peaks in the spectra of the E-beam darkened HEBS glass plates range from less than 430 nm to more than 820 nm.

Figure 11A:
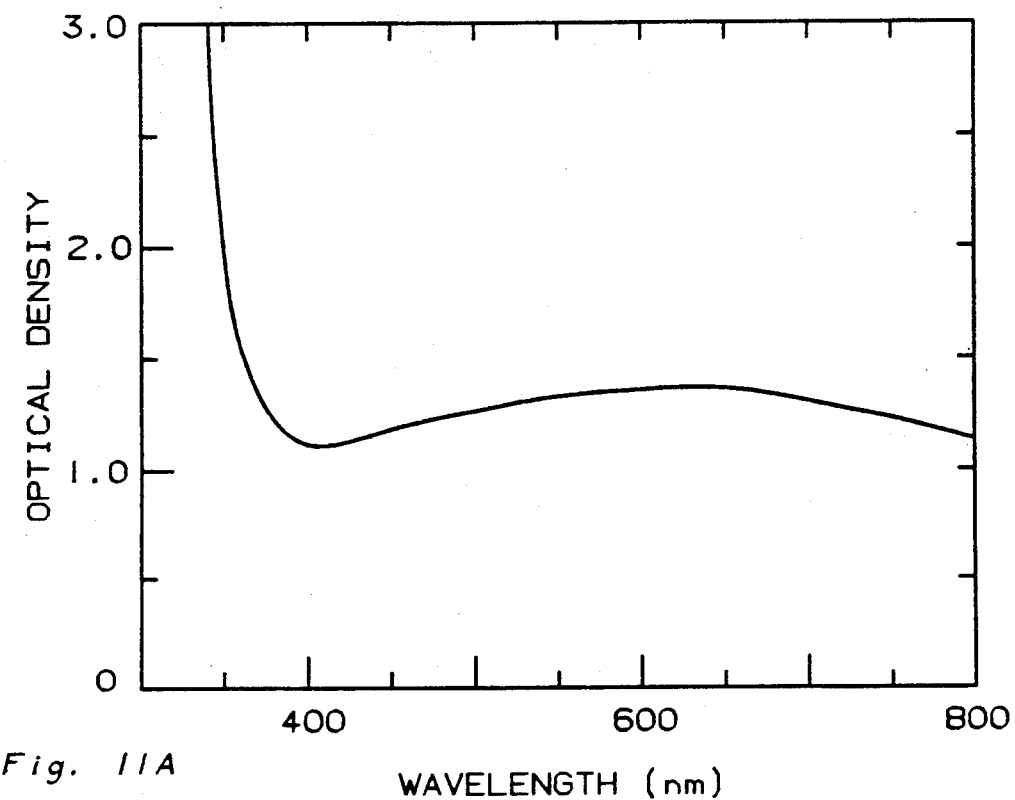
FIG. 11A and FIG. 11B depict the absorption spectra of plates 52M and 52N having been blanket/flood exposed to 20 kv and 15 kv electron beams respectively to yield optical density values of 1.25 and 1.35 at 488 nm respectively.
Figure 11B:
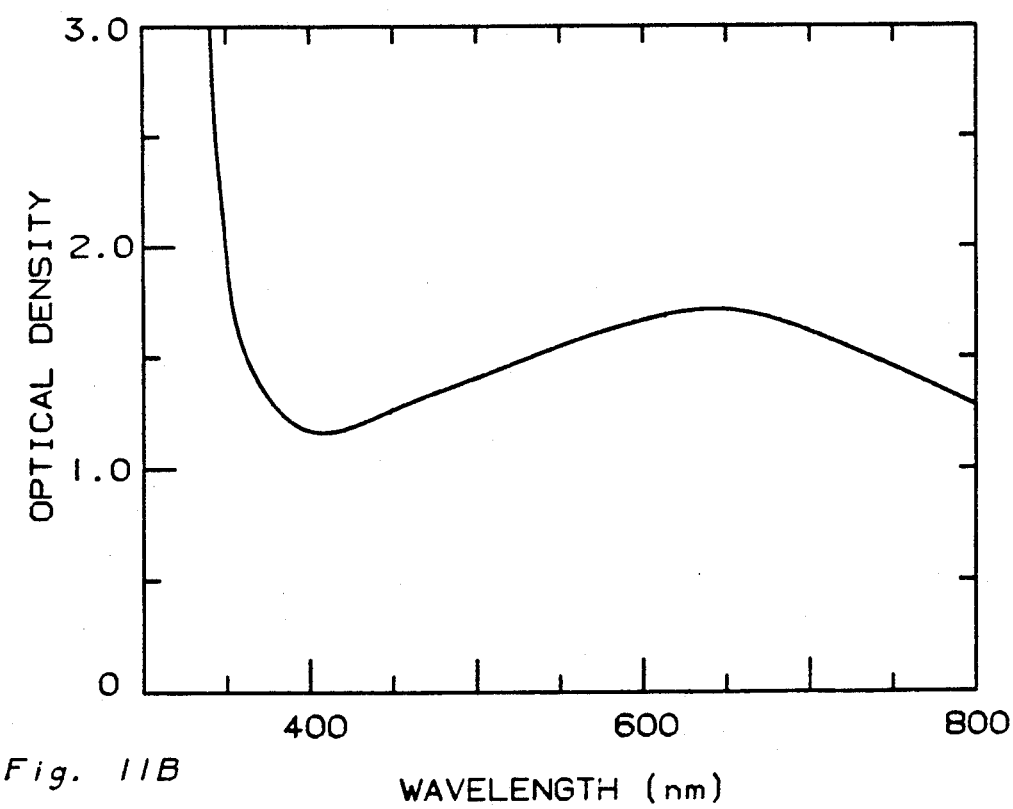
Figure 12A:
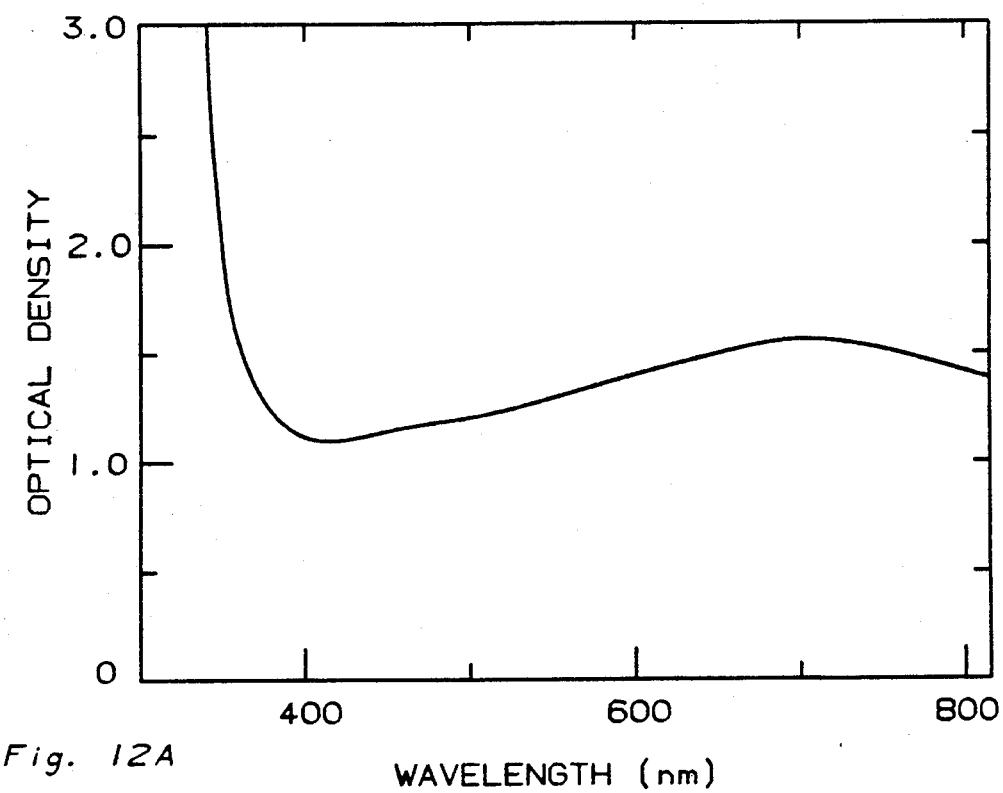
FIG. 12A and FIG. 12B depict the absorption spectra of plates 53M and 53N having been blanket/flood exposed to 20 kv electron beams to yield optical density values of 1.2 and 1.1 respectively at the wavelength of the recording beam at 488 nm.
Figure 12B:
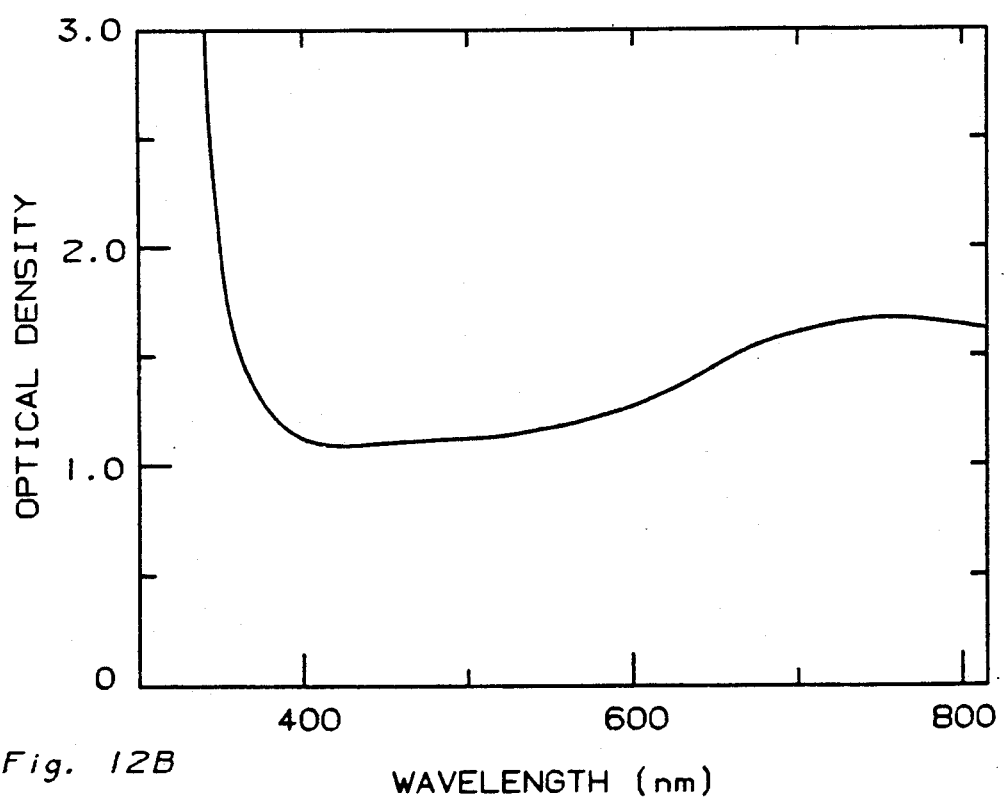

Some of the HEBS glass plates were flood exposed and darkened to a predetermined optical density value ranging from 0.5 to more than 3 at the wavelength of the recording beam for the erasure mode of recording. FIG. 11A and FIG. 11B depict the spectral absorption curves of plate 52M and plate 52N respectively, having been blanket/flood exposed to optical density values of 1.25 and 1.35 at the wavelength of the recording beam at 488 nm, using 20 kv and 15 kv electron beam respectively. FIGS. 12A and 12B represent the spectral absorption curves of plates 53M and 53N respectively, having been blanket/flood exposed to optical density values of 1.2 and 1.1 respectively at the wavelength of the recording beam at 488 nm, using a 20 kv electron beam.

Figure 13:
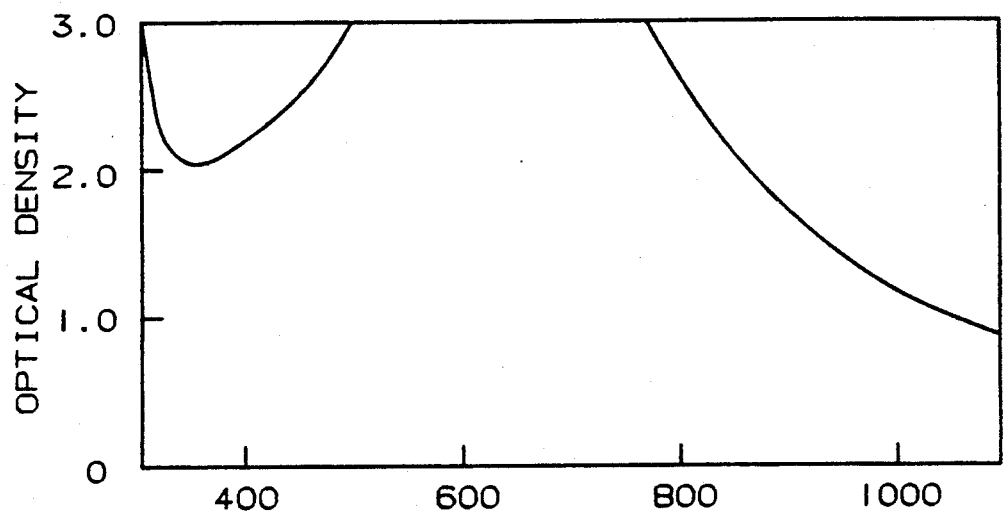
FIG. 13 depicts the stabilized spectra of the near saturation optical density of plate 52M.
Figure 14:
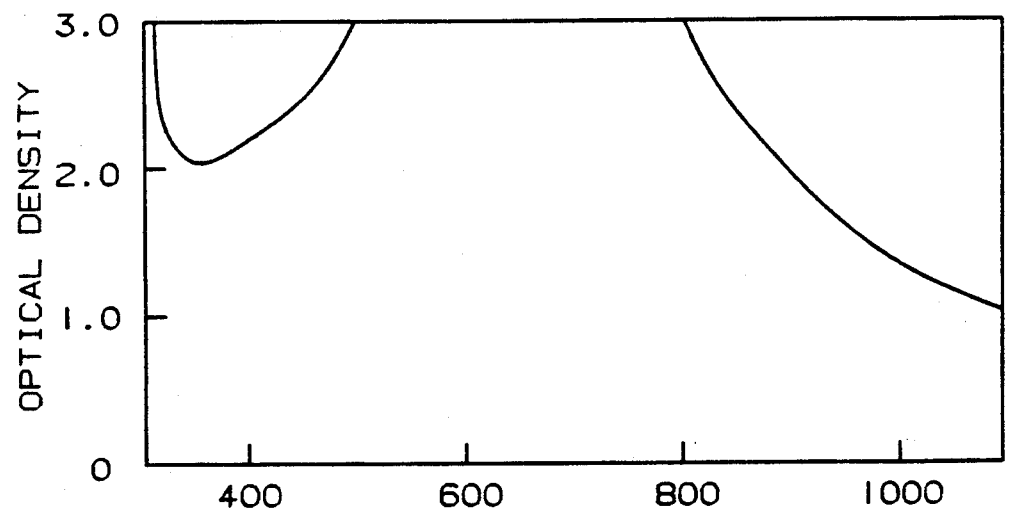
FIG. 14 depicts the stabilized spectra of the near saturation optical density of plate 52N.

Some of the HEBS glass plates were flood exposed to electron beam to yield near saturation optical densities. Since the saturation optical density of a HEBS glass plate and the E-beam dosage that is required to obtain the saturation optical density at any given E-beam accelerating voltage are not determined precisely, values of near saturation optical densities are practical representation of the saturation optical densities. FIG. 13 and FIG. 14 represent the absorption spectra of plate 52M and plate 52N having been blanket/flood exposed with a 20 kv electron beam to near saturation optical densities, and followed by a post exposure bake at 70° C. for 2 hours. The stabilized values of the near saturation optical density of plate 52M exceed 3.0 at wavelengths from 462 nm to 785 nm, and the stabilized values of the near saturation optical density of plate 52N exceed 3.0 at wavelengths from 460 nm to 804 nm.

It has been determined that the wavelength of the absorption peak increases with an increasing temperature of ion exchange reactions. For example, the wavelengths of the absorption peaks after a post exposure bake are 541 nm, 622 nm and 641 nm for plates 52L, 52M and 52N respectively having been exposed to 15 kv electron beam to their corresponding near saturation optical densities. The wavelengths of the absorption peaks after a post exposure bake are 490 nm, 510 nm and 575 nm for plates 52G, 52H and 52I respectively, having being exposed to 20 kv electron beam to their corresponding near saturation optical densities. The wavelengths of the absorption peaks are 488 nm, 540 nm and 612 nm for plates 52F, 52H and 52I respectively having been exposed to 20 kv electron beam to secure a pre-set optical density value of about 1.2 at 488 nm. The corresponding half-absorption band width are 253 nm, 420 nm and 437 nm for the 20 kv E-beam darkened plates 52F, 52H and 52I respectively.

It has also been determined that the wavelength of the absorption peak decreases with an increasing acidity of the aqueous ion exchange solution. For example, the wavelengths of the absorption peaks after a post exposure bake are 541 nm and 477 nm for plate 52L and plate 52G respectively having been exposed to 15 kv electron beam to their corresponding near saturation optical densities. The wavelengths of the absorption peaks after a post exposure bake are 622 nm and 475 nm for plate 52M and plate 52H respectively having been exposed to 15 kv electron beam to their corresponding near saturation optical densities. The wavelengths of the absorption peaks after a post exposure bake are 641 nm and 490 nm for plate 52N and plate 52I respectively having been exposed to 15 kv electron beam to their corresponding near saturation optical densities. The wavelengths of the absorption peaks after a post exposure bake are 581 nm and 490 nm for plate 52L and plate 52G respectively having been exposed to 20 kv electron beam to their corresponding near saturation optical densities. The wavelengths of the absorption peaks after a post exposure bake are 579 nm and 510 nm for plate 52M and plate 52H respectively having been exposed to 20 kv electron beam to their corresponding near saturation optical densities.

The wavelength of the absorption peak as well as the absorption band width can also be tailored for applications using the accelerating voltage of the electron beam as a variable parameter. For example, the wavelengths of the absorption peaks representing two samples of plate 52I having been darkened with an electron beam at 15 kv and at 20 kv to secure a pre-set optical density value of about 1.2 at 488 nm are 504 nm and 612 nm respectively. The corresponding half-absorption band widths are 452 nm and 437 nm respectively.

For the HEBS glass plate which exhibit more than one absorption peak in the visible and near infrared spectral range, the value of the wavelength of the absorption peak stated above represents that of the most prominent absorption peak.

What is claimed is:

1. A method for making a high energy beam-sensitive (HEBS) glass article, said glass article comprising an integral ion-exchanged surface layer (IIES layer) having Ag+ ions therein, and/or silver halide-containing and/or Ag$_2$O-containing and/or Ag+ ion-containing microcrystals and/or microphases therein, containing silanol groups and/or water having a concentration of more than about 0.01% by weight H$_2$O, which comprises the steps:

(a) contacting the surface of a parent glass article with a Ag+ ion-containing material and/or an aqueous solution containing Ag+ ions, the parent glass article being prepared from a glass batch melt and having glass composition comprising at least one alkali metal oxide selected from the group consisting of Li$_2$O, Na$_2$O, K$_2$O, Cs$_2$O and Rb$_2$O, at least one photosensitivity-inhibitor (PI agent) and/or red-shift suppression agent (RS-Suppression agent or RSS agent), SiO$_2$, and from zero up to saturation of halide in the glass melt, the glass composition containing an effective amount of photosensitivity inhibitors to render the IIES layer substantially photoinsensitive to substantially all actinic radiation having a wavelength longer than 400 nm, (b) heating said parent glass article together with said Ag+ ion-containing material and/or said aqueous solution containing Ag+ ions in contact therewith to a temperature sufficient to effect an exchange of Ag+ ions for said alkali metal ions in at least the surface of said parent glass article for a period of time sufficient to allow the ion exchange reactions to proceed in thickness dimension into the surface of said parent glass article to form the IIES layer.

2. A method of claim 1 wherein said silver ions exchange with alkali metal ions in said glass composition, whereby the concentration of alkali metal ions in the resultant IIES layer is lower than that of the parent glass article.

3. A method of claim 1 wherein the surface of said IIES layer which is ion exchanged has substantially the same surface quality and surface figure after the ion exchange treatment as before said treatment.

4. A method of claim 1 wherein said ion exchange reactions cause the formation of said silver halide-containing and/or said Ag$_2$O-containing and/or said Ag+ ion-containing microcrystals and/or microphases within the IIES layer.

5. A method of claim 1 wherein said photosensitivity inhibitor and/or RS-suppression agent is an amount of at least 0.5% total of oxides of transition metals which have 1 to 4 d-electrons in the atomic state, effective to render said IIES layer substantially photoinsensitive to substantially all actinic radiation having a wavelength longer than 400 nm and photosensitive to radiation of energy higher than that of a wavelength of 400 nm.

6. A method of claim 5 wherein the amount of photosensitivity inhibitors is effective to render said IIES layer substantially photoinsensitive to substantially all actinic radiation having a wavelength longer than 200 nm and photosensitive to radiation of energy higher than that of a wavelength of 200 nm.

7. A method of claim 5 wherein the amount of photosensitivity inhibitors is effective to render said IIES layer substantially photoinsensitive to substantially all actinic radiation having a wavelength longer than 300 nm and photosensitive to radiation of energy higher than that of a wavelength of 300 nm.

8. A method of claim 7 wherein the IIES layer is sensitive to high energy beam which is a high voltage electron beam, an ion beam, at atomic beam, a molecular beam, x-ray radiation or deep uv radiation having wavelengths shorter than 300 nm.

9. A method according to claim 8 wherein at least a portion of said IIES is darkened with said high energy beam.

10. A method according to claim 9 wherein recorded image is formed in the darkened IIES layer by bit-by-bit heat-erasure in a predetermined pattern using a high intensity light beam including laser beams, at whose wavelengths there is absorption of light within the darkened IIES layer.

11. A method according to claim 10 wherein the glass article is a read-only optical disc and/or a write-once-read-many (WORM) disc.

12. A method according to claim 10 wherein the glass article is a write-erasable optical disc, said write-erase is done using a uv laser beam modulated between two power levels.

13. A method according to claim 10 wherein an etched surface relief pattern corresponding to the recorded image is formed through a selective etching means which includes etching the surface of the IIES layer bearing the recorded image by wet chemical etching or plasma etching.

14. A method according to claim 8 wherein the IIES layer is exposed to said high energy beam in a predetermined pattern to produce recorded image.

15. A method according to claim 14 wherein at least a portion of the recorded image is erased by heat including bit by bit erasure and flood erasure, using a heat source including oven, hot plate and high intensity light beams which include laser beams.

16. A method according to claim 14 wherein an etched surface relief pattern corresponding to the recorded image is formed through a selective etching means which includes etching the surface of the IIES layer bearing the recorded image by wet chemical etching or plasma etching.

17. A method of claim 8 wherein a coloration induced by exposure to said high energy beams being selected from yellow, reddish orange, reddish brown, brown, red, reddish magenta, reddish black, magenta, bluish magenta, blue, violet gray, blue gray, bluish black, gray and black.

18. A method of claim 17 wherein said coloration is obtained through the choice of base glass composition, ingredients and acidity of the aqueous ion exchange solution, and/or reaction temperature and duration.

19. A method of claim 18 wherein a variety of colorations and/or hues are obtained within a single piece of the glass article using energy of the high energy beam and/or exposure dosage of the high energy beam as variable parameters.

20. A method of claim 17 wherein a variety of E-beam induced colorations selected from said colorations are obtained within a variety of HEBS glass articles which are prepared from a single base glass composition.

21. A method of claim 8 wherein spectral band shapes, including the wavelengths of the absorption peaks and the band widths of the absorption spectra induced by exposure to said high energy beam, are designed for specific applications through the choice of base glass composition, ingredients and acidity of the aqueous ion-exchange solution, temperature and duration of ion exchange reactions, energy of high energy beam, and/or exposure dosage of the high energy beam.

22. A method of claim 5 wherein said amount is effective to render said IIES layer substantially photoinsensitive to substantially all actinic radiation having a wavelength longer than 365 nm and photosensitive to radiation of energy higher than that of a wavelength of 365 nm.

23. A method of claim 5 wherein said photosensitivity inhibitor and/or RS-suppression agent is an amount of less than 35% total of oxides of transition metals which have 1 to 4 d-electrons in the atomic state, effective to render said IIES layer substantially photoinsensitive to substantially all actinic radiation having a wavelength longer than 400 nm and photosensitive to radiation of photon-energy higher than that of a wavelength of 400 nm.

24. A method of claim 23 wherein said amount is effective to render said IIES layer substantially photoinsensitive to substantially all actinic radiation having a wavelength longer than 436 nm and photosensitive to radiation of energy higher than that of a wavelength of 436 nm.

25. A method according to claim 1 wherein said photosensitivity inhibitor and/or RS-suppression agent is at least one oxide of a transition metal selected from the group consisting of $TiO_2$, $Ta_2O_5$, $ZrO_2$, $Nb_2O_5$, $La_2O_3$, $Y_2O_3$ and $WO_3$.

26. A method according to claim 1 wherein said photosensitivity inhibitor is at least one oxide of a transition metal selected from the group consisting of $TiO_2$, $Ta_2O_5$, $Y_2O_3$ and $Nb_2O_5$.

27. A method according to claim 1 wherein said photosensitivity inhibitor is at least one oxide of a transition metal selected from the group consisting of $TiO_2$, $Y_2O_3$ and $Nb_2O_5$.

28. A method of claim 1 wherein said photosensitivity inhibitor and/or RS-suppression agent includes, in mole %, at least 0.5% $TiO_2$.

29. A method according to claim 1 wherein said glass composition containing in mole percent, at least 1.5% $TiO_2$.

30. A method according to claim 1 wherein said glass composition containing in mole percent on the oxide basis at least 2% total of at least one acid-durability-and-glass-network-strengthener selected from the group consisting of ZnO, PbO, MgO, CaO and $Al_2O_3$.

31. A method according to claim 1 wherein said glass composition containing, in mole percent, 2% to 20% ZnO, 0 to 10% $Al_2O_3$, and 1.2% to 25% $TiO_2$.

32. A method according to claim 1 wherein said glass composition contains 10–20%, mole percent, total of $Li_2O$, $Na_2O$, and $K_2O$, and in the glass batch 0.8–6%, mole percent, Cl.

33. A method according to claim 1 wherein said glass composition contains in mole percent, up to 3% Cl, in the glass batch.

34. A method according to claim 1 wherein said glass composition contains in mole percent 3–10% $TiO_2$ and 60–82% $SiO_2$.

35. A method according to claim 1 wherein said glass composition contains in mole percent, up to 7.2% $B_2O_3$.

36. A method according to claim 1 wherein said glass composition contains in mole percent 0.5–5% $Al_2O_3$.

37. A method according to claim 1 wherein said glass composition contains in mole percent up to 20% PbO.

38. A method of claim 1 wherein said glass composition consisting essentially of, in mole percent on the oxide basis,
   5–25% of one or more alkali metal oxides,
   up to 6% Cl
   0.5–35% total concentration of photosensitivity inhibitors and RS-suppression agents,
   2% to 20% ZnO,
   up to 20% MgO,
   up to 15% $Al_2O_3$,
   up to 20% PbO,
   up to 20% CaO,
   2–35% total of at least one acid-durability-and glass-network-strengthener selected from the group consisting of MgO, ZnO, $Al_2O_3$, PbO, and CaO,
   up to 20% BaO,
   up to 25% $B_2O_3$,
   up to 25% $P_2O_5$,
   up to 4% F,
   up to 2% Br,
   up to 2% I, and
   50–89% $SiO_2$.

39. A method according to claim 1 wherein said glass composition consisting essentially of, in mole percent on the oxide basis,
   12–16% total of $Li_2O$, $Na_2O$, and $K_2O$,
   3–10% total of oxides of transition metals having 1 to 4 d-electrons in the atomic state, including 3–10% $TiO_2$, the glass composition containing a sufficient amount of the oxides of transition metals having 1 to 4 d-electrons in the atomic state to render the IIES layer substantially photoinsensitive to substantially all actinic radiation having a wavelength longer than 400 nm,
   4–10% ZnO,
   0.5–5% $Al_2O_3$,
   0.8–6% Cl, and
   68–75% $SiO_2$.

40. A method according to claim 1 wherein said glass composition consisting essentially of, in mole percent on the oxide basis, 10–20% total of Li$_2$O, Na$_2$O, K$_2$O, Rb$_2$O, and Cs$_2$O,
0.5–8.4% total of photosensitivity inhibitors (PI agents) and RS-suppression agents (RSS agents), the glass composition containing at least an effective amount of PI agents to render said IIES layer substantially photoinsensitive to substantially all actinic radiation having a wavelength longer than 400 nm, including 0.5 to 7.4% TiO$_2$,
3.6–7.6% ZnO,
0.6–2.4% Al$_2$O$_3$,
up to 10.8% MgO,
up to 4% CaO,
up to 4% BaO,
up to 3.5% PbO,
up to 4% SrO,
up to 7.2% B$_2$O$_3$,
up to 7.2% P$_2$O$_5$,
up to 1.5% halide selected from the group consisting of F, Br, and I,
0.8–6% Cl, and
58.5–73.2% SiO$_2$.

41. A method according to claim 1 wherein said glass composition consisting essentially of, in mole percent on the oxide basis,
3–25% total of one or more alkali metal oxide,
1.5–35% total concentration of photosensitivity inhibitors (PI agents) and RS-suppression agents selected from the group consisting of TiO$_2$, Nb$_2$O$_5$, Y$_2$O$_3$ and Ta$_2$O$_5$,
up to 35% of acid-durability-and-glass-network-strengtheners (ADAGNS),
up to 25% P$_2$O$_5$,
up to 25% B$_2$O$_3$,
up to 4% F,
up to 6% Cl,
up to 2% Br,
up to 2% I, and
20–93% SiO$_2$,
the sum amount of the above components constituting at least 75 mole percent of the glass composition.

42. A method of claim 1 wherein the content of the silanol groups and/or water in said IIES layer is between 0.01% and 12% by weight H$_2$O.

43. A method of claim 1 wherein the content of the silanol groups and/or water in said IIES layer is between 0.1 and 6% by weight H$_2$O.

44. A method of claim 1 wherein said IIES layer contains in mole percent, 0.1–25% Ag$_2$O.

45. A method according to claim 1 wherein said glass composition contains in mole percent, up to 10.8% MgO.

46. A method according to claim 1 wherein the glass article is a phototool which is employed for the production of semiconductor chip products, pre-recorded optical discs, flat panel displays, hybrid circuits or printed circuit boards, by methods which employ photomasks and/or reticles in a photolithographic process.

47. A method of claim 1 wherein the glass article is an optical software disk employed to load programs into various computers as well as to supply a recording medium to serve the market for personal computers, video games, office systems, data distribution systems and other information systems, said optical software disk includes read-only discs, write-once-read-many discs and write-erasable discs.

48. A method according to claim 1 wherein the glass article is a write-erasable optical disc, said write-erase is done using a uv laser beam modulated between two power levels.

49. A method of claim 1 wherein the sensitivity of the IIES layer to high energy beams is increased through the choice of base glass composition, ingredients and acidity of the aqueous ion-exchange solution, and/or reaction temperature and duration.

50. A method of claim 49 wherein the sensitivity to electron beams increases with increasing chloride concentration in the glass composition.

51. A method of claim 49 wherein the sensitivity to electron beams increases with increasing concentration of silver ions in the IIES layer.

52. A method of claim 51 wherein the concentration of silver ions in the IIES layer increases with reducing acidity of the aqueous ion exchange solution.

53. A method of claim 51 wherein the concentration of silver ions in the IIES layer increases with increasing temperature of the ion exchange reactions.

54. A method of claim 51 wherein the concentration of silver ions in the IIES layer increases with increasing concentration of silver ions in the acidic aqueous ion exchange solution.

55. A method of claim 49 wherein a saturation optical density per unit thickness of the IIES layer increases with increasing E-beam sensitivity.

56. A method of claim 55 wherein a saturation optical density in the IIES layer is more than 0.1 for at least one wavelength.

57. A method of claim 55 wherein a saturation optical density in the IIES layer is more than 3 for at least one wavelength.

58. A method of claim 57 wherein the thickness of the IIES layer is less than 10 micrometers.

59. A method of claim 1 wherein said aqueous solution also contains acids and/or oxidizing agents.

60. A method of claim 1 wherein said aqueous solution also contains cuprous ions, cupric ions or mixtures thereof.

61. A method of claim 1 wherein said aqueous solution contains silver ions ranging from $10^{-4}$ mole/liter up to the concentration of a saturated AgNO$_3$ solution, and H+ ions ranging from $10^{-6}$ mole/liter to 5 mole/liter.

62. A method of claim 1 wherein the aqueous solution contains HNO$_3$ in the concentration range of 0.05 to 1.5 mole of HNO$_3$ per liter of the aqueous solution.

63. A method of claim 1 wherein said aqueous solution contains HNO$_3$ ranging from 3 cc up to 15 N HNO$_3$, per liter of the aqueous solution.

64. A method of claim 1 wherein said aqueous solution contains silver ions ranging from 100 grams of AgNO$_3$ per liter of the aqueous solution up to the concentration of a saturated AgNO$_3$ solution.

65. A method of claim 1 wherein said aqueous solution contains 200 g AgNO$_3$ per liter of the aqueous solution, and 10 to 200 cc of 16N HNO$_3$ per liter of the aqueous solution.

66. A method of claim 1 wherein said aqueous solution contains 20 g AgNO$_3$ per liter of the aqueous solution, and has a pH of between 1 and 6.

67. A method of claim 66 wherein the pH of said aqueous solution is kept at a value of more than 2, and said aqueous solution has a silver ion to hydrogen ion mole ratio of more than 5.

68. A method of claim 1 wherein said aqueous solution is a solution sufficiently buffered to maintain the solution's pH value throughout the ion exchange reaction.

69. A method of claim 1 wherein said aqueous solution has a mole ratio of silver ion to hydrogen ion, ranging from 5 to more than 50.

70. A method of claim 1 wherein the silver ion concentration of the aqueous solution is from 0.1 moles per liter up to the concentration of a saturated AgNO$_3$ solution.

71. A method of claim 1 wherein said aqueous solution contains alkali metal ions up to saturated concentrations of one or more alkali metal ion containing salts.

72. A method of claim 1 wherein said aqueous solution also contains up to saturation of dissolved SiO$_2$ and/or silica gel and/or water soluble silicates, and/or glass powder of HEBS glasses, and/or one or more constituent cations of said glass composition.

73. A method of claim 1 wherein said ion-exchange reactions include hydration and/or an exchange of H+ and/or H$_3$O+ ions for alkali metal ions in the surface of the glass article to produce the IIES layer containing silanol groups and/or water of more than 0.01% by weight H$_2$O.

74. A method of claim 1 wherein the glass article is treated at ion exchange temperatures of 350° C. below the strain point of said glass composition up to the annealing point of said glass composition.

75. A method of claim 1 wherein the ion exchange reactions are at temperatures from 240° C. to exceeding 360° C.

76. A method of claim 75 wherein the glass article is treated at said reaction temperatures for a period of time between 1 minute and 8 hours.

77. A method of claim 1 wherein the ion exchange reactions are at temperatures between 300° C. and the annealing point of said glass composition.

78. A method of claim 1 wherein the glass article is ion exchanged at reaction temperatures above 300° C. for a duration of time between 1 minute and two hours.

79. A method of claim 1 wherein said ion exchange reactions are carried out at pressures at least equal to the saturated vapor pressures of said aqueous solution.

80. A method of claim 79 wherein the pressure is maintained at values above the saturated vapor pressure of said aqueous solution.

81. A method of claim 80 wherein the vapor phase above the aqueous solution contains nitrogen, air, oxygen, and/or argon.

82. A method of claim 1 wherein the parent glass article is formed and shaped from the glass batch melt as a glass sheet with at least a portion of the glass sheet's surface ground and polished.

83. A method of claim 1 wherein the surface of the glass article is doped and/or enriched with chloride/chlorine prior to and/or after the ion exchange treatment.

84. A method of claim 1 wherein the glass batch melt is melted in an oxidizing atmosphere.

85. A method according to claim 1 wherein the melting is done in an atmosphere having a partial pressure of chlorine or chlorides, and/or other halides.

86. A method for making a high energy beam-sensitive (HEBS) glass article, said glass article comprising an integral ion-exchanged surface layer (IIES layer) having silver ions therein, and/or silver halide-containing and/or Ag$_2$O-containing and/or silver ion-containing microcrystals and/or microphases therein, containing silanol groups and/or water having a concentration of more than 0.01% by weight H$_2$O, which comprises the steps:

(a) contacting the surface of a parent glass article with an acidic aqueous solution containing silver ions, the parent glass article being prepared from a glass batch melt and having glass composition comprising at least one alkali metal oxide selected from the group consisting of Li$_2$O, Na$_2$O, K$_2$O, Cs$_2$O and Rb$_2$O, zero up to saturation of halide in the glass melt, and SiO$_2$, the glass composition containing an effective amount of photosensitivity inhibitors to suppress and/or eliminate photo reduction of said silver ions and/or said silver halide containing and/or said Ag$_2$O-containing and/or said silver ion containing microcrystals and/or microphases in said IIES layer, and to render the IIES layer substantially photoinsensitive to substantially all actinic radiation having a wavelength longer than 400 nm, (b) heating said parent glass article together with said actinic aqueous solution containing silver ions in contact therewith to reaction temperatures sufficient to effect an exchange of silver ions for said alkali metal ions in the surface of said parent glass article for a period of time sufficient to allow the ion exchange reactions to proceed up to 10 micrometer in thickness dimension into the surface of said parent glass article to form the IIES layer.

87. A method according to claim 86 wherein, said IIES layer having been darkened with a high energy beam, recorded image being formed in the darkened IIES layer through bit-by-bit heat-erasing in a predetermined pattern, portions of said darkened layer to produce the recorded image using a high intensity light beam which is absorbed by the high-energy-beam-darkened IIES layer and/or by the glass constituents of the IIES layer.

88. A method for making a high energy beam-darkened integral ion exchanged surface layer capable of data storage using bit by bit heat-erasure mode of recording, prior to darkening by exposure to a high energy beam, the undarkened integral ion exchanged surface layer (IIES layer) having silver ions therein and/or silver halide containing and/or Ag$_2$O-containing and/or silver ion-containing microcrystals and/or microphases therein, containing silanol groups and/or water having a concentration of more than 0.01% by weight H$_2$O, said IIES layer having a thickness of less than 10 micrometers and the darkened IIES layer having an information bearing optical density of more than 1.2 for at least one wavelength, which comprises the steps:

(a) contacting the surface of a parent glass article with an acidic aqueous solution containing silver ions, the parent glass article being prepared from a glass batch melt and having glass composition comprising at least one alkali metal oxide selected from the group consisting of Li$_2$O, Na$_2$O, K$_2$O, Cs$_2$O and Rb$_2$O, zero up to saturation of halide in the glass melt, and SiO$_2$, the glass composition containing an effective amount of photosensitivity inhibitors to suppress and/or eliminate photo reduction of said silver ions and/or said silver halide containing and/or said Ag$_2$O-containing and/or said silver ion containing microcrystals and/or microphases in said IIES layer, and to render the IIES layer substantially photoinsensitive to substantially all actinic radiation having a wavelength longer than 400 nm, (b) heating said parent glass article together with said acidic aqueous solution containing silver ions in contact therewith to reaction temperatures to effect an exchange of silver ions for said alkali metal ions in the surface of said parent glass article for a period of time sufficient to allow the ion exchange reactions to proceed to less than 10 micrometers in thickness dimension into the surface of said parent glass article to form the IIES layer, and (c) darkening said IIES layer to an optical density of more than 1.2 for at least one wavelength using the high energy beam.

89. A method according to claim 88 wherein the information bearing optical density is more than 3.0 for at least one wavelength.

90. A method according to claim 88 wherein the thickness of the IIES layer is less than 3 micrometer.

91. A method according to claim 88 wherein said high energy beam being a high voltage electron beam, an ion beam, an atomic beam, a molecular beam, x-ray radiation or uv radiation having wavelengths shorter than 400 nm.

* * * * *